US012443269B2

(12) United States Patent
Furtwangler

(10) Patent No.: US 12,443,269 B2
(45) Date of Patent: Oct. 14, 2025

(54) CONTROLLING LOCOMOTION WITHIN AN ARTIFICIAL-REALITY APPLICATION USING HAND GESTURES, AND METHODS AND SYSTEMS OF USE THEREOF

(71) Applicant: Meta Platforms Technologies, LLC, Menlo Park, CA (US)

(72) Inventor: Brandon Furtwangler, Issaquah, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

(21) Appl. No.: 18/535,940

(22) Filed: Dec. 11, 2023

(65) Prior Publication Data

US 2024/0192766 A1    Jun. 13, 2024

Related U.S. Application Data

(60) Provisional application No. 63/432,036, filed on Dec. 12, 2022.

(51) Int. Cl.
*G06F 3/01*       (2006.01)
*G06T 19/00*    (2011.01)

(52) U.S. Cl.
CPC ............. *G06F 3/011* (2013.01); *G06F 3/017* (2013.01); *G06T 19/00* (2013.01)

(58) Field of Classification Search
CPC ........... G06F 3/011; G06F 3/017; G06T 19/00
See application file for complete search history.

(56) References Cited

U.S. PATENT DOCUMENTS

2021/0090332 A1*   3/2021   Ravasz ................. G06V 40/28
2024/0134460 A1*   4/2024   Millar ..................... G06F 3/017

* cited by examiner

Primary Examiner — Amit Chatly
(74) Attorney, Agent, or Firm — Morgan, Lewis & Bockius LLP

(57) ABSTRACT

Systems and methods are provided for adjusting a representation of a user's position within an artificial-reality application using a hand gesture. One example method includes, while displaying, via a head-wearable device worn by a user, a representation of a user's position within an artificial-reality environment, in response to receiving an indication that a positional-control activation hand gesture has been performed, displaying a positional-control user interface (UI) overlaid on a portion of the artificial-reality environment, the positional-control UI including a positional-control UI element configured to perform a positional-control action. The example method further includes, while displaying the positional-control UI, in response to receiving an indication that the positional-control UI element has been selected, via a positional-control input hand gesture, causing a change in the representation of the user's position within the artificial-reality environment based on the positional-control action, and displaying a changed representation of the user's position within the artificial-reality environment.

20 Claims, 34 Drawing Sheets

Figure 2

Actions 205
- ← Step Forward  ↰ Turn Right
- → Step Back  ↲ Turn Left
- → Step Right  ● Trigger Teleport
- ← Step Left  ↻ Target Teleport
- ✗ Cancel Teleport

| | Primary Hand | | | Secondary Hand | | |
|---|---|---|---|---|---|---|
| | Pinch | Layer 1 | Layer 2 Release | Pinch | Layer 1 | Layer 2 Release |
| Positional-Control UI Teleport One-handed Simple 215 | ● 221 | (↰ 214, N/A 216, → 218, ↲ 212) 150 | (✗ 222) 170 · 223 | N/A 257 | N/A 250 | N/A 270 · 277 |
| Positional-Control UI Teleport Two-handed Simple 225 | ● 221 | (↰ 214, N/A 216, → 218, N/A 212) 150 | (✗ 222) 170 · 223 | N/A 257 | (264 N/A, ↰ 266, N/A 268, ↲ 262) 250 | N/A 270 · 277 |
| Positional-Control UI Teleport One-handed Maneuverable 235 | ● 221 | (↑ 214, ↰ 216, → 218, ↲ 212) 150 | (↑ 228, ← 226, ✗ 222, → 230, ↓ 224) 170 · 223 | N/A 257 | N/A 250 | N/A 270 · 277 |
| Positional-Control UI Teleport Two-handed Maneuverable 245 | ● 221 | (↑ 214, ↰ 216, →218, ↓ 212) 150 | (✗ 222) 170 · 223 | N/A 257 | (264 N/A, ↰ 266, N/A 268, ↲ 262) 250 | N/A 254 270 · 277 |

Figure 3

| | Primary Hand | | | Secondary Hand | | |
|---|---|---|---|---|---|---|
| | Bottom | Layer 1 | Layer 2 Top | Bottom | Layer 1 | Layer 2 Top |
| Positional-Control Slide<br>One-handed Simple<br>315 | N/A (221) | ↰(212) ↑(214) ↷(216) →(218) (150) | N/A (170) (223) N/A | N/A (257) | N/A (250) | N/A (270) N/A (277) |
| Positional-Control Slide<br>Two-handed Simple<br>325 | N/A (221) | ↰(212) ↑(214) ↷(216) →(218) ↓(?) (150) | N/A (170) (223) N/A | N/A (257) | ↰(262) N/A(264) ↷(266) N/A(268) (250) | N/A (270) (254) N/A (277) |
| Positional-Control Slide<br>One-handed Maneuverable<br>335 | →(221) | ↰(212) ↑(214) ↷(216) →(218) (150) | ←(224) ↑(226)(228) →(230) (170) (223) ← | N/A (257) | N/A (250) | N/A (270) N/A (277) |
| Positional-Control Slide<br>Two-handed Maneuverable<br>345 | N/A (221) | ↰(212) ↑(214) ↷(216) →(218) (150) | N/A (170) (223) N/A | →(257) | ↰(262) N/A(264) ↷(266) N/A(268) (250) | N/A (270) ←(277) |

Actions 305
↑ Walk Forward  ↑ Jump
↓ Backpedal  ↷ Crouch
→ Strafe Right  ↷ Turn Right
← Strafe Left  ↰ Turn Left

Hybrid Snap Turn
Auto-Repeat
(Large adjustments)

| Pinch State | Turn Affordance | Action |
|---|---|---|
| Held Outside Boundary 715 | 760, 762, 763 | Timer continues to fill as the user hold the pinch gesture outside of the positional-control UI boundary. Track affordance moves as the timer fills |
| Held Outside Boundary 718 | 760, 762, 763 | Timer continues to fill as the user hold the pinch gesture outside of the positional-control UI boundary. Track affordance moves as the timer fills |
| Held Outside Boundary 721 | 760, 762, 763 | Fifth predetermined snap turn is performed when the timer is filled. Fifth predetermined snap turn is performed until pinch is released |
| 724 Pinch Released | 760, 762 | Pinch released after reset. On release, fifth predetermined snap turn is no longer performed. Positional-control UI no longer displayed |

Time →

Figure 7B

Hybrid Snap Turn
Auto-Repeat
(Large adjustments)

| Pinch State | Turn Affordance | Action |
|---|---|---|
| 739 Held Far Outside Boundary (750, 755) | (760, 762, 763) | Timer continues to fill as the user hold the pinch gesture outside of the positional-control UI boundary. Rate at which the timer filled based on position of pinch outside of the boundary. Track affordance moves as the timer fills |
| 742 Held Far Outside Boundary (750, 755) | (760, 762, 763) | Sixth predetermined snap turn is performed when the timer is filled. Sixth predetermined snap turn is performed until pinch is released |
| 745 Pinch Released (750, 755) | (760, 762) | Pinch released after reset. On release, sixth predetermined snap turn is no longer performed. Positional-control UI no longer displayed |

Time →

Figure 7D

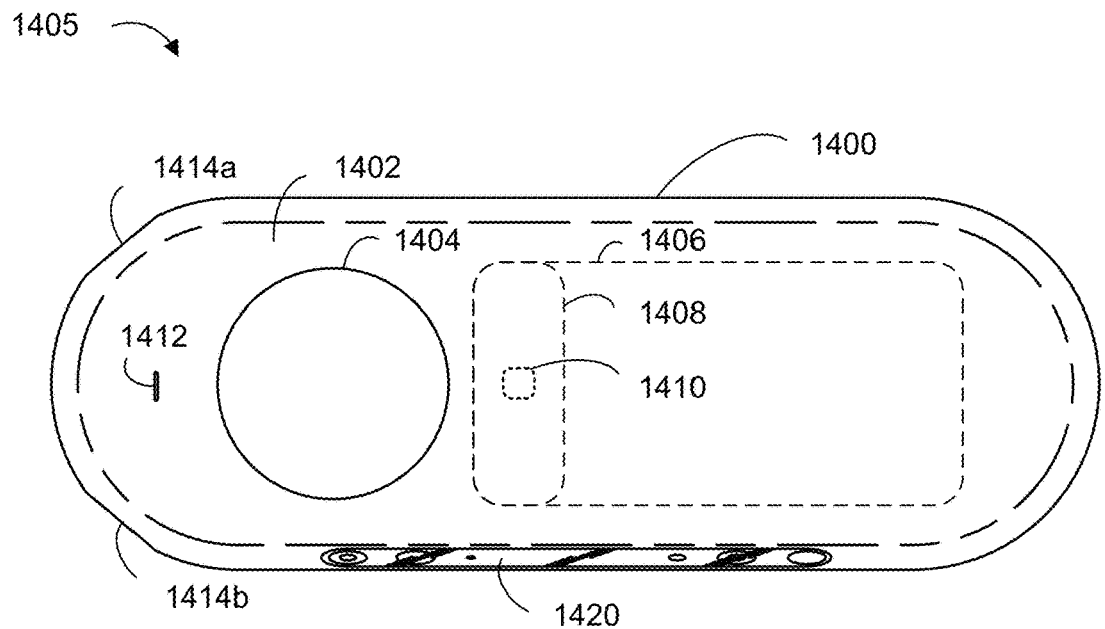
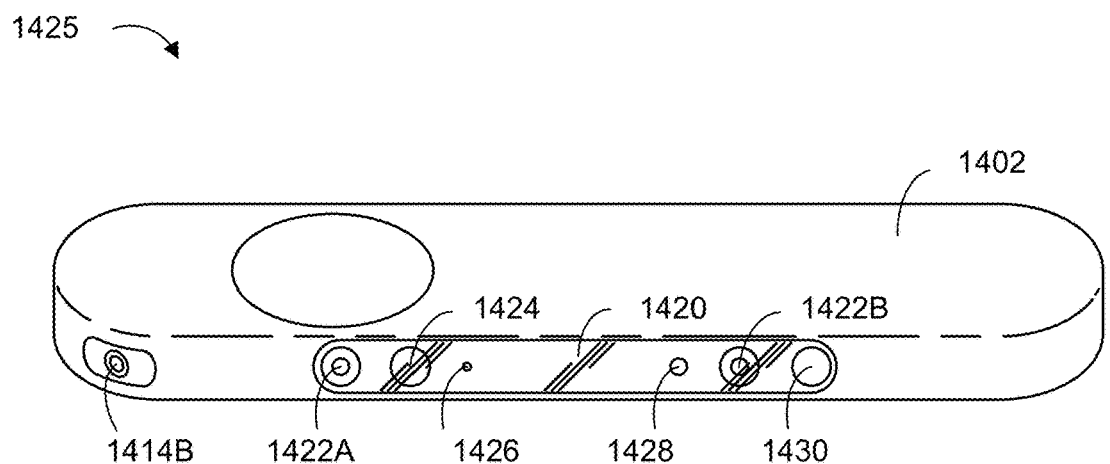
Figure 14A

CONTROLLING LOCOMOTION WITHIN AN ARTIFICIAL-REALITY APPLICATION USING HAND GESTURES, AND METHODS AND SYSTEMS OF USE THEREOF

CROSS-REFERENCE TO RELATED APPLICATIONS

This application claims priority to U.S. Prov. App. No. 63/432,036, filed on Dec. 12, 2022, and entitled "Controlling Locomotion Within An Artificial-Reality Application Using Hand Gestures, And Methods And Systems Of Use Thereof," which is incorporated herein by reference.

TECHNICAL FIELD

The present disclosure relates generally to wearable devices and methods for enabling quick and efficient adjustments to a representation of a user's position within an artificial-reality application, more particularly, to head-wearable device configured to detect hand gestures (e.g., to directly detect or to receive information from other devices, such as a wrist-wearable device, concerning the detection of these hand gestures), cause positional changes to the representation of the user's position within the artificial-reality application (often referred to herein as controlling locomotion or locomotion effects) based on the detected hand gestures, and present a changed representation of the user's position within the artificial-reality application.

BACKGROUND

Current hand gestures for interacting with and controlling artificial-reality environments (e.g., including virtual-reality environments) are limited and do not support the ability to adequately and precisely control locomotion (e.g., movements of a character within a virtual-reality space and also teleportation movements to other virtual-reality spaces). Locomotion solutions are complex and often need to account for a variety of constraining factors, such as physical constraints in the user's environments as well as virtual constraints associated with a particular virtual-reality environment, and a combination of these factors such as how a given locomotion effect rendered for the particular virtual-reality environment will be physically perceived by a user. Existing locomotion solutions fail to adequately account for all of these constraining factors, including failing to accurately map a user's physical environment into a potentially larger virtual environment such that the user's virtual presence has expanded freedom to explore and maneuver. The inability of some existing locomotion solutions to accurately map a user's physical environment into a potentially larger virtual environment can create challenges in a user's ability to quickly navigate a virtual environment and/or precisely interact with virtual objects in the virtual environment. These issues often lead to user frustrations with artificial-reality environments and systems, which can frustrate user adoption and/or lead users to spend less time interacting with these environments and systems.

Furthermore, certain artificial-reality systems often require use of physical controllers and a need to navigate through complex menus and interaction sequences to access specific commands, including ones related to locomotion features. Requiring users to learn and apply the complex menus and interaction sequences with physical controllers can also lead to further user frustrations.

As such, there is a need for addressing one or more of the drawbacks discussed above by developing systems and methods that enable a user to quickly and efficiently navigate through an artificial-reality environment (such as an artificial-reality world).

SUMMARY

The head-wearable devices, and methods of use thereof (as well as systems including both wrist-wearable and head-worn devices) described herein address one or more of the above-mentioned drawbacks by tracking a user's inputs (e.g., in-air hand gestures which can be detected via a wrist-wearable device (such as using neuromuscular-signal sensors), a head-wearable device (e.g., using a camera to track the in-air hand gestures), and/or a fusion of these input paradigms) to accurately and efficiently adjust representations of the user's position within an artificial-reality environment. In other words, the systems and methods disclosed herein use interpreted hand gestures to control locomotion effects. As an example, a head-wearable device can cause adjustments to a representation of a user's position within an artificial-reality application using detected hand gesture. While the head-wearable device displays a representation of a user's position within an artificial-reality environment, in response to receiving an indication that a positional-control activation hand gesture has been performed, the head-wearable device causes the display of a positional-control user interface (UI). The positional-control user interface is overlaid on a portion of the artificial-reality environment and includes a positional-control UI element configured to perform a positional-control action. The head-wearable device, while displaying the positional-control UI, in response to receiving an indication that the positional-control UI element has been selected (e.g., via a positional-control input hand gesture), causes a change in the representation of the user's position within the artificial-reality environment based on the positional-control action, and displays a changed representation of the user's position within the artificial-reality environment. Thus, in some embodiments, a user is able to control locomotion effects using only in-air hand gestures and without having to also operate a complicated sequence of menus or other control options, such as can be the case with certain types of physical controller devices.

The head-wearable devices, and methods of use described herein allow a user to control their position within an artificial-reality environment using one or more hand gesture. In particular, the disclosed head-wearable devices and methods provide useful tools that allow the user to navigate an artificial-reality environment. The head-wearable devices, and methods of use thereof described herein use hand gestures (e.g., ones that can be detected using cameras of a head-wearable device and that do not require use of a physical controller) to allow for controlling locomotion (e.g., movement of a character within an artificial-reality space, including movement within a certain space and movement to other spaces such as via teleportation). The head-wearable devices, and methods of use thereof described herein, expand on the user's ability to provide user inputs through the use of layered interactions. The layered interactions allow a user to control locomotion and/or teleportation functions. In some embodiments, the layered interactions can involve multiple hand gestures, such as a (hand) pinch gesture to activate a locomotion-control interface, another hand gesture to select a locomotion-control action from the locomotion-control interface, and then an additional hand gesture to control actions such as crouching or jumping.

In some embodiments, the layered interactions are provided via one or more positional-control user interfaces. In some embodiments, the user can alternate between different positional-control user interfaces through the use of hand gestures. Each positional-control user interface can include one or more positional-control UI elements associated with respective positional-control actions. Additionally, in some embodiments, each hand is associated with respective positional-control user interfaces such that the user can perform one or more distinct commands with each hand. The positional-control user interfaces reduce the number of inputs required by a user to move within an artificial-reality environment. Further, the positional-control user interfaces reduce the amount of information that needs to be displayed to a user by providing multiple user interfaces that a user can alternate between to perform a desired action. Additional examples are explained in further detail below.

BRIEF DESCRIPTION OF THE DRAWINGS

A more particular description may be had by reference to the features of various embodiments, some of which are illustrated in the appended drawings. The appended drawings illustrate pertinent example features of the present disclosure. The description may admit to other effective features as the person of skill in this art will appreciate upon reading this disclosure.

FIG. 3 illustrates additional example positional-control user interfaces (particularly ones for use with teleportation actions), in accordance with some embodiments.

FIGS. 7A-7D illustrate examples of automatically repeated snap turns to change the representation of the user's position within the artificial-reality environment, in accordance with some embodiments.

FIGS. 11A-11D-2 illustrate example artificial-reality systems, in accordance with some embodiments.

FIGS. 14A-14B illustrate an example handheld intermediary processing device, in accordance with some embodiments.

In accordance with common practice, like reference numerals may be used to denote like features throughout the specification and figures.

DETAILED DESCRIPTION

Figure 1A:
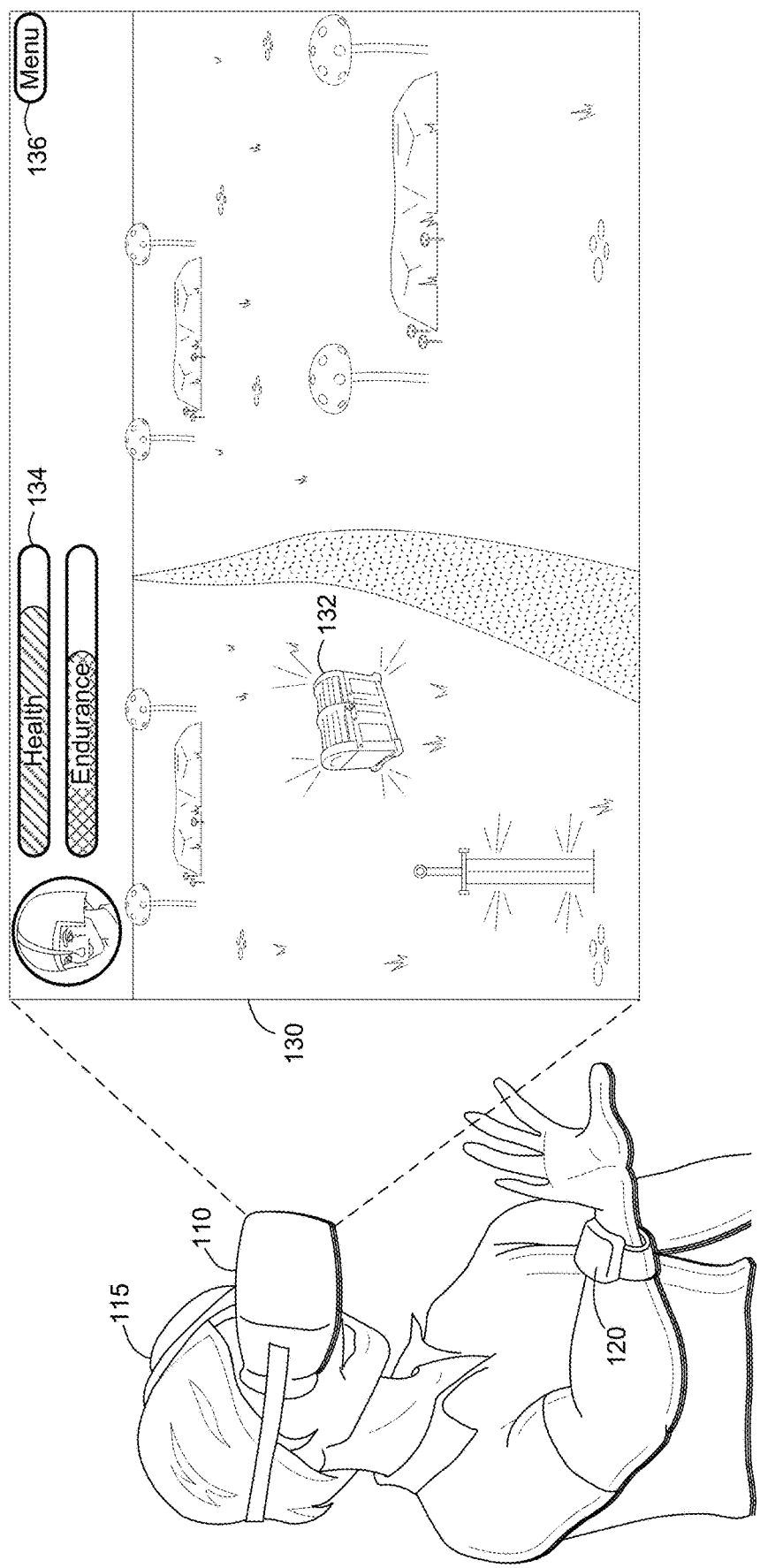
FIGS. 1A-1D illustrate an example of adjustments to a representation of a user's position within an artificial-reality application using a hand gesture, in accordance with some embodiments.

Numerous details are described herein to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not necessarily been described in exhaustive detail so as to avoid obscuring pertinent aspects of the embodiments described herein.

Embodiments of this disclosure can include or be implemented in conjunction with various types or embodiments of artificial-reality systems. Artificial-reality (AR), as described herein, is any superimposed functionality and or sensory-detectable presentation provided by an artificial-reality system within a user's physical surroundings. Such artificial-realities can include and/or represent virtual reality (VR), augmented reality, mixed artificial-reality (MAR), or some combination and/or variation one of these. For example, a user can perform a swiping in-air hand gesture to cause a song to be skipped by a song-providing API providing playback at, for example, a home speaker. An AR environment, as described herein, includes, but is not limited to, VR environments (including non-immersive, semi-immersive, and fully immersive VR environments); augmented-reality environments (including marker-based augmented-reality environments, markerless augmented-reality environments, location-based augmented-reality environments, and projection-based augmented-reality environments); hybrid reality; and other types of mixed-reality environments.

Artificial-reality content can include completely generated content or generated content combined with captured (e.g., real-world) content. The artificial-reality content can include video, audio, haptic events, or some combination thereof, any of which can be presented in a single channel or in multiple channels (such as stereo video that produces a three-dimensional effect to a viewer). Additionally, in some embodiments, artificial reality can also be associated with applications, products, accessories, services, or some combination thereof, which are used, for example, to create content in an artificial reality and/or are otherwise used in (e.g., to perform activities in) an artificial reality.

A hand gesture, as described herein, can include an in-air gesture, a surface-contact gesture, and or other gestures that can be detected and determined based on movements of a single hand (e.g., a one-handed gesture performed with a user's hand that is detected by one or more sensors of a wearable device (e.g., electromyography (EMG) and/or inertial measurement units (IMU)s of a wrist-wearable device) and/or detected via image data captured by an imaging device of a wearable device (e.g., a camera of a head-wearable device)) or a combination of the user's hands. In-air means, in some embodiments, that the user hand does not contact a surface, object, or portion of an electronic device (e.g., a head-wearable device or other communicatively coupled device, such as the wrist-wearable device), in other words the gesture is performed in open air in 3D space and without contacting a surface, an object, or an electronic device. Surface-contact gestures (contacts at a surface, object, body part of the user, or electronic device) more generally are also contemplated in which a contact (or an intention to contact) is detected at a surface (e.g., a single or double finger tap on a table, on a user's hand or another finger, on the user's leg, a couch, a steering wheel, etc.). The different hand gestures disclosed herein can be detected using image data and/or sensor data (e.g., neuromuscular signals sensed by one or more biopotential sensors (e.g., EMG sensors) or other types of data from other sensors, such as proximity sensors, time-of-flight sensors, sensors of an inertial measurement unit, etc.) detected by a wearable device worn by the user and/or other electronic devices in the user's possession (e.g., smartphones, laptops, imaging devices, intermediary devices, and/or other devices described herein).

FIGS. 1A-1D illustrate example adjustments to a representation of a user's position within an artificial-reality application using a hand gesture, in accordance with some embodiments. The AR application can be operated by a head-wearable device 110, or the head-wearable device 110 communicatively coupled with at least one other device (e.g., a wrist-wearable device 120, a controller, and/or an intermediary device such as, a smartphone, a table, laptop, credit-card-sized computer, portable computing unit, etc.). The AR application can facilitate AR activities (e.g., social gatherings, communications, navigation, etc.), AR games, etc. The AR application can cause the head-wearable device 110 to present, via a display 1335A (FIG. 13C), an AR environment 130 including one or more virtual objects 132, user interface (UI) indicators 134, UI elements 136, and/or representations of a user 115 or other users of the AR application (one example representation of a user is shown in the upper left corner of FIG. 1A showing the AR application view, but other representations are also contemplated including ones within the gaming area of the AR application view and not above it). In some embodiments, the AR application facilitates a VR environment that includes a virtual-reality scene that encompasses substantially all, or at least a significant portion of the field of view of the user 115, displayed at the head-wearable device 110. In some embodiments, the user 115 interacts with the AR application via one or more detected user inputs as discussed below.

Figure 13A:
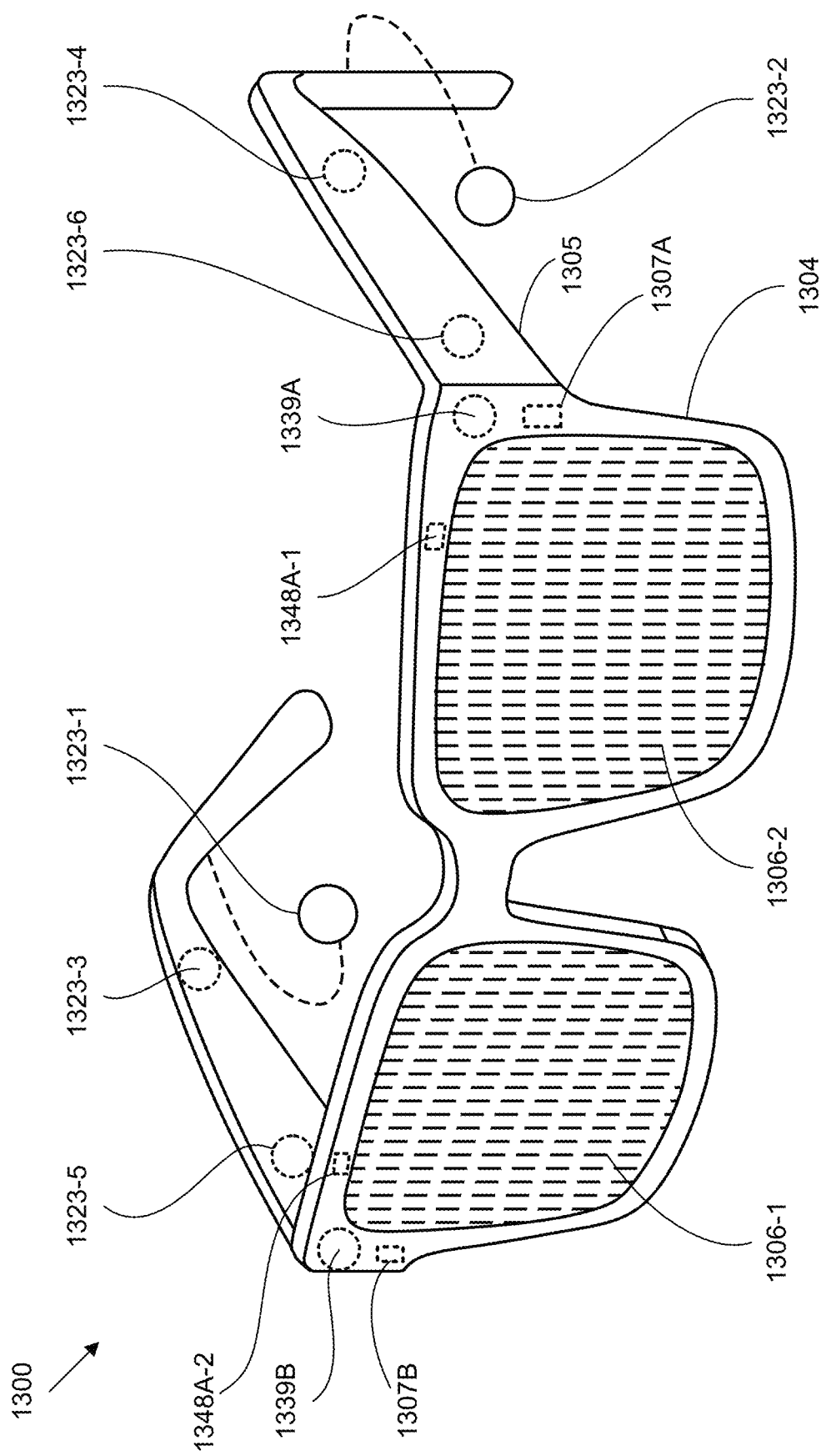
FIGS. 13A-13C illustrate example head-wearable devices, in accordance with some embodiments.
Figures 1, 13B:
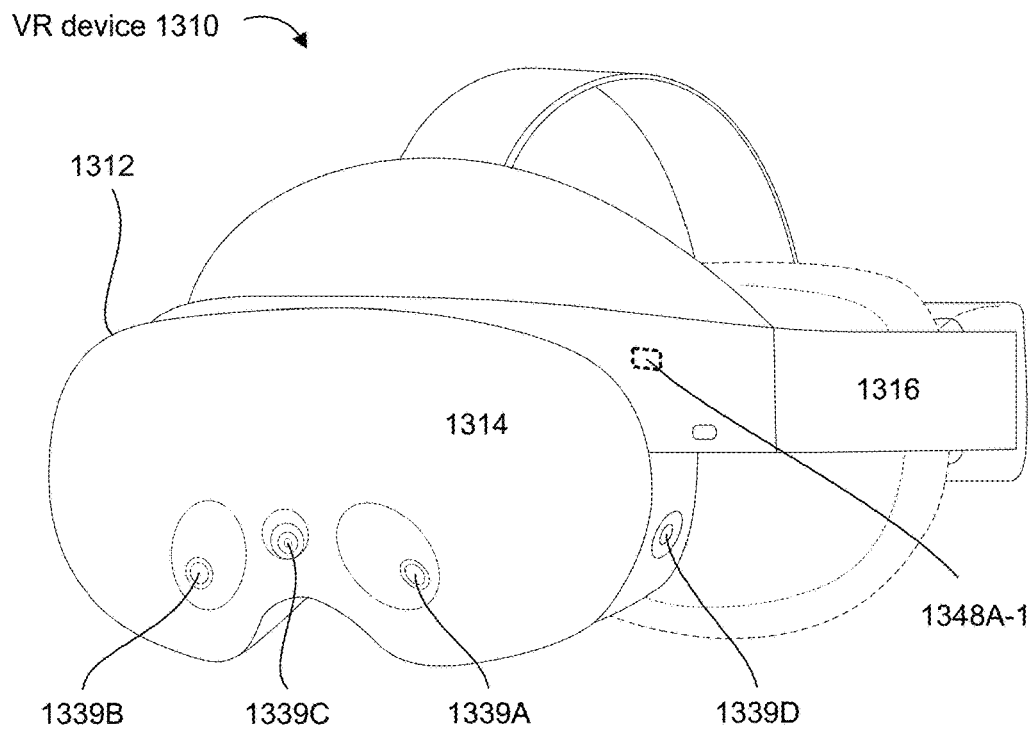
Figures 2, 13B:
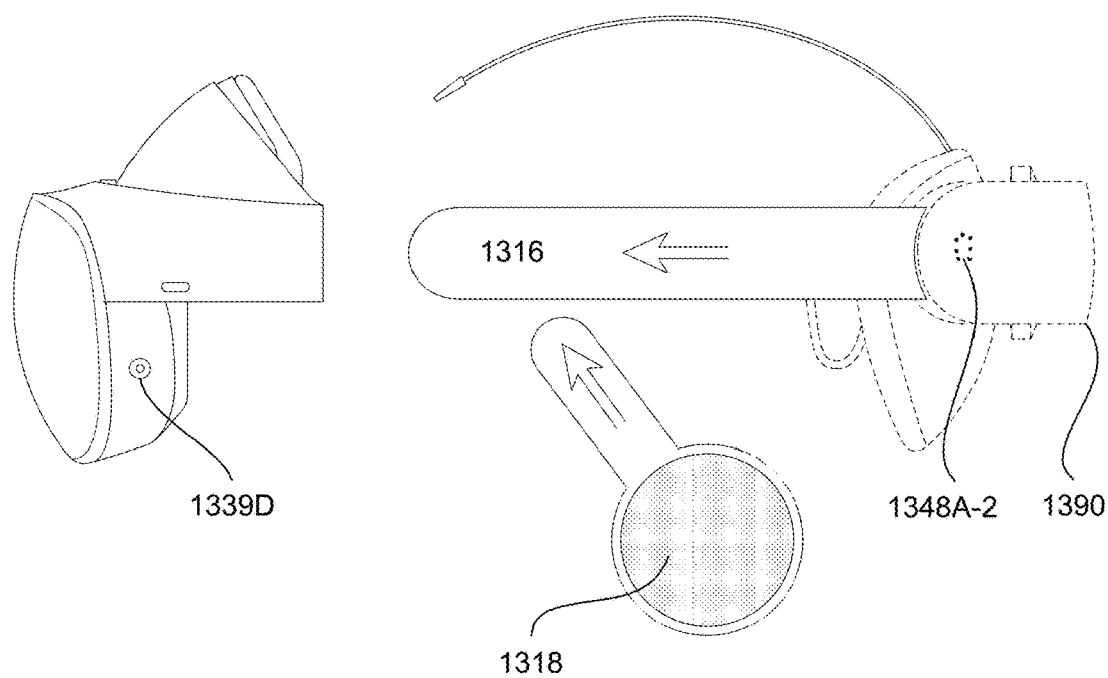
FIG. 2 illustrates example positional-control user interfaces, in accordance with some embodiments.
Figure 13C:
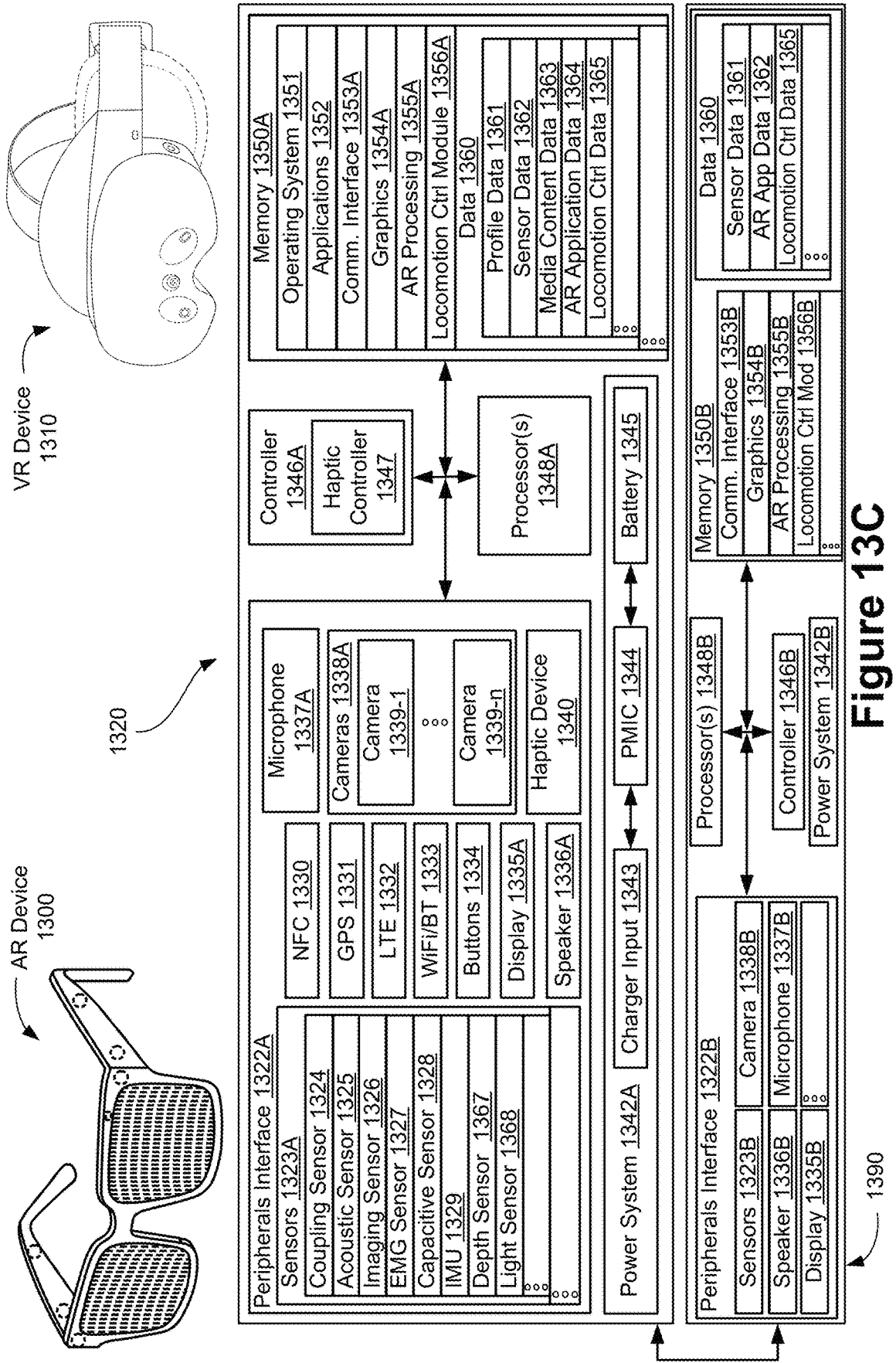
Figure 14B:
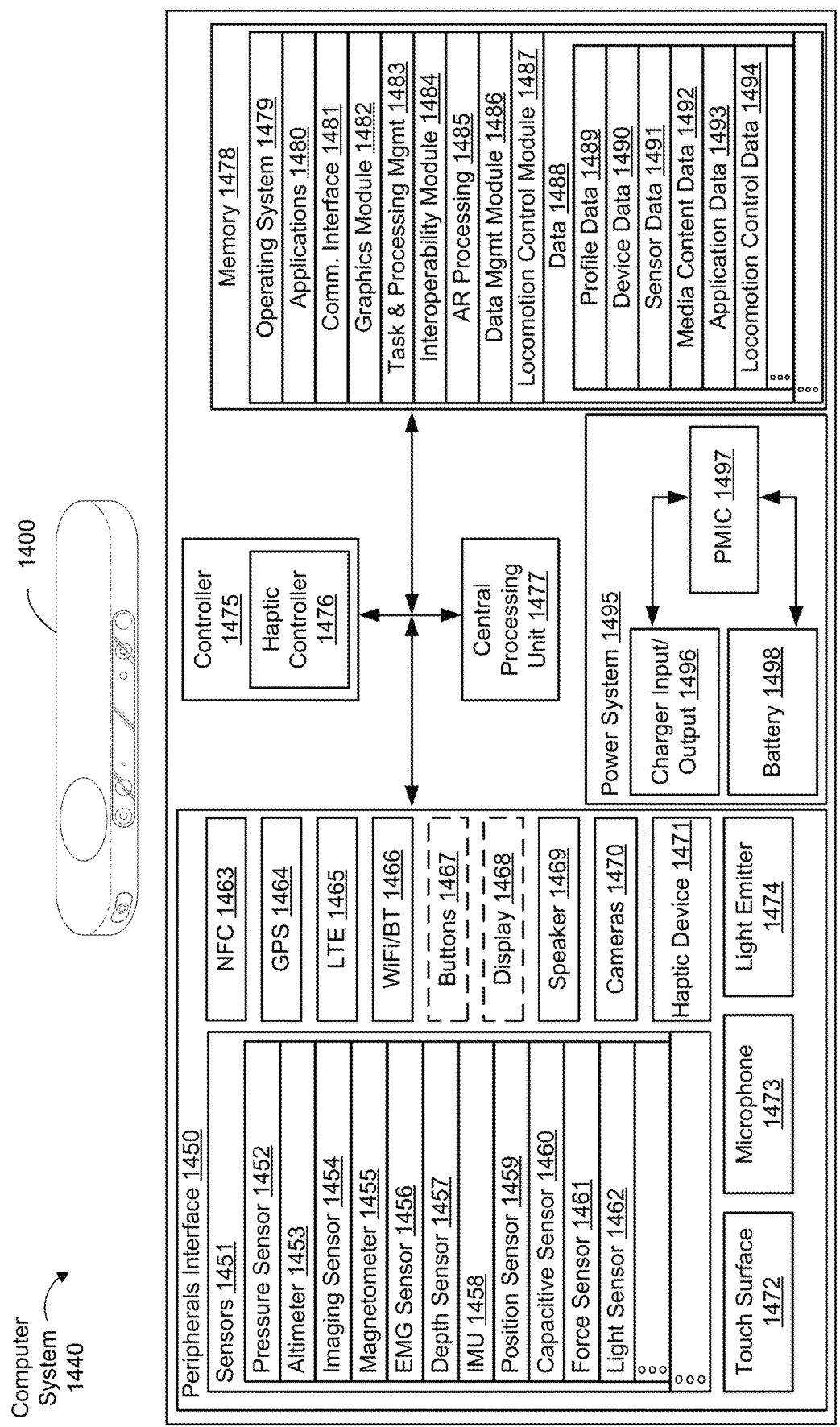

The head-wearable device 110 includes, with reference to FIGS. 13A-13C, one or more imaging devices (e.g., cameras 1338A), microphones 1337A, speakers 1336A, displays 1335A (e.g., a heads-up display, a built-in or integrated monitor or screen, a projector, and/or similar device), sensors 1323A (e.g., inertial measurement units (IMU)s, biometric sensors, position sensors, EMG sensors, and/or any other sensors), and/or one or more processors 1348. In some embodiments, the one or more components of the head-wearable device 110 described above are coupled with the housing and/or lenses of the head-wearable device 110. In some embodiments, the head-wearable device 110 is a pair of smart glasses, AR goggles (with or without a heads-up display), AR glasses (with or without a heads-up display), other head-mounted displays. The head-wearable device 110 is configured to capture image data via an imaging device (also referred to as an imaging sensor or camera) and/or present a representation of the image data via the display 1335A. In some embodiments, the display 1335A is coupled with one or both of the lenses of the head-wearable device 110. In some embodiments, image data presented by the display 1335A is presented in conjunction with the field of view of the user 115. Alternatively or additionally, in some embodiments, the image data is overlayed over a portion of the field of view of the user 115 (e.g., as an overlay over one or more real-world objects or the physical environment). In addition, in some embodiments, the head-wearable device 110 is configured to capture audio data via a microphone 1337A and/or present a representation of the audio data via speakers 1336A. The head-wearable device 110 can communicatively couple with one or more of a wrist-wearable device 120, portable computing unit (e.g., an handheld intermediary processing device 1400; FIGS. 14A and 14B), and/or other electronic device (e.g., via a Bluetooth connection between the two or more respective devices, and/or the two or more respective devices can also be connected to another intermediary device such as a smartphone that provides instructions and data to and between the two devices).

Figure 11A:
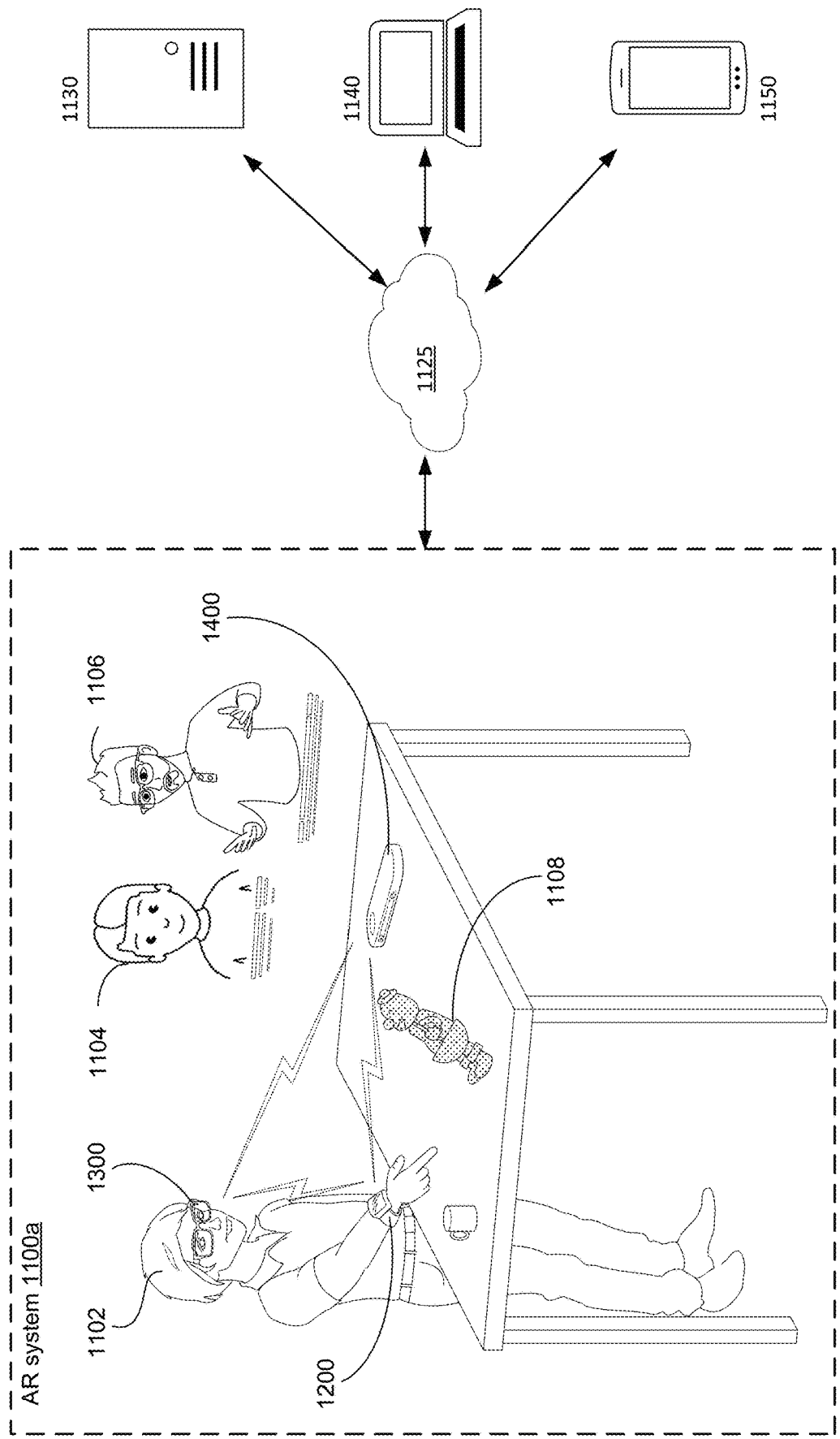
Figure 11B:
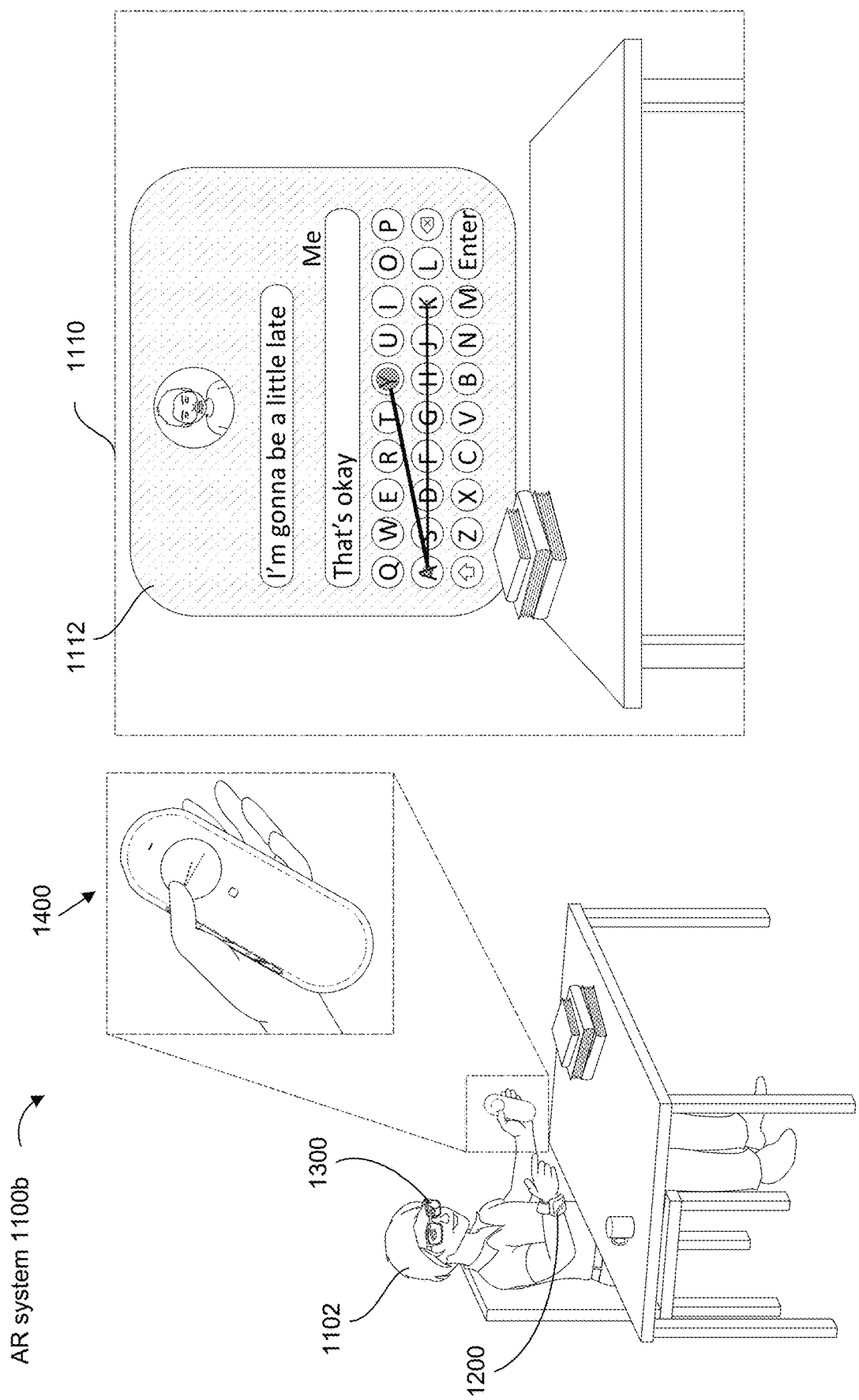
Figures 1, 11C:
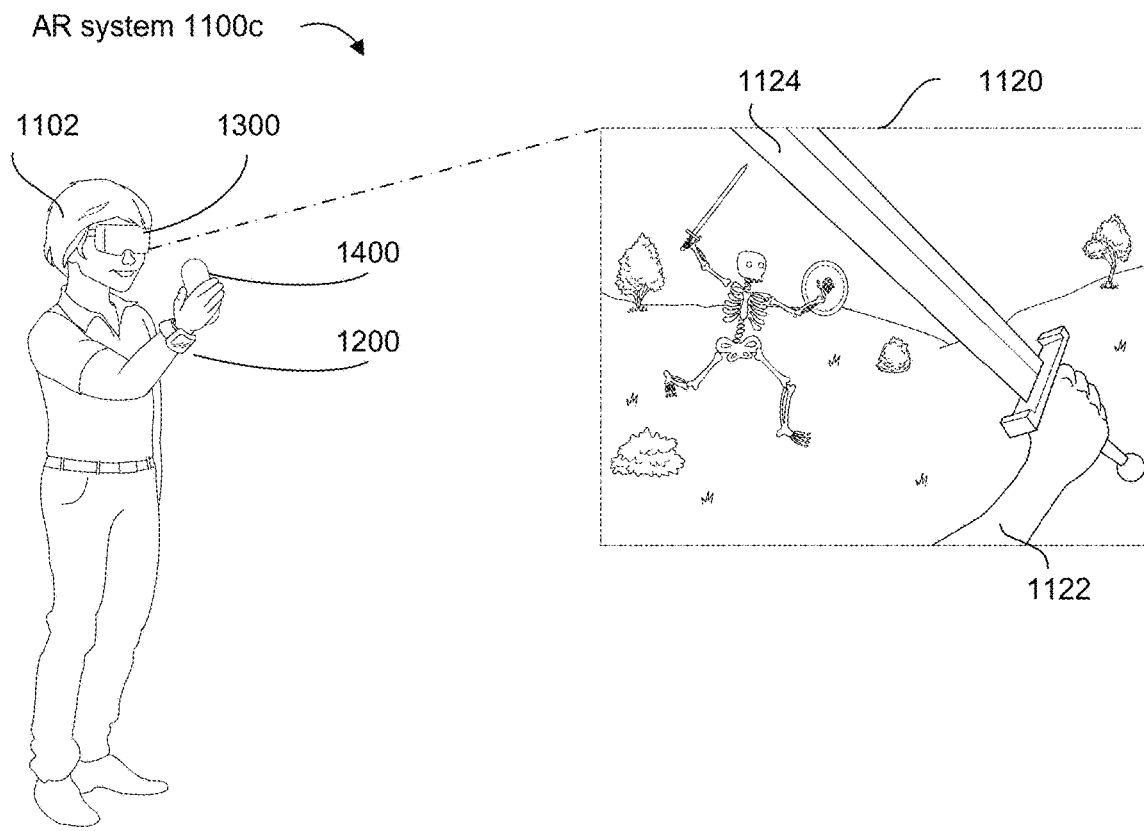
Figures 2, 11C:
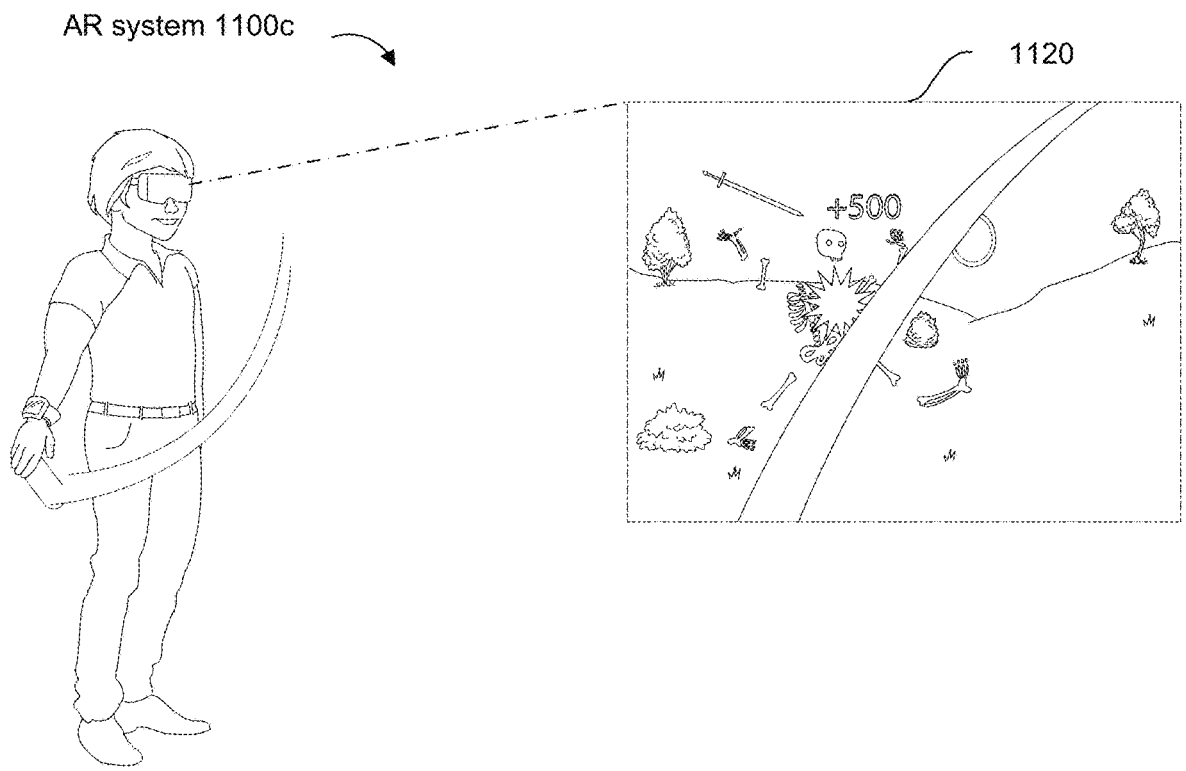
Figures 1, 11D:
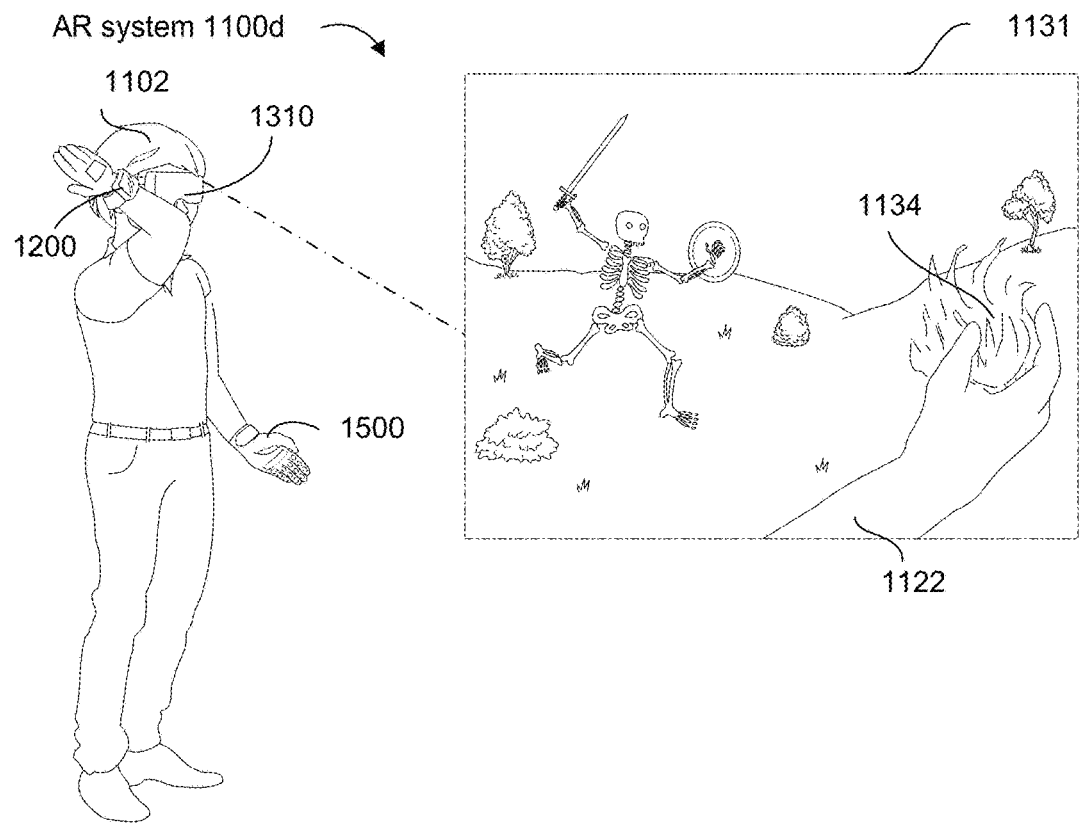
Figures 2, 11D:
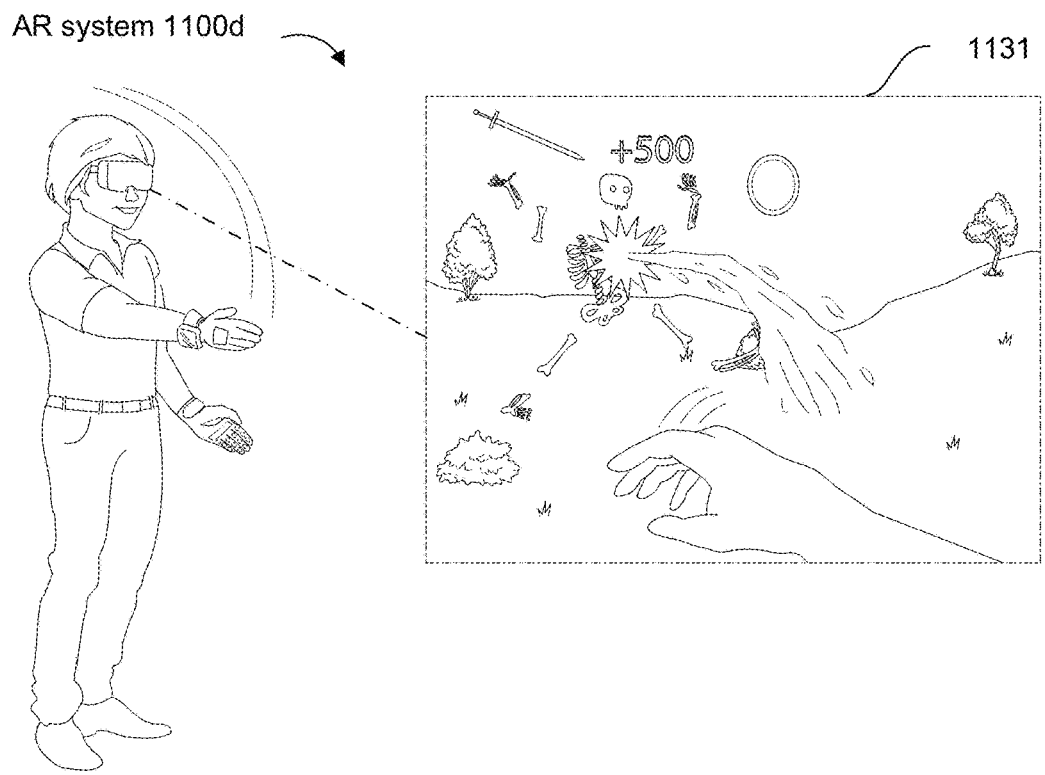
Figure 12A:
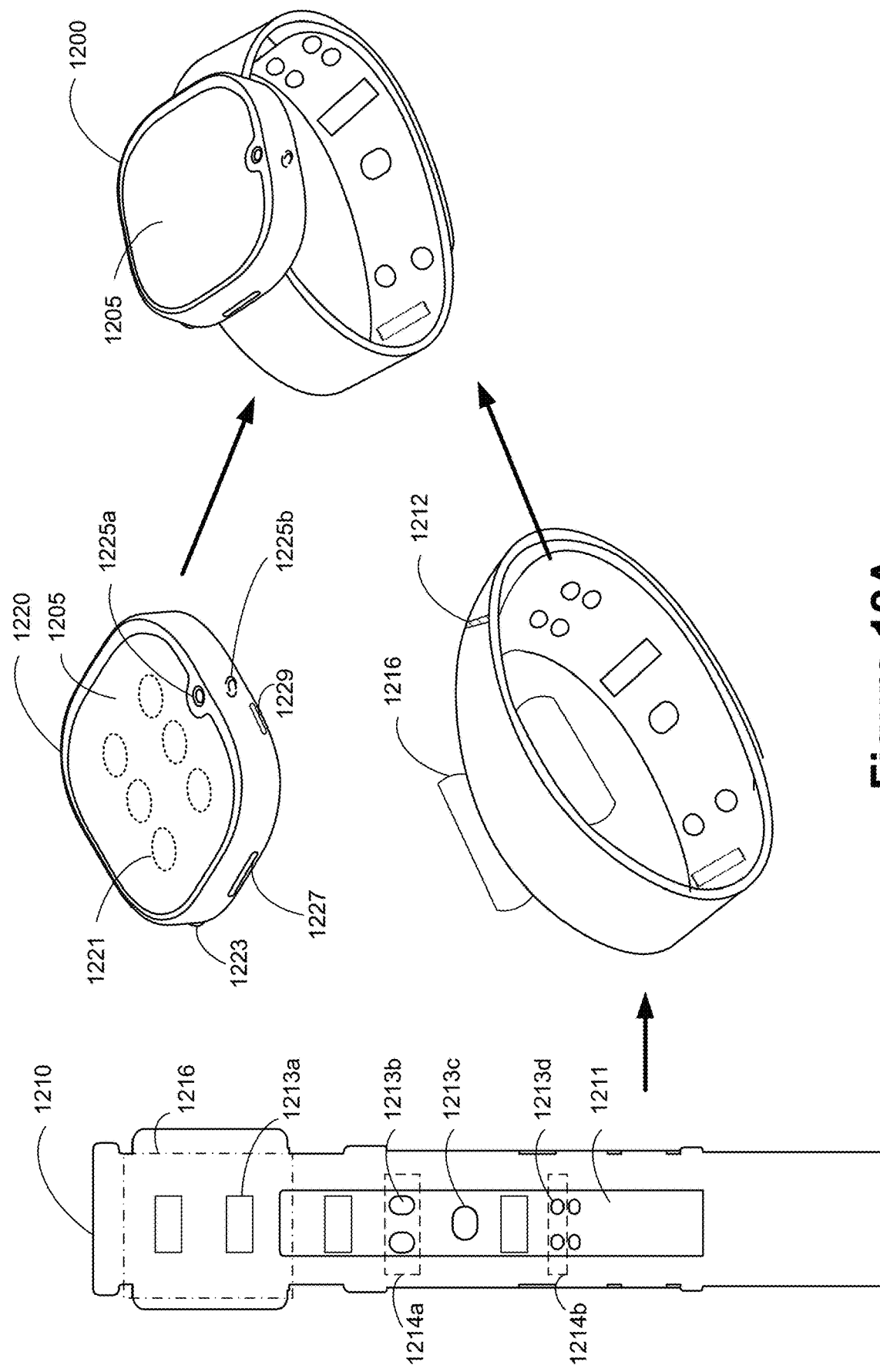
FIGS. 12A-12B illustrate an example wrist-wearable device, in accordance with some embodiments.
Figure 12B:
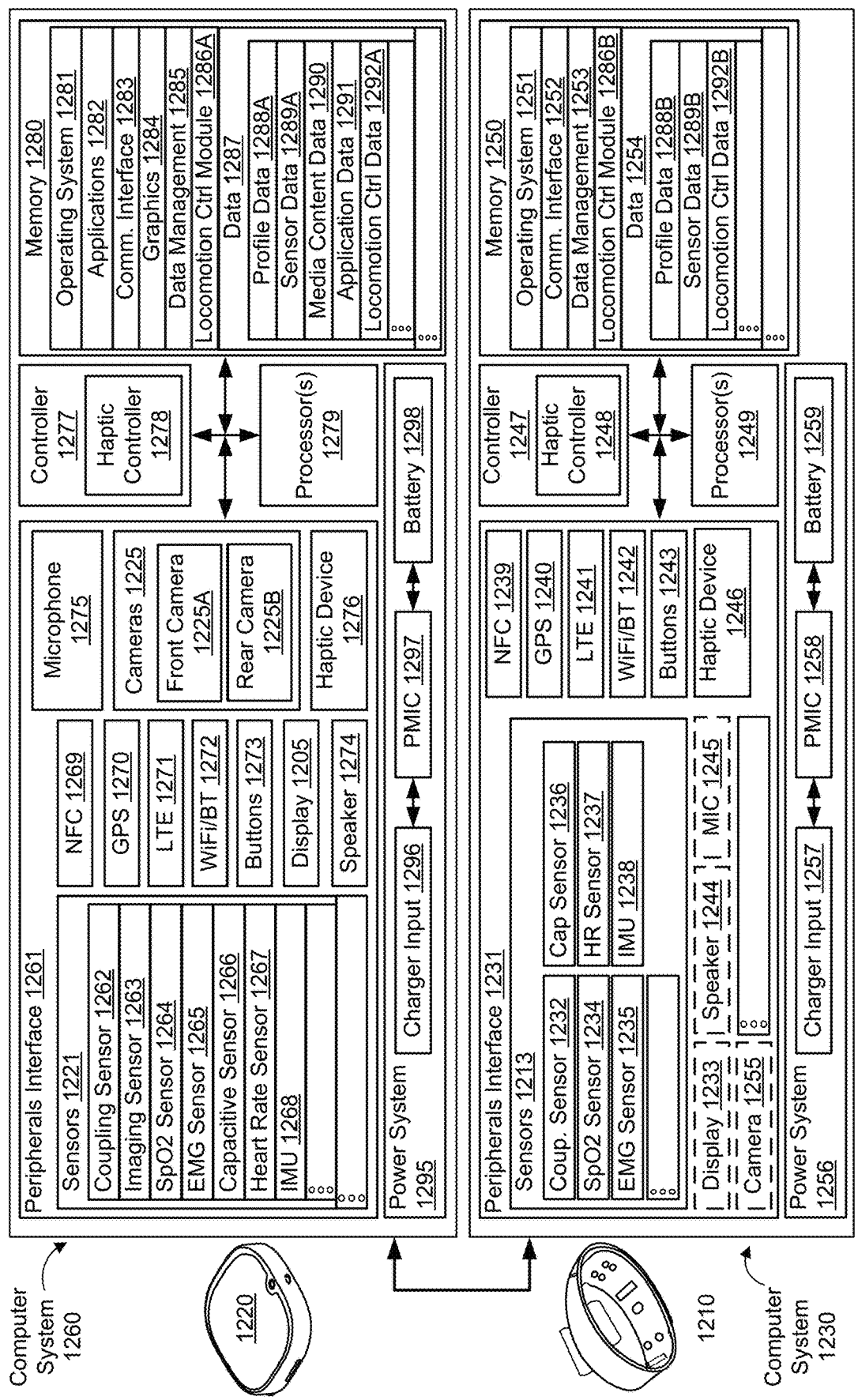

In some embodiments, the wrist-wearable device 120 includes, with reference to FIGS. 12A and 12B, one or more displays 1205 (e.g., such as a touch screen), speakers 1274, microphones 1275, and sensors 1221, and/or one or more processors 1279. In some embodiments, the one or more components of the wrist-wearable device 120 described above are coupled with a wrist-wearable structure (e.g., a band portion) of the wrist-wearable device 120, housed within a capsule portion of the wrist-wearable device 120, or a combination of the wrist-wearable structure and the capsule portion. As described above, in some embodiments, the wrist-wearable device 120 is communicatively coupled with the head-wearable device 110 (e.g., by way of a Bluetooth connection between the two devices). In some embodiments, the wrist-wearable device 120 and the head-wearable device 110 are communicatively coupled via an intermediary device, such as a handheld intermediary processing device 1400 (FIGS. 14A and 14B) and/or other electronic device (e.g., a server 1130, a computer 1140, a smartphone 1150 and/or other devices described below in reference to FIGS. 11A-11D-2) that are configured to control the wrist-wearable and head-wearable devices 120 and 110.

As shown in FIG. 1A, while operating an AR application, the head-wearable device 110 can display an AR environment 130 and a representation of a user's position within the AR environment 130. The representation of the user's position within the AR environment 130 can include a portion of the AR environment 130, such as a user's field of view within the AR environment 130. For example, the AR application can be an AR game and the head-wearable device 110 can present a field of view of the user's avatar within the AR game. The user's avatar (or a portion of that avatar, such as just the arms of the avatar and a portion of the feet of the avatar; it should be understood that an avatar is just one example and other representations of the user are also contemplated) being at a particular position within the AR environment 130 (e.g., the representation of the user's position within AR environment 130).

Figure 1B:
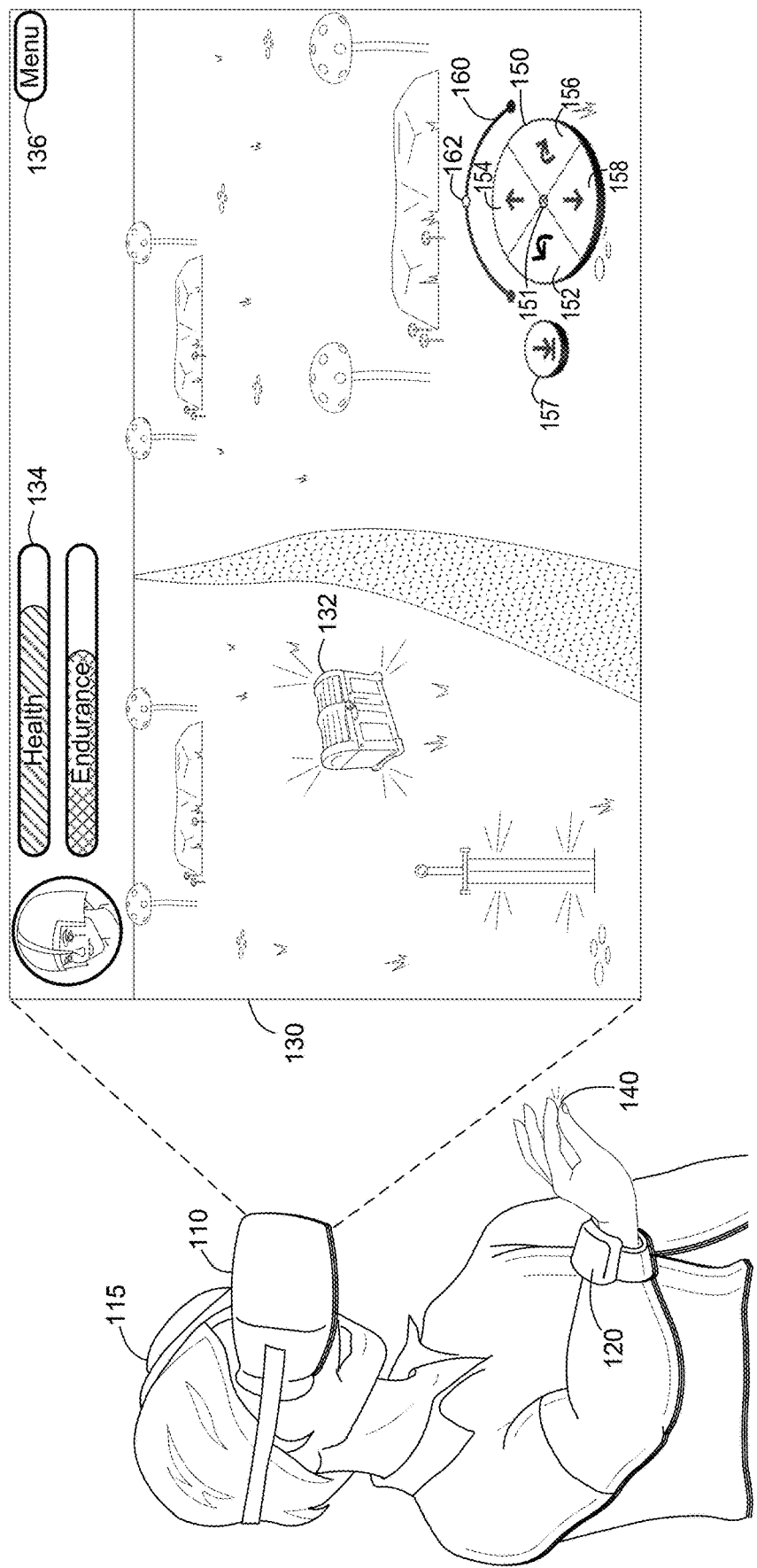

Turning to FIG. 1B, in some embodiments, while the head-wearable device 110 (which in this example is a virtual-reality headset) displays the representation of the user's position within the AR environment 130 (e.g., the user's field of view), the head-wearable device 110 can receive an indication (e.g., from a wrist-wearable device that can be configured to detect in-air hand gestures or from an intermediary device facilitating interactions between the wrist-wearable device and the head-wearable device, and/or the head-wearable device can detect and process gestures, such as in-air hand gestures, on its own or in conjunction with the wrist-wearable device) that a positional-control activation hand gesture has been performed (e.g., an in-air hand gesture, such as a pinch gesture 140 in which a user's thumb makes contact with a distal portion of the user's index finger in the example depicted in FIG. 1B). The head-wearable device 110, in response to receiving the indication that the positional-control activation hand gesture has been performed, displays a positional-control user interface (UI) 150 overlaid on a portion of the AR environment 130. The positional-control activation hand gesture is performed in-air and does not require the user 115 to contact a physical controller or other device communicatively coupled with the head-wearable device 110.

The positional-control UI 150 can include a tracking element 151 that is configured to track the user 115's hand movement with respect to the positional-control UI 150. For example, when the indication that the positional-control activation hand gesture is first performed and the positional-control UI 150 is displayed, the tracking element 151 is displayed at the center of the positional-control UI 150 (e.g., in some embodiments, the initial in-air hand gesture that brings up the positional-control UI 150 can be used to determine a center point at which the element 151 should be displayed such that the initial in-air hand gesture can be performed with different rotational positions of the user's wrist or hand, which can result in different movements to adjust the element 151 as the hand moves away from its position when the initial in-air hand gesture was performed). As the user's hand moves forward, backward, left, and/or right in free space (e.g., away from its initial position as discussed in the preceding sentence), the tracking element 151 moves accordingly within the positional-control UI 150, as shown below in reference to FIG. 1C.

In some embodiments, the positional-control UI 150 includes one or more positional-control UI elements 152 through 158. Each of the one or more positional-control UI elements 152 through 158 is configured to perform a positional-control action within the AR environment 130. In some embodiments, each of the one or more positional-control UI elements 152 through 158 forms a portion of the positional-control UI 150. In some embodiments, the one or more positional-control UI elements 152 through 158 are continuous segments of the positional-control UI 150. For example, a first positional-control UI element 152 is adjacent to second and fourth positional-control UI elements 154 and 158, the second positional-control UI element 154 is adjacent to first and third positional-control UI elements 152 and 156, the third positional-control UI element 156 is adjacent to second and fourth positional-control UI elements 154 and 158, and the fourth positional-control UI element 158 is adjacent to first and third positional-control UI elements 152 and 156. The one or more positional-control UI elements can be selected via one or more performed in-air (e.g., the user 115 does not need to contact a physical controller or other device communicatively coupled with the head-wearable device 110 to select positional-control UI element). The positional-control actions, which are discussed in detail below in reference to FIGS. 2-8, can be any of a number of different locomotion-control actions, including one or more of teleportation (e.g., instantaneous position jumps), continuous movement (e.g., a walk, a jog, a run, a backpedal, etc.), directional movement (e.g., a slide, a strafe, a turn, etc.), perspective changes (or snap views), etc.

In some embodiments, the head-wearable device 110 displays, in conjunction with the positional-control UI 150, one or more additional positional-control UI elements (e.g., additional positional-control UI element 157). The one or more additional positional-control UI elements are adjacent to the positional-control UI 150 and are configured to perform at least one an additional positional-control action. For example, the one or more additional positional-control UI elements can be configured to initiate a jump, a crouch, a targeted teleportation, etc. Additional examples of the additional positional-control actions are provided below in reference to FIGS. 2-8.

Additionally, in some embodiments, the head-wearable device 110 displays, in conjunction with the positional-control UI 150, a navigation UI element 160 overlaid on a portion of the AR environment 130 adjacent to the positional-control UI 150. The navigation UI element 160 is configured to display a representation of the user's hand movements with respect to the positional-control UI. In some embodiments, the navigation UI element 160 includes a turn UI element 162 that is configured to move along the navigation UI element 160 based on the user's hand movements as described below in reference to FIG. 1C.

In some embodiments, the positional-control UI 150, the one or more additional positional-control UI elements, and/or the navigation UI element 160 are displayed at initial positions within the AR environment 130. The initial positions of the positional-control UI 150 and the navigation UI element 160 are based on a location of a representation of the user's hand is within the AR environment 130 when the positional-control input hand gesture (e.g., pinch gesture 140) is detected, as was briefly mentioned above.

The positional-control input hand gesture (and other hand gestures) can be an in-air gesture, a surface-contact gesture, and or other gestures that can be detected and determined based on movements of a single hand. Thus, while the primary example herein is an in-air gesture, the disclosure is not limited to those in-air hand gestures (also referred to herein as hand gestures for simplicity), as other gestures that do not contact the head-wearable device 110 or other communicatively coupled device are also contemplated, including the surface-contact gestures described above. Further, hand gestures can be associated with one or more commands other than a position-control gesture, such as other application-control gestures (e.g., gestures used to control or provide one or more inputs at an application, such as navigating an application UI, controlling and/or interacting with an virtual object; a user avatar; and/or other users of the application; etc.) or device-control gestures (e.g., gestures used to control or provide one or more inputs at an electronic device, such as navigating a device UI, controlling an imaging device, activating a speaker, etc.).

In some embodiments, the head-wearable device 110 is configured to detect and determine hand gestures (e.g., in-air hand gesture, surface-contact gestures, etc.) performed by the user 115. The hand gestures can be detected and determined based on image data obtained by one or more imaging devices (e.g., cameras 1338A) of the head-wearable device 110 and/or sensor data obtained by one or more sensors 1323A of the head-wearable device 110. Alternatively or in addition, in some embodiments, the wrist-wearable device 120 and/or an intermediary device is configured to detect and determine hand gestures performed by the user 115. For example, the wrist-wearable device 120 can use one or more sensors 1221 to obtain sensor data (e.g., EMG sensor data and/or IMU data) that is used to detect and determine hand gestures performed by the user 115. The hand gestures, when detected and determined as a respective command by one or more processors (e.g., processors 1279 and/or 1348; FIGS. 12A-13C), are configured to cause an action to be performed at a computing device, such as the head-wearable device 110, wrist-wearable device 120, or other device described below in reference to FIGS. 11A-11D-2. For example, when the head-wearable device 110 determines that a positional-control input hand gesture is performed, the head-wearable device 110 can cause an associated positional-control action to be performed as discussed in detail below. Although FIGS. 1A-1G illustrate hand gestures detected and determined by a user 115 wearing a head-wearable device 110 and a wrist-wearable device 120, hand gestures can be detected and determined by each device independently, jointly, and/or using an intermediary device. In some embodiments, the wrist-wearable device 120 and/or the intermediary device are optional.

While many of the examples discussed herein relate to in-air hand gestures performed without the use of a physical controller, a skilled artisan will understand upon reading this disclosure that, in certain instances, AR environments can be controlled exclusively using in-air hand gestures, but also that, in other embodiments or circumstances, physical controllers can be used in addition to using in-air hand gestures (e.g., a physical controller can be placed down or left hanging from the user's wrist as in-air hand gestures are performed). In some embodiments, the in-air hand gestures can increase or improves the user's ability to interact in the AR environments by providing additional inputs to control their representation within the AR environments (e.g., enabling a user to provide additional positional-control actions or other control actions that are not available via a physical controller).

Figure 1C:
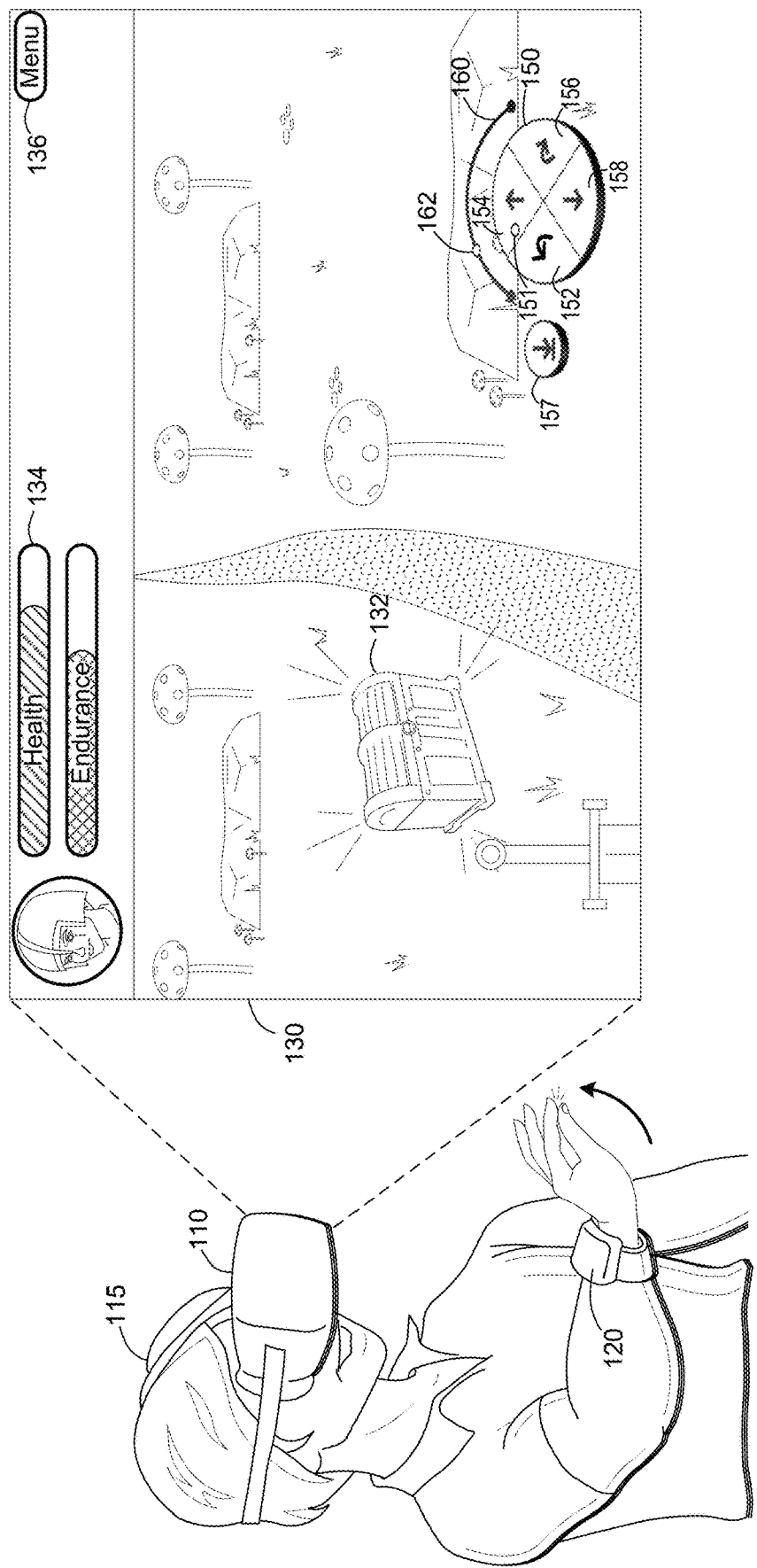

In FIG. 1C, the head-wearable device 110 receives an indication that at least one positional-control UI element has been selected. While the head-wearable device 110 displays the positional-control UI, the head-wearable device 110 can receive an indication that a positional-control UI element has been selected via another positional-control input hand gesture (e.g., an additional pinch gesture, a held pinch hovering over a particular positional-control UI element, a double pinch gesture, a release of a held pinch gesture, etc.). The head-wearable device 110, in response to receiving the indication that the positional-control UI element has been selected (which indication can be received once the user releases the pinch gesture depicted in FIG. 1C), causes a change in the representation of the user's position within the AR environment 130 based on a positional-control action associated with a selected positional-control UI element, and displays a changed representation of the user's position within the AR environment 130. For example, as shown FIG. 1C, the user 115 moves their hand forward and slightly to the left (within the second positional-control UI element 154), which in turn causes the head-wearable device 110 to causes a change in the representation of the user's position within the AR environment 130 accordingly and display a changed representation of the user's position within the AR environment 130 (e.g., forward and slightly to the left). The change in the representation of the user's position within the AR environment 130 can be displayed as a constant change (e.g., a walk, a job, a run, etc.) or a teleportation. Additionally, the positional-control UI 150 shows a representation of a user 115's hand movements via the tracking element 151.

For example, in FIG. 1C, the tracking element 151 moves from a center location (shown in FIG. 1B) to a portion of the second positional-control UI element 154.

Additionally, the navigation UI element 160 and the turn UI element 162 are updated to reflect the user's hand movements as the user's hand moves from left to right. For example, as shown FIG. 1C, the turn UI element 162 moves to the left on the navigation UI element 160 to represent the user 115's hand movement to the left. The navigation UI element 160 and the turn UI element 162 provide the user 115 a quick and intuitive UI for interpreting the current location of their hand within the AR environment 130. The navigation UI element 160 and the turn UI element 162 have the benefit of providing the user 115 with additional information that can be used to deliberately and decisively move their hand to cause the performance of a particular action within the AR application.

Figure 1D:
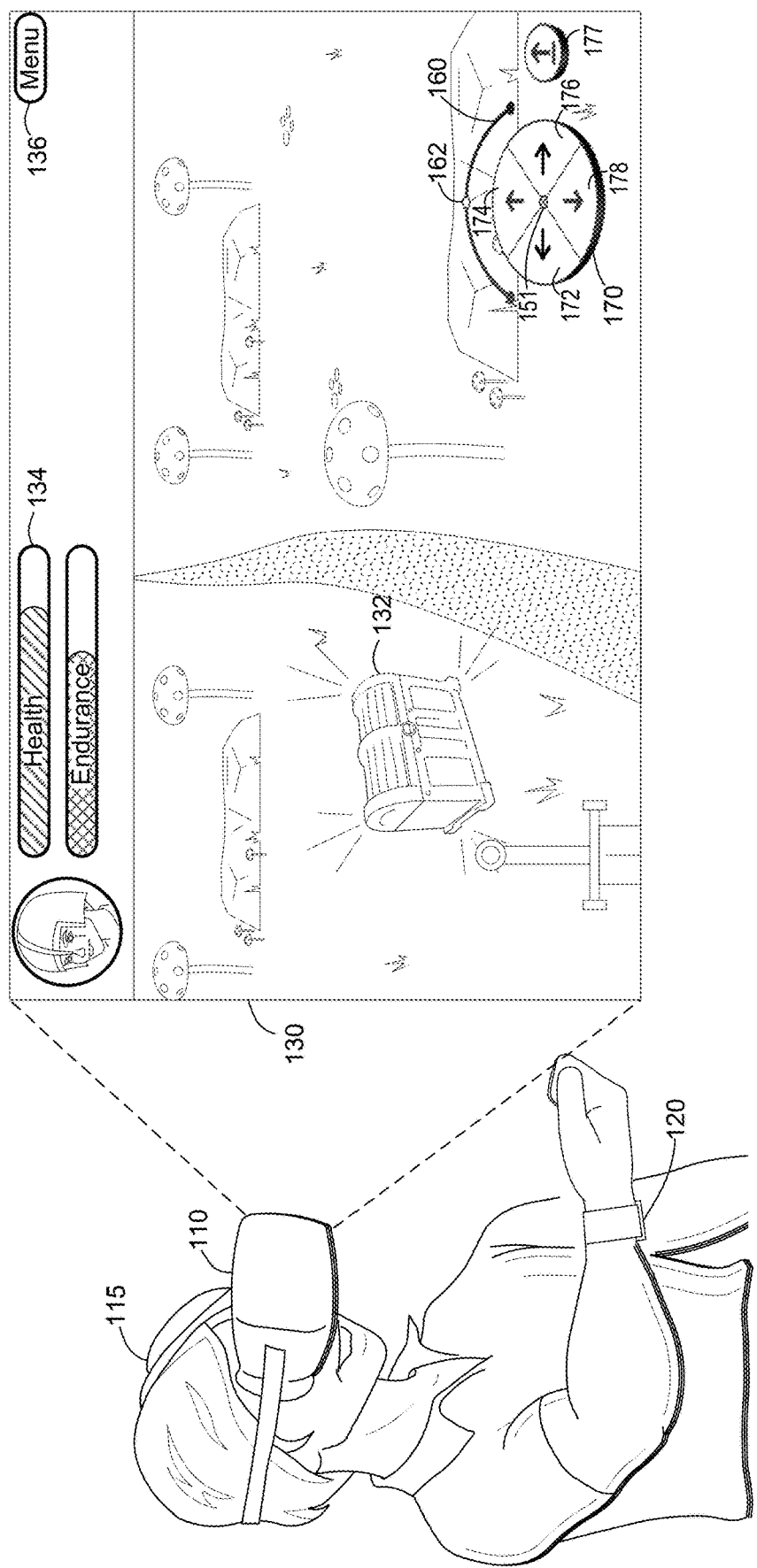

Turning next to FIG. 1D, shown there is the head-wearable device 110 presenting a second positional-control UI 170. While the head-wearable device 110 presents the first positional-control UI 150, the head-wearable device 110 can receive an indication that another positional-control activation hand gesture has been performed (e.g., the user 115 turns their hand palm-side up or 180 degrees from the starting position). The head-wearable device 110, in response to receiving an indication that another positional-control activation hand gesture has been performed ceases to display the first positional-control UI 150, and displays the second positional-control UI 170 overlaid on the portion of the AR environment 130 (e.g., in place of the first positional-control UI 150). The second positional-control UI 170 can include one or more distinct positional-control UI elements configured to perform respective positional-control actions. As described above in FIG. 1B with respect to the first positional-control UI 150, the one or more positional-control UI elements of the second positional-control UI 170 form a portion of the second positional-control UI 170. For example, a fifth positional-control UI element 172 is adjacent to sixth and eighth positional-control UI elements 174 and 178, the sixth positional-control UI element 174 is adjacent to fifth and seventh positional-control UI elements 172 and 176, the seventh positional-control UI element 176 is adjacent to sixth and eight positional-control UI elements 174 and 178, and the eight positional-control UI element 178 is adjacent to fifth and seventh positional-control UI elements 172 and 176. The one or more positional-control UI elements of the second positional-control UI 170 from continuous segments of the second positional-control UI 170.

The head-wearable device 110 can display the navigation UI element 160 and the turn UI element 162 in conjunction with the second positional-control UI 170. Additionally, in some embodiments, the head-wearable device 110 displays, in conjunction with the second positional-control UI 170, one or more additional positional-control UI elements (e.g., additional positional-control UI element 177). The one or more additional positional-control UI elements are adjacent to the second positional-control UI 170 and are configured to perform at least one an additional positional-control action as described above in reference to FIG. 1B.

While the head-wearable device 110 displays the second positional-control UI 170, the head-wearable device 110 can receive an indication that one or more positional-control UI elements are selected. The head-wearable device 110, in response to receiving an indication that a positional-control UI element of the second positional-control UI 170 has been selected causes a change in the representation of the user's position within the AR environment based on the positional-control action associated with the selected positional-control UI element, and displays a changed representation of the user's position within the AR environment 130.

Figure 1E:
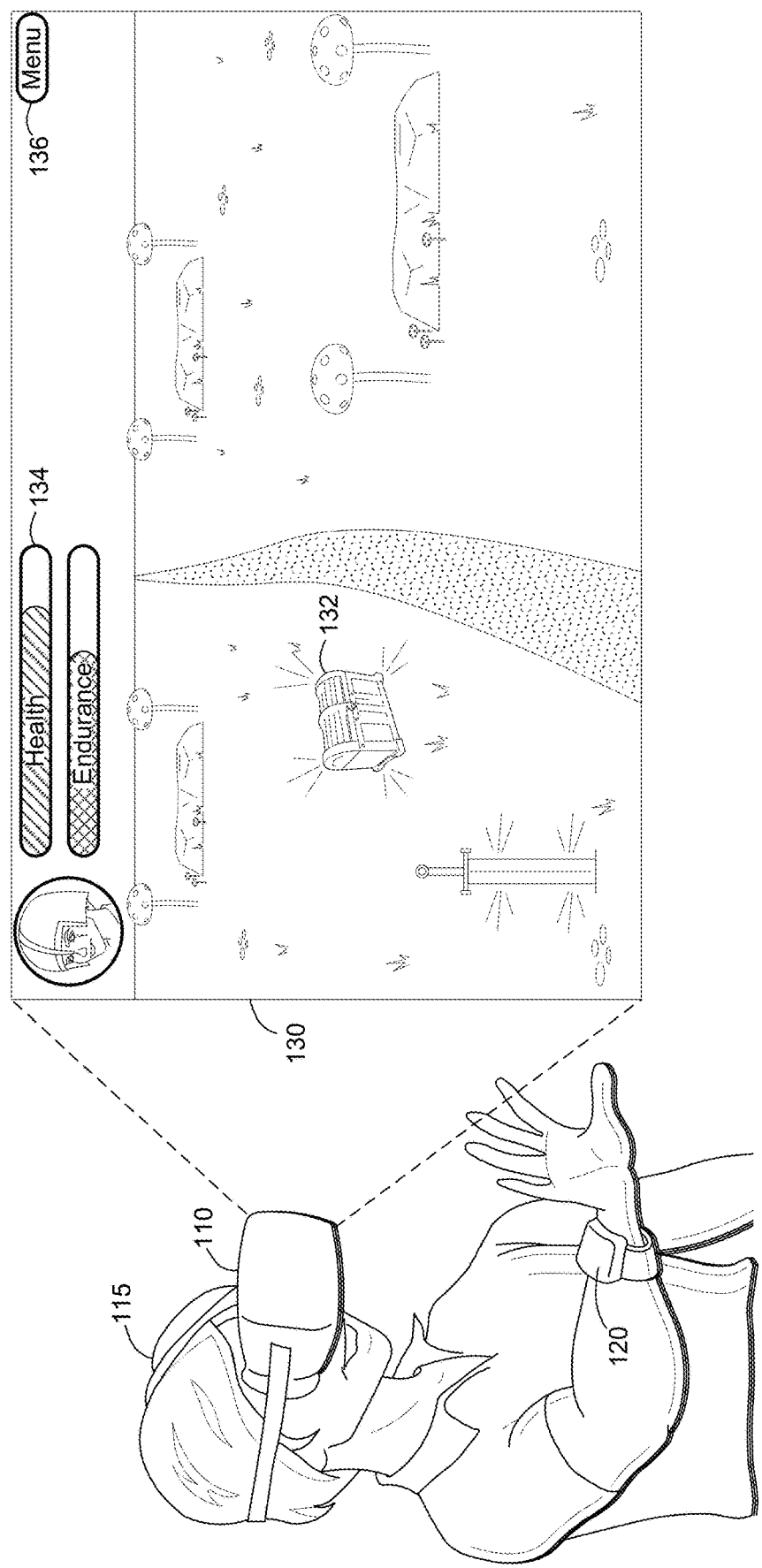
FIGS. 1E-1G illustrate another example of adjustments to a representation of a user's position within an artificial-reality application using a hand gesture, in accordance with some embodiments.
Figure 1F:
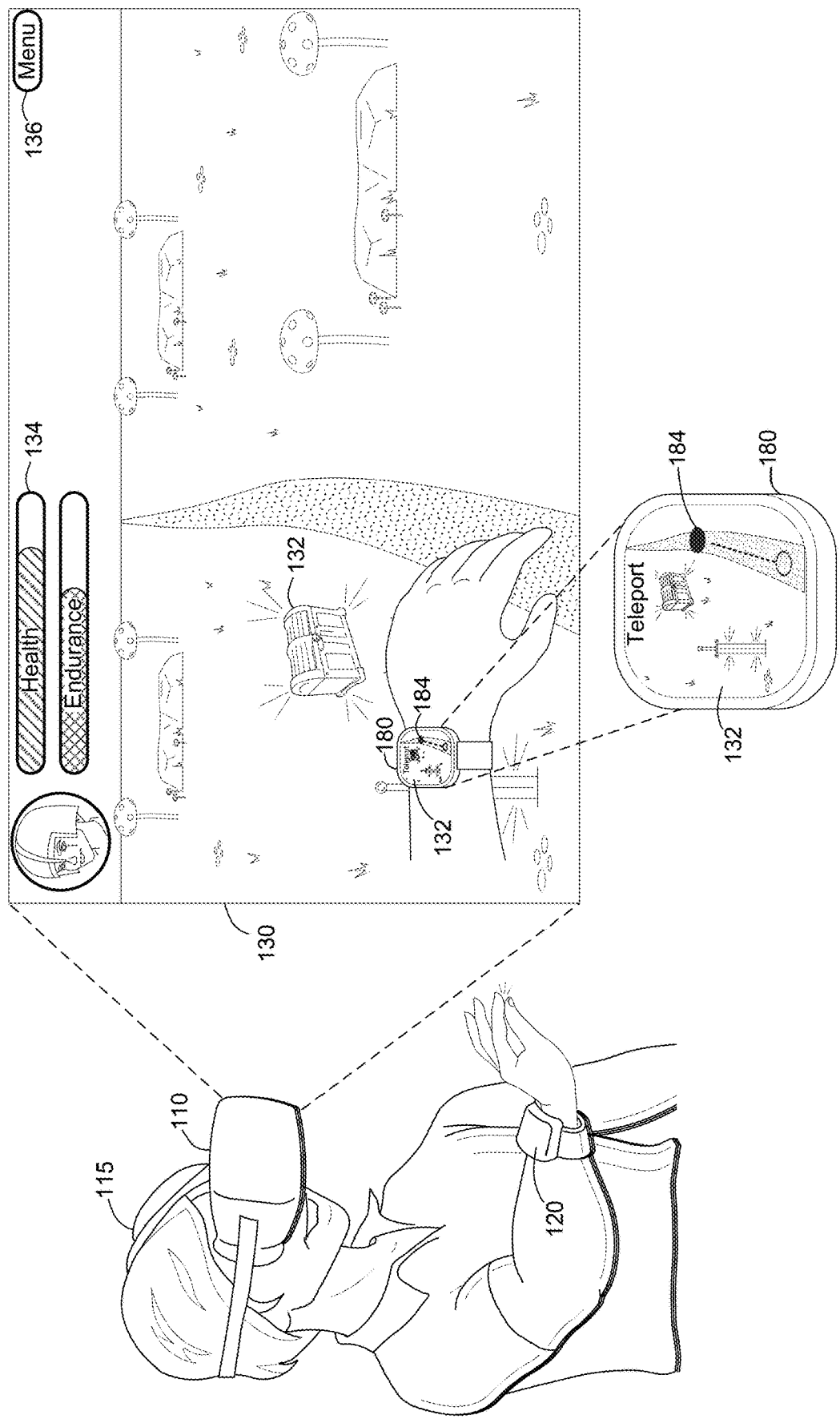
Figure 1G:
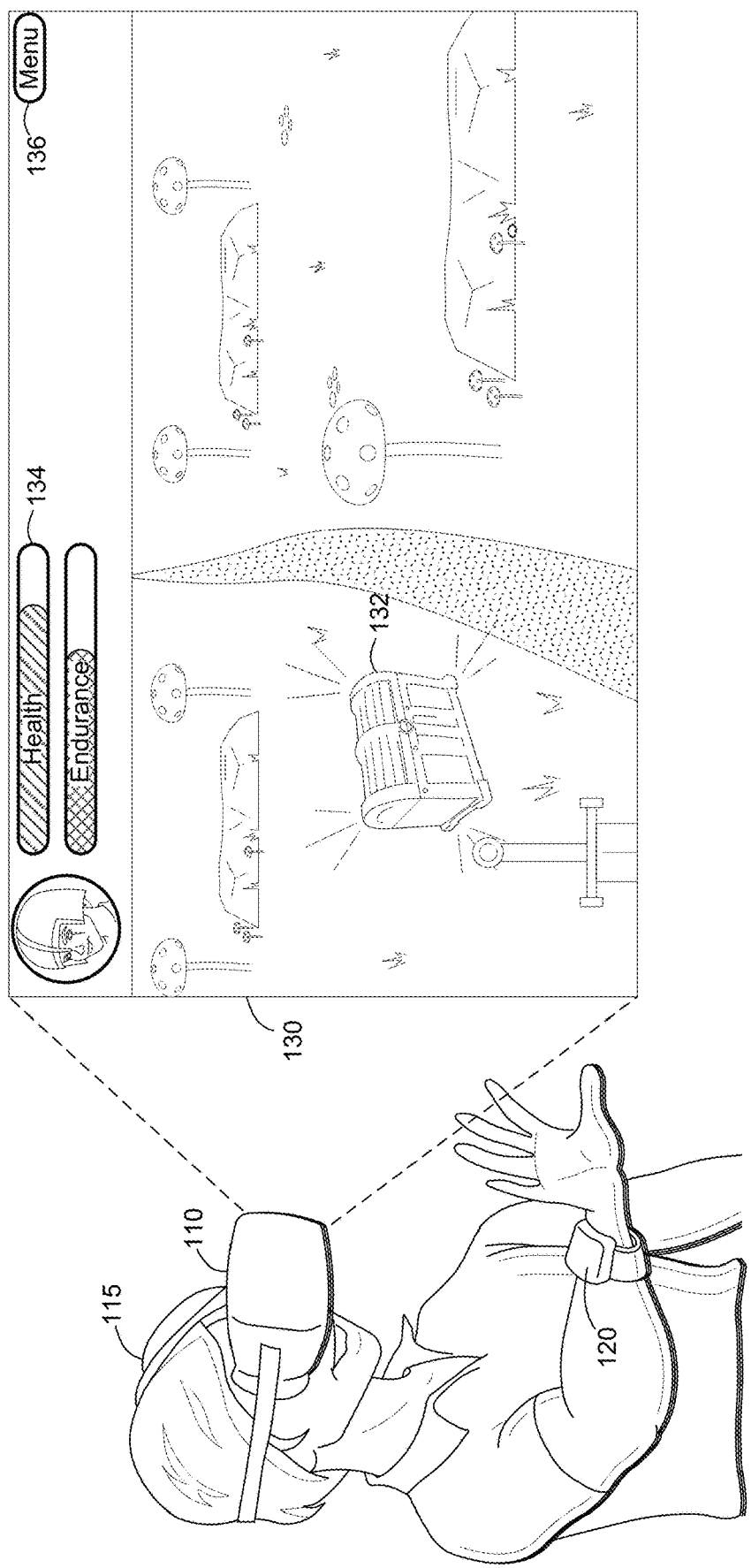

FIGS. 1E-1G illustrate another example of adjustments to a representation of a user's position within an AR application using a hand gesture, in accordance with some embodiments. FIG. 1E, similar to FIG. 1A, shows the head-wearable device 110 operating an AR application, and displaying the AR environment 130 and a representation of the user 115's position within the AR environment 130.

In FIG. 1F, the user 115 performs a positional-control activation hand gesture while the head-wearable device 110 displays the representation of the user's position within the AR environment 130. The head-wearable device 110 in response to receiving an indication that a positional-control activation hand gesture has been performed (e.g., an in-air hand gesture, such as a pinch gesture 140), can display a virtual wrist-wearable device 180 (which can be a virtual representation of the wrist-wearable device 120 worn by the user, such that it can be a fully virtual representation, or it can also be a full or partial passthrough representation of the user's actual watch (e.g., the wrist-wearable device 120) worn by an avatar of the user 115 (e.g., the user 115's representation within the AR environment 130). The virtual wrist-wearable device 180 can present a virtual positional-control UI 185 that includes a representation of the AR environment 130. The virtual positional-control UI 185 allows the user to select different portions of the AR environment 130 to perform a positional-control action. For example, as shown in FIG. 1F, the user 115 selected, via the virtual wrist-wearable device 180, a position adjacent to the virtual object 132 to teleport (e.g., selected marker 184).

FIG. 1G illustrates the displayed changed representation of the user's position within the AR environment 130. In particular, FIG. 1G shows an updated representation of the user 115's position within the AR environment 130 after the user 115 provides confirmation of the positional-control action shown above in reference to FIG. 1F.

FIG. 2 illustrates example positional-control user interfaces, in accordance with some embodiments. In particular, FIG. 2 illustrates positional-control UIs 150, 170, 250, and 270. As described above in reference to FIGS. 1A-1G, the first positional-control UI 150 is presented by the head-wearable device 110 in response to a received indication that a positional-control activation hand gesture was performed by a user 115's first hand (e.g., a first layer or "layer 1" for the primary hand), and the second positional-control UI 170 is presented by the head-wearable device 110 in response a received indication that a subsequent positional-control activation hand gesture was performed by the user 115's first hand (e.g., a first layer or "layer 1" for the secondary hand). Additionally, in some embodiments, the head-wearable device 110 displays a third positional-control UI 250 (e.g., a second layer or "layer 2" for the primary hand) in response to receiving an indication that a positional-control activation hand gesture was performed by the user 115's second hand (opposite the first hand), and a fourth positional-control UI 270 in response to receiving an indication that a subsequent positional-control activation hand gesture was performed by the user 115's second hand (e.g., a second layer or "layer 2" for the secondary hand). The third and fourth positional-control UIs 250 and 270 are overlaid another portion of the AR environment 130 (e.g., at an initial position within the AR environment 130 that the positional-control input hand gesture is performed by the second hand). In some embodiments, the third and fourth positional-control UIs 250 and 270 are presented with corresponding tracking elements, navigation UI elements, and turn UI elements as described above in reference to FIGS. 1A-1G.

In FIG. 2, different examples of positional-control UIs associated with instant position change positional-control actions (e.g., teleportation) are shown. In particular, first example positional-control UIs 215 include simple one-handed teleportation, second example positional-control UIs 225 include simple two-handed teleportation, third example positional-control UIs 235 include maneuverable one-handed teleportation, and fourth example positional-control UIs 245 include maneuverable two-handed teleportation. As discussed below, each positional-control UI associated with instant position change can include one or more positional-control UI elements associated with one or more instant position change positional-control actions. Legend 205 provides a description of the positional-control actions associated with the positional-control UI elements of the example positional-control UIs.

The first example positional-control UIs 215 include positional-control UIs presented by the head-wearable device 110 responsive to an indication that the user 115 performed positional-control activation hand gestures with their first hand (e.g., a primary hand), such as the first and second positional-control UIs 150 and 170, and first and second additional positional-control UI elements 221 and 223. The first example positional-control UIs 215 also includes positional-control UIs presented by the head-wearable device 110 responsive to an indication that the user 115 performed positional-control activation hand gestures with their second hand (e.g., a secondary or opposite hand), such as the third and fourth positional-control UIs 250 and 270 and third and fourth additional positional-control UI elements 257 and 277.

In the first example positional-control UIs 215, the first positional-control UI 150 is presented in response to a received indication that a positional-control activation hand gesture has been performed by a user's first hand (e.g., a user 115 performs a pinch gesture 140; FIG. 1B), as described above in reference to FIGS. 1A-1G. The first positional-control UI 150 includes a first positional-control UI element 212 that is associated with a left turn positional-control action, a second positional-control UI element 214 that is associated with a cancel teleportation positional-control action, a third positional-control UI element 216 that is associated with a right turn positional-control action, a fourth positional-control UI element 218 that is associated with a step back positional-control action, and the first additional positional-control UI element 221 that is associated with a target teleport positional-control action. As discussed above in reference to FIGS. 1A-1G, selection of a positional-control UI element associated with a positional-control action causes a representation of a user 115's position within the AR environment 130 to change. For example, selection of the first positional-control UI element 212 or third positional-control UI element 216, via a positional-control input hand gesture, causes a change in the representation of the user's position within the AR environment 130 to the left or the right, respectively (e.g., a sinistral or dextral change in the user's position or field of view within the AR environment 130). Selection of the second positional-control UI element 214, via a positional-control input hand gesture, causes the first positional-control UI 150 to no longer be presented, such that no teleportation is performed. Selection of the fourth positional-control UI element 218, via a positional-control input hand gesture, causes a change in the representation of the user's position within the AR environment 130 backward (e.g., a step backward in the representation of the user's position within the AR environment 130).

In some embodiments, selection of a positional-control UI element associated with an instant position change positional-control action (e.g., a teleportation) causes a representation of a user 115's position within the AR environment 130 to change a predetermined distance (e.g., half of the distance of the AR environment 130 displayed, to the nearest virtual object 132 (FIGS. 1A-1G), etc.). For example, selection of the first additional positional-control UI element 221, via a positional-control input hand gesture, allows the user 115 to select of a particular location in their field of view within the AR environment 130 to which to teleport (e.g., a pointer element that the user 115 can place at a location within the AR environment 130 to teleport as shown in FIGS. 1F and 1G). In some embodiments, the user 115 maintains the positional-control input hand gesture and releases the positional-control input hand gesture to confirm and perform the teleportation. Alternatively or in addition, the user 115 can select another positional-control UI element to confirm and perform the teleportation (e.g., selection of the second additional positional-control UI element 223 discussed below). In some embodiments, the selection of the positional-control UI element associated with the instant position change positional-control action causes the representation of the user 115's position within the AR environment 130 to change by a variable position change, as discussed in detail below in reference to FIGS. 5A-8.

The second positional-control UI 170 is presented in response to a received indication that another positional-control activation hand gesture has been performed while the first positional-control UI 150 is presented. For example, as described above in reference to FIG. 1D, the user 115 turns their hand palm-side up or 180 degrees from the starting position while the first positional-control UI 150 is presented to cause a head-wearable device 110 to present the second positional-control UI 170. The second positional-control UI 170 includes a fifth positional-control UI element 222 that is associated with a cancel teleportation positional-control action and the second additional positional-control UI element 223 that is associated with a trigger teleport positional-control action. Selection of the fifth positional-control UI element 222, via a positional-control input hand gesture, causes the first positional-control UI 150 and the second positional-control UI 170 to no longer be presented, such that no teleportation is performed. Selection of the second additional positional-control UI element 223, via a positional-control input hand gesture, causes a teleportation to be performed. Specifically, after the user 115 has selected a particular location in their field of view within the AR environment 130 to which to teleport, selection of the second additional positional-control UI element 223 causes the representation of the user's position within the AR environment 130 to move to the selected location.

In the first example positional-control UIs 215, the third and fourth positional-control UIs 250 and 270 and the third and fourth additional positional-control UI elements 257 and 277, which are presented in response to received indications that positional-control activation hand gestures have been performed by the user's second hand, are not associated with a positional-control actions. As such, a received indication that a positional-control activation hand gestures has been performed by the user's second hand, will cause the head-wearable device 110 to present blank third or fourth positional-control UIs 250 and 270 and/or blank third and fourth additional positional-control UI elements 257 and 277. In some embodiments, the third and fourth positional-control UIs 250 and 270 and the third and fourth additional positional-control UI elements 257 and 277 will include text (e.g., not applicable or "N/A") to inform the user 115 that no positional-control action is available.

The first example positional-control UIs 215 allow the user 115 to use a single hand to target and select a location in which to teleport, as well as adjust their field of view within the AR environment 130 (e.g., in a sinistral or dextral direction) while targeting and selectin the location in which to teleport. The user 115 is also able to make minor changes to the representation of their position within the AR environment 130 using their single hand (e.g., step backward within the AR environment 130). The instant positional changes, such as teleportation, increases the user 115's mobility within the AR environment 130 by allowing the user 115 move quickly and efficiently around the AR environment 130.

The second example positional-control UIs 225 include the first and second positional-control UIs 150 and 170, the first and second additional positional-control UI elements 221 and 223, the third and fourth positional-control UIs 250 and 270, and third and fourth additional positional-control UI elements 257 and 277. As described above with respect to the first example positional-control UIs 215, the second example positional-control UIs 225 are presented, by the head-wearable device 110, responsive to received indications that the user 115 performed positional-control activation hand gestures with their first and/or second hand.

In the second example positional-control UIs 225, the first positional-control UI 150 includes the first positional-control UI element 212 that is not associated with a positional-control action, the third positional-control UI element 216 that is not associated with a positional-control action, the second positional-control UI element 216 that is associated with the cancel teleportation positional-control action, the fourth positional-control UI element 218 that is associated with the step back positional-control action, and the first additional positional-control UI element 221 that is associated with the target teleport positional-control action. The second positional-control UI 170 includes the fifth positional-control UI element 222 associated with the cancel teleportation positional-control action and the second additional positional-control UI element 223 associated with the trigger teleport positional-control action.

In the second example positional-control UIs 225, the third positional-control UI 250 includes a sixth positional-control UI element 262 that is associated with a left turn positional-control action, a seventh positional-control UI element 264 that is blank or "N/A," an eight positional-control UI element 266 that is associated with a right turn positional-control action, a ninth positional-control UI element 268 that is blank or "N/A," and the third additional positional-control UI elements 257 that is blank or "N/A." The fourth positional-control UI 270 and the fourth additional positional-control UI elements 277 are both blank or "N/A."

The second example positional-control UIs 225 allow for the user 115 to use their first hand to target and select a location in which to teleport, and use their second hand to adjust their field of view within the AR environment 130 (e.g., in a sinistral or dextral direction) while targeting and selecting the location in which to teleport (with their first hand). Similar to the first example positional-control UIs 215, the user 115 is able to make minor changes to the representation of their position within the AR environment 130 using their first hand (e.g., step backward within the AR environment 130). A benefit of the second example positional-control UIs 225 is that the user is able to split out the teleportation action into discrete tasks for each hand.

The third example positional-control UIs 235 include the first and second positional-control UIs 150 and 170, the first and second additional positional-control UI elements 221 and 223, the third and fourth positional-control UIs 250 and 270, and third and fourth additional positional-control UI elements 257 and 277. As described above with respect to the first example positional-control UIs 215 and the second example positional-control UIs 225, the third example positional-control UIs 235 are presented, by the head-wearable device 110, responsive to received indications that the user 115 performed positional-control activation hand gestures with their first and/or second hand.

In the third example positional-control UIs 235, the first positional-control UI 150 includes the first positional-control UI element 212 that is associated with the left turn positional-control action, the second positional-control UI element 214 that is associated with a step forward positional-control action (which when selected causes the representation of the user within the AR environment 130 to perform a step forward within the AR environment 130), the third positional-control UI element 216 that is associated with the right turn positional-control action, the fourth positional-control UI element 218 that is associated with the step back positional-control action, and the first additional positional-control UI element 221 associated with the target teleport positional-control action. The second positional-control UI 170 includes the fifth positional-control UI element 222 that is associated with the cancel teleportation positional-control action and the second additional positional-control UI element 223 that is associated with the trigger teleport positional-control action. The second positional-control UI 170 also includes a tenth positional-control UI element 224 that is associated with a step left positional-control action (which when selected causes the representation of the user within the AR environment 130 to perform a step left within the AR environment 130), an eleventh positional-control UI element 226 that is associated with the step forward positional-control action, a twelfth positional-control UI element 228 that is associated with a step right positional-control action (which when selected causes the representation of the user within the AR environment 130 to perform a step right within the AR environment 130), and a thirteenth positional-control UI element 230 that is associated with the step back positional-control action.

In the third example positional-control UIs 235, the third and fourth positional-control UIs 250 and 270 and the third and fourth additional positional-control UI elements 257 and 277 are not associated with a positional-control action and, as such, are blank or include "N/A."

The third example positional-control UIs 235 allow the user 115 to target and select a location in which to teleport, as well as adjust their field of view within the AR environment 130 (e.g., in a sinistral or dextral direction) and make changes to the representation of their position within the AR environment 130 using a single hand. In other words, the third example positional-control UIs 235 allow the user 115, via one or more positional-control input hand gestures, to change the representation of their position within the AR environment 130 before teleporting to give the user 115 greater control in selecting where to teleport. A benefit of the third example positional-control UIs 235 is that the user has greater control in the movement and teleportation of their representation within the AR environment 130.

The fourth example positional-control UIs 245 include the first and second positional-control UIs 150 and 170, the first and second additional positional-control UI elements 221 and 223, the third and fourth positional-control UIs 250 and 270, and third and fourth additional positional-control UI elements 257 and 277. As described above with respect to the first, second, and third example positional-control UIs 215, 225, and 235, the fourth example positional-control UIs 245 are presented, by the head-wearable device 110, responsive to received indications that the user 115 performed positional-control activation hand gestures with their first and/or second hand.

In the fourth example positional-control UIs 245, the first positional-control UI 150 includes the first positional-control UI element 212 that is associated with the step left positional-control action, the second positional-control UI element 214 that is associated with a step forward positional-control action, the third positional-control UI element 216 that is associated with a step right positional-control action, the fourth positional-control UI element 218 that is associated with the step back positional-control action, and the first additional positional-control UI element 221 associated with the target teleport positional-control action. The second positional-control UI 170 includes the fifth positional-control UI element 222 that is associated with the cancel teleportation positional-control action and the second additional positional-control UI element 223 that is associated with the trigger teleport positional-control action.

In the fourth example positional-control UIs 245, the third positional-control UI 250 includes the sixth positional-control UI element 262 that is associated with the left turn positional-control action, the seventh positional-control UI element 264 that is blank or "N/A," the eight positional-control UI element 266 that is associated with the right turn positional-control action, the ninth positional-control UI element 268 that is blank or "N/A," and the third additional positional-control UI elements 257 that is blank or "N/A." The fourth positional-control UI 270 and the fourth additional positional-control UI elements 277 are both blank or "N/A."

The fourth example positional-control UIs 245 allow for the user 115 to use their first hand to target and select a location in which to teleport and make changes to the representation of their position within the AR environment 130, and use their second hand to adjust their field of view within the AR environment 130 (e.g., in a sinistral or dextral direction) while targeting and selecting the location in which to teleport (with their first hand). The fourth positional-control UIs 245 separates the positional-control actions for changing the representation of the user's position within the AR environment 130 and the positional-control actions for adjusting their field of view within the AR environment 130 to two separate hands, which allow the user 115 perform discrete positional-control actions on each hand.

FIG. 3 illustrates additional example positional-control user interfaces, in accordance with some embodiments. Similar to FIG. 2, FIG. 3 illustrates positional-control UIs 150, 170, 250, and 270, which are presented by the head-wearable device 110 responsive to received indications that the user 115 performed positional-control activation hand gestures with their first and/or second hand. In FIG. 3, different examples of positional-control UIs associated with constant movement or slide position change positional-control actions (e.g., running, walking, strafing, etc.) are shown. In particular, first example positional-control UIs 315 include simple one-handed slides, second example positional-control UIs 325 include simple two-handed slides, third example positional-control UIs 335 include maneuverable one-handed slides, and fourth example positional-control UIs 345 include maneuverable two-handed slides. As discussed below, each positional-control UI associated with instant position change can include one or more positional-control UI elements associated with one or more instant position change positional-control actions. Legend 305 provides a description of the positional-control actions associated with the positional-control UI elements of the example positional-control UIs.

The first example positional-control UIs 315 the first and second positional-control UIs 150 and 170, and first and second additional positional-control UI elements 221 and 223. The first positional-control UI 150 includes a first positional-control UI element 212 that is associated with a left turn positional-control action, a second positional-control UI element 214 that is associated with a walk forward positional-control action, a third positional-control UI element 216 that is associated with a right turn positional-control action, the fourth positional-control UI element 218 that is associated with a backpedal positional-control action, and the first additional positional-control UI element 221 that is blank or "N/A."

Selection of the first positional-control UI element 212 or third positional-control UI element 216, via a positional-control input hand gesture, causes a change in the representation of the user's position within the AR environment 130 to the left or the right, respectively (e.g., a sinistral or dextral change in the user's position or field of view within the AR environment 130). Selection of the second positional-control UI element 214, via a positional-control input hand gesture, causes a continuous first predetermined constant position change to the representation of the user 115's position within the AR environment 130 such that the user's position is continuously adjusted by the first predetermined constant position change (e.g., the user moves forward (or in the direction they are facing) at a first predetermined constant rate). Selection of the fourth positional-control UI element 218, via a positional-control input hand gesture, causes a continuous second predetermined constant position change to the representation of the user 115's position within the AR environment 130 such that the user's position is continuously adjusted by the second predetermined constant position change (e.g., the user moves backward (or in the opposite direction they are facing) at a second predetermined constant rate). In some embodiments, the selection of the continuous position change is a continuous variable position change that allows the user 115's representation within the AR environment 130 to transition between walking and running or vice versa seamlessly (e.g., without interruption, skips, or disconnected movements) further improving immersion in the AR environment 130. The variable position changes are discussed in detail below in reference to FIGS. 5A-8.

The second positional-control UI 170 and the second additional positional-control UI element 223 are blank or "N/A." Similarly, the third and fourth positional-control UIs 250 and 270 and the third and fourth additional positional-control UI elements 257 and 277 are also blank or "N/A."

The first example positional-control UIs 315 allow the user 115 to use a single hand to navigate within the AR environment 130. In particular, the user 115 is able to continuously change the representation of their position within the AR environment 130 forward and backward, as well as allowing the user 115 adjust their field of view based on the positional-control input hand gestures performed by their first hand. The constant positional changes, such as walking, running, backpedaling, etc., improve immersion in the AR environment 130 by allowing the user 115 move around within the AR environment 130 as they would while exploring in the real world.

The second example positional-control UIs 325 include the first and second positional-control UIs 150 and 170, the first and second additional positional-control UI elements 221 and 223, the third and fourth positional-control UIs 250 and 270, and third and fourth additional positional-control UI elements 257 and 277. In the second example positional-control UIs 225, the first positional-control UI 150 includes the first positional-control UI element 212 that is associated with a strafe left positional-control action (which when selected causes the representation of the user within the AR environment 130 to perform a sidestep to the left while the user 115's field of view is unchanged within the AR environment 130), the second positional-control UI element 214 that is associated with the walk forward positional-control action, the third positional-control UI element 216 that is associated with a strafe right positional-control action (which when selected causes the representation of the user within the AR environment 130 to perform a sidestep to the right while the user 115's field of view is unchanged within the AR environment 130), the fourth positional-control UI element 218 that is associated with the backpedal positional-control action, and the first additional positional-control UI element 221 that is blank or "N/A." The second positional-control UI 170 and the second additional positional-control UI element 223 are blank or "N/A."

In the second example positional-control UIs 325, the third positional-control UI 250 includes a sixth positional-control UI element 262 that is associated with a left turn positional-control action, a seventh positional-control UI element 264 that is blank or "N/A," an eight positional-control UI element 266 that is associated with a right turn positional-control action, a ninth positional-control UI element 268 that is blank or "N/A," and the third additional positional-control UI elements 257 that is blank or "N/A." The fourth positional-control UI 270 and the fourth additional positional-control UI elements 277 are both blank or "N/A."

The second example positional-control UIs 325 allow for the user 115 to use their first hand to continuously change the representation of their position within the AR environment 130 forward, backward, left, and right in the AR environment 130, and their second hand to adjust their field of view within the AR environment 130. For example, the user 115 can use their first hand to cause a change the representation of their position within the AR environment 130 left, right, forward, and/or backward, use their second hand to cause a change the representation of their field of view within the AR environment 130 left or right. A benefit of the second example positional-control UIs 325 is that the user is able to split out the actions into discrete tasks for each hand.

The third example positional-control UIs 335 include the first and second positional-control UIs 150 and 170, the first and second additional positional-control UI elements 221 and 223, the third and fourth positional-control UIs 250 and 270, and third and fourth additional positional-control UI elements 257 and 277. In the third example positional-control UIs 235, the first positional-control UI 150 includes the first positional-control UI element 212 that is associated with the left turn positional-control action, the second positional-control UI element 214 that is associated with a walk forward positional-control action, the third positional-control UI element 216 that is associated with the right turn positional-control action, the fourth positional-control UI element 218 that is associated with the backpedal positional-control action, and the first additional positional-control UI element 221 associated with a crouch positional-control action (which when selected causes the representation of the user within the AR environment 130 to crouch down lowering their height and field of view within the AR environment 130). In the third example positional-control UIs 335, the second additional positional-control UI element 223 is associated with a jump positional-control action (which when selected causes the representation of the user within the AR environment 130 to jump within the AR environment 130), and the second positional-control UI 170 includes a tenth positional-control UI element 224 that is associated with the strafe left positional-control action, an eleventh positional-control UI element 226 that is associated with the walk forward positional-control action, the twelfth positional-control UI element 228 that is associated with the strafe right positional-control action, and the thirteenth positional-control UI element 230 that is associated with the back pedal positional-control action.

In the third example positional-control UIs 235, the third and fourth positional-control UIs 250 and 270 and the third and fourth additional positional-control UI elements 257 and 277 are not associated with a positional-control action and, as such, are blank or include "N/A."

The third example positional-control UIs 335 allow the user 115 to use a single hand to navigate and adjust their field of view within the AR environment 130. In other words, the third example positional-control UIs 335 allow the user 115, via one or more positional-control input hand gestures performed at their first hand, to continuously change the representation of their position within the AR environment 130 and adjust their field of view. A benefit of the third example positional-control UIs 335 is that the user has greater control in the movement and filed of view of their representation within the AR environment 130.

The fourth example positional-control UIs 345 include the first and second positional-control UIs 150 and 170, the first and second additional positional-control UI elements 221 and 223, the third and fourth positional-control UIs 250 and 270, and third and fourth additional positional-control UI elements 257 and 277. In the fourth example positional-control UIs 345, the first positional-control UI 150 includes the first positional-control UI element 212 that is associated with the strafe left positional-control action, the second positional-control UI element 214 that is associated with the walk forward positional-control action, the third positional-control UI element 216 that is associated with the strafe right positional-control action, the fourth positional-control UI element 218 that is associated with the back pedal positional-control action, and the first additional positional-control UI element 221 that is blank or "N/A." The second positional-control UI 170 and the second additional positional-control UI element 223 are blank or "N/A."

In the fourth example positional-control UIs 345, the third positional-control UI 250 includes the sixth positional-control UI element 262 that is associated with the left turn positional-control action, the seventh positional-control UI element 264 that is blank or "N/A," the eight positional-control UI element 266 that is associated with the right turn positional-control action, the ninth positional-control UI element 268 that is blank or "N/A," and the third additional positional-control UI elements 257 that is associated with the crouch positional-control action. The fourth positional-control UI 270 is blank or "N/A" and the fourth additional positional-control UI elements 277 is associated with the jump positional-control action.

The fourth example positional-control UIs 345 allow for the user 115 to use their first hand to continuously change the representation of their position within the AR environment 130 forward, backward, left, and right in the AR environment 130, and their second hand to crouch, jump, and/or adjust their field of view within the AR environment 130. The fourth positional-control UIs 345 separates the positional-control actions for changing the representation of the user's position within the AR environment 130 and the positional-control actions for adjusting their field of view within the AR environment 130 to two separate hands, which allow the user 115 perform discrete positional-control actions on each hand.

Figure 4:
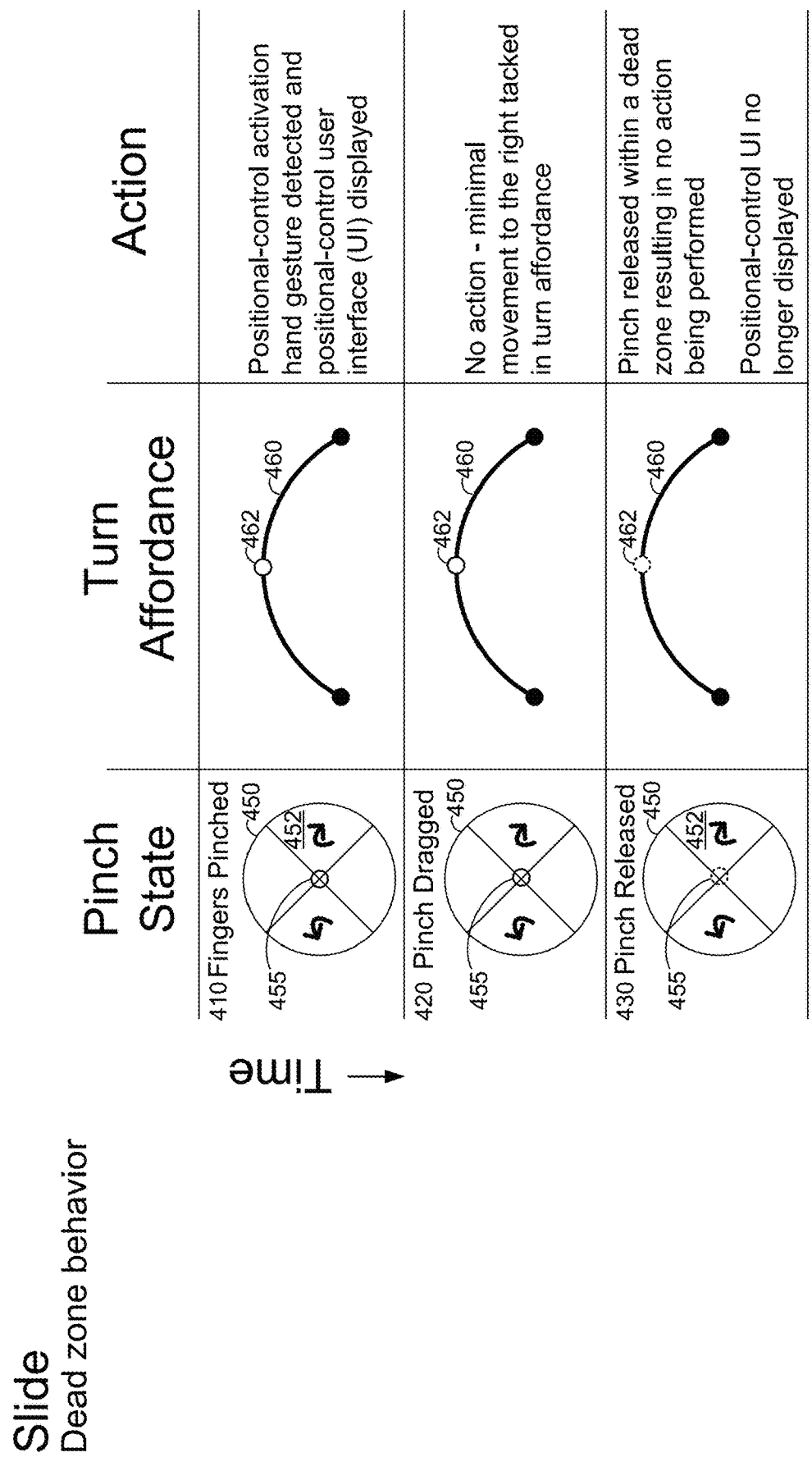
FIG. 4 illustrates examples of dead-zone behaviors within a positional-control UI, in accordance with some embodiments.

FIG. 4 illustrates examples of dead-zone behaviors within a positional-control UI, in accordance with some embodiments. FIG. 4 shows a user's inputs at three distinct points of time, as discussed below. FIG. 4 includes a positional-control UI 450 (analogous to positional-control UIs 150, 170, 250 and 270; FIGS. 1A-3) and a navigation UI element 460 (analogous to navigation UI element 160; FIGS. 1A-1G). The positional-control UI 450 includes a tracking element 455 (similar to tracking element 151) and the navigation UI element 460 includes turn element 462 (similar to turn element 162). A dead zone, in some embodiments, means an area within the positional-control UI 450 that, when selected, does not result in an indication that a positional-control UI element (e.g., positional-control UI element 452) has been selected (even if a positional-control input hand gesture detected). In other words, positional-control input hand gestures detected within the dead zone do not cause the head-wearable device 110 (FIGS. 1A-1G) to perform a positional-control action.

At a first point in time 410, a positional-control activation hand gesture (e.g., a pinch gesture) is performed, which causes the head-wearable device 110 (FIGS. 1A-1G) to display the positional-control UI 450 and the navigation UI element 460. In some embodiments, the navigation UI element 460 is displayed adjacent to and above the positional-control UI 450 as shown in FIGS. 1A-1G. While the positional-control UI 450, the user 115's hand movements are tracked within the positional-control UI 450. In some embodiments, the positional-control UI 450 is displayed until the user 115 provides a positional-control input hand gesture. Alternatively, as shown in FIG. 4, the positional-control UI 450 is displayed as long as the positional-control activation hand gesture is maintained.

At a second point in time 420, the user 115, while holding the pinch gesture, moves their hand slightly. The slight hand movement of the user does not significantly change its position within the positional-control UI 450 (e.g., as shown in FIG. 4 by the tracking element 455 movingly slightly but remaining centered within the positional-control UI 450 and turn element 462 movingly slightly but remaining substantially centered within the navigation UI element 460).

At the third point in time 430, the user 115 releases the pinch gesture, which result in the selection of the positional-control UI element 452 within a dead zone of the positional-control UI 450. As a result, an indication that a positional-control UI element has been selected is not provided to the head-wearable device 110 and no positional-control action is performed. The dead zone reduces or eliminates the inadvertent selection of positional-control UI elements that a user did not intend to select. Additionally, the dead zone reduces or eliminates the selection of positional-control UI elements as a result of drift, uncalibrated controls, and/or inaccurate detection of positional-control input hand gestures, and/or positional-control input hand gestures detected by error.

Figure 5A:
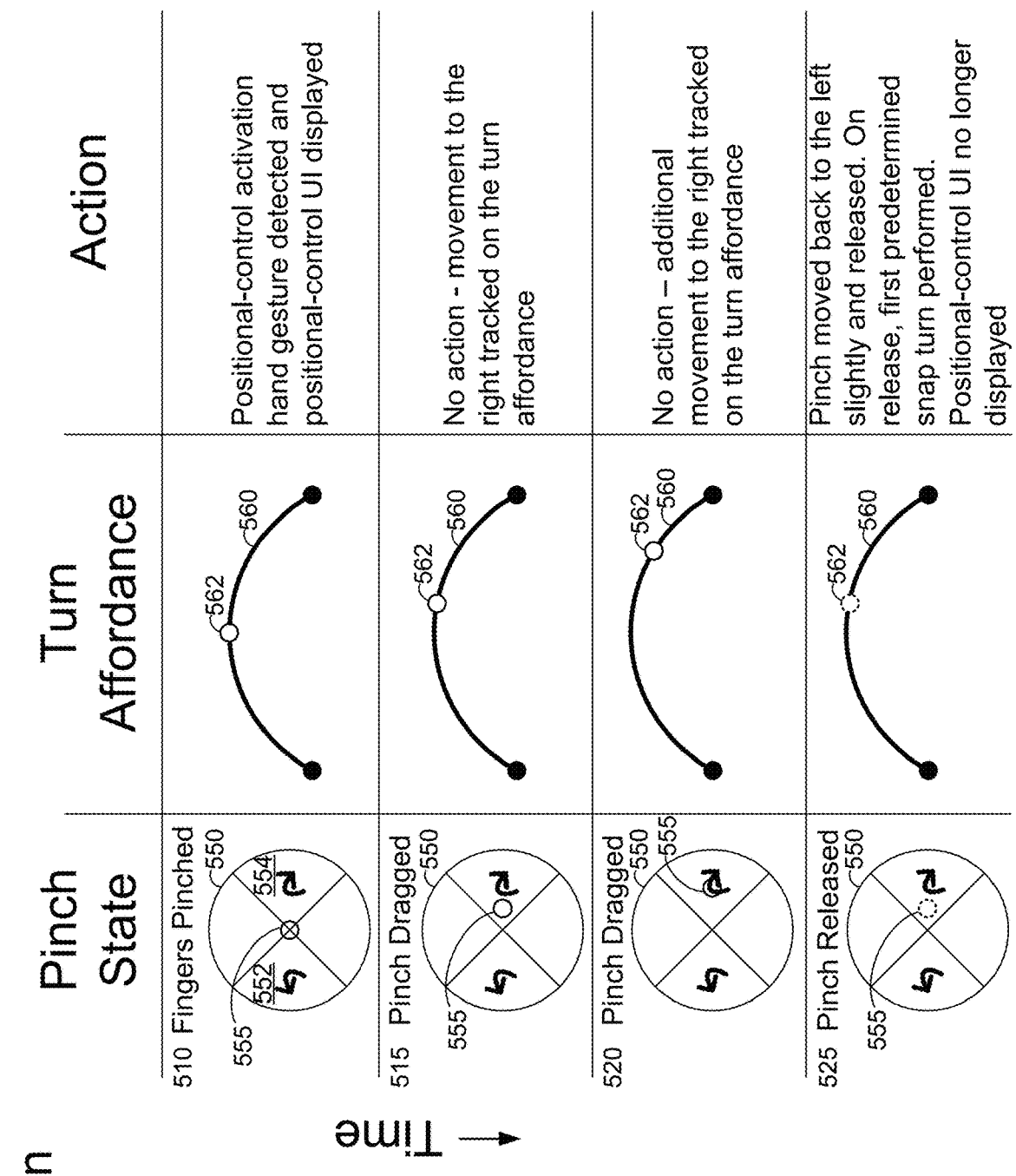
FIGS. 5A and 5B illustrate example snap turns to change the representation of the user's position within the artificial-reality environment, in accordance with some embodiments.
Figure 5B:
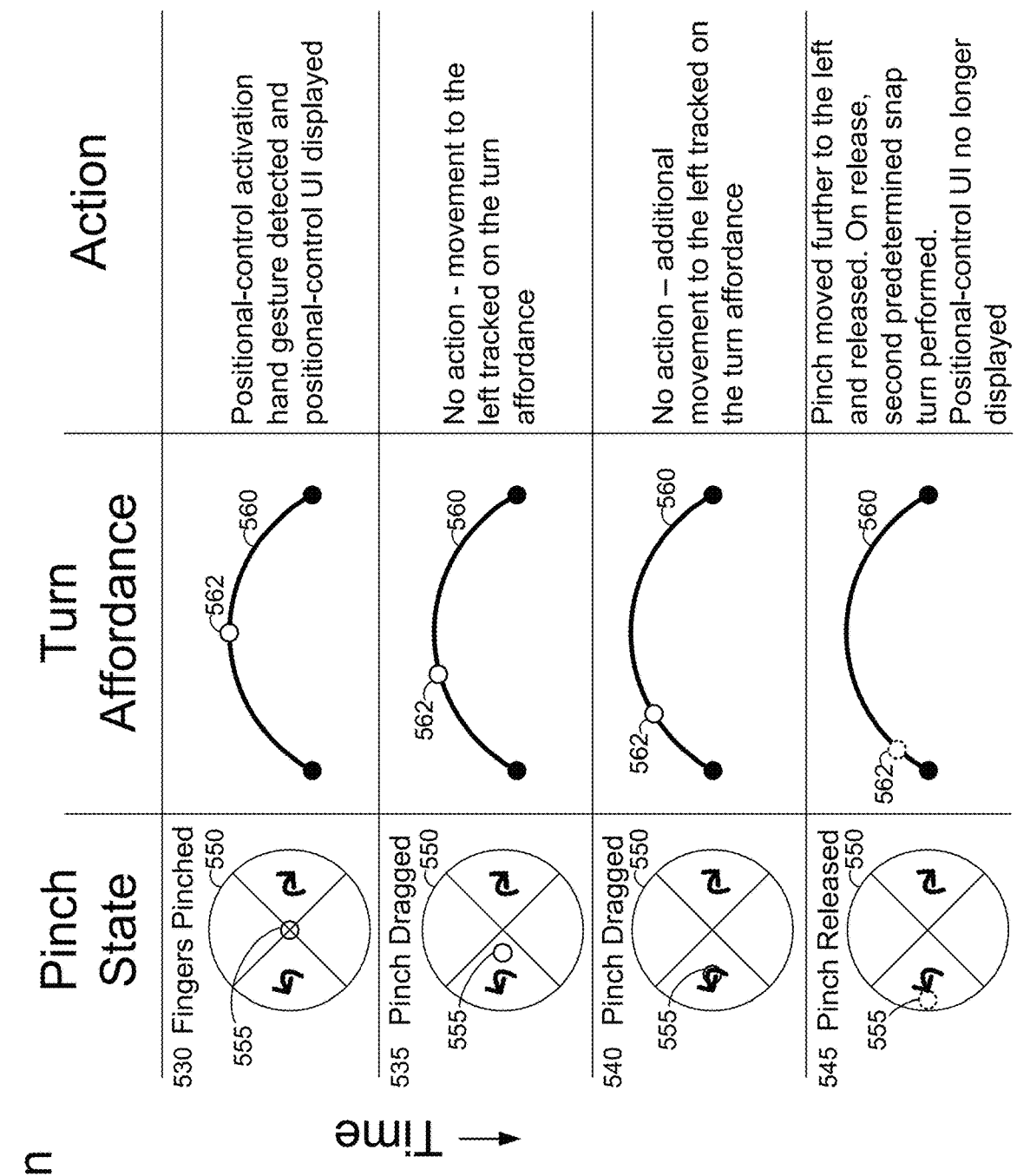

FIGS. 5A and 5B illustrate example snap turns to change the representation of the user's position within the AR environment, in accordance with some embodiments. FIGS. 5A and 5B show a user's inputs at distinct points of time and fine adjustments to their positional representation within the AR environment. Similar to FIG. 4, FIGS. 5A and 5B show a positional-control UI 550 including a first positional-control UI element 552 or a second positional-control UI element 554, and a navigation UI element 560. The first positional-control UI element 552 is associated with a left turn positional-control action and the second positional-control UI element 554 is associated with a right turn positional-control action. The positional-control UI 550 also includes a tracking element 555, and the navigation UI element 560 includes a turn element 562. Further, the positional-control UI 550 is analogous to the positional-control UIs described above in reference to FIGS. 1A-4, and the navigation UI element 560 is analogous to the navigation UI elements described above in reference to FIGS. 1A-1G and 4.

In some embodiments, the fine adjustments to the representation of the user 115's position within the AR environment 130 is a perspective change. In particular, the head-wearable device 110 causes the representation of the user 115's position within the AR environment 130 to change by a variable sinistral or variable dextral amount based on a positional-control action performed by the user 115. In some embodiments, as shown in FIGS. 5A and 5B, the user 115 can perform and hold a pinch gesture to adjust the variable position change as desired. A magnitude of the variable position change (e.g., how much the representation of the user's position within the AR environment 130 turns) is based on a location, relative to the positional-control UI 550, that the positional-control input hand gesture (e.g., release of the pinch gesture) is performed. For example, the closer to the center of the positional-control UI 550 that the positional-control input hand gesture is performed the smaller the magnitude of the variable position change (e.g., 5 to 15 degrees) and the further from the center of the positional-control UI 550 that the positional-control input hand gesture is performed the greater the magnitude of the variable position change (e.g., 45 to 60 degrees near an outside edge of positional-control UI 550).

In FIG. 5A, the user 115 performs a positional-control activation hand gesture (e.g., a pinch gesture) at a first point in time 510. The head-wearable device 110, in response to receiving an indication that the user 115 has performed the pinch gesture, displays the positional-control UI 550. At a second point in time 515, the user 115, while holding the pinch gesture drags the pinch gesture towards the right (e.g., towards the second positional-control UI element 554). As the user 115 drags the pinch gesture, the turn element 562 moves towards the right on the navigation UI element 560 (e.g., providing the user 115 with a visual indicator of their sinistral or dextral position within the positional-control UI 550). Similarly, the tracking element 555 is also updated within the positional-control UI 550 based on the user 115's pinch gesture. As shown at the second point in time 515, the user 115 has not released the pinch gesture and, as a result, no action is performed.

At a third point in time 520, the user 115, while holding the pinch gesture, drags the pinch gesture further to the right. As the user 115 drags the pinch gesture further to the right, the tracking element 555 moves further towards an outer right edge of the positional-control UI 550, and the turn element 562 also moves further towards a right endpoint of the navigation UI element 560. No action is performed at the third point in time 520, as the user 115 has not released the pinch gesture.

At a fourth point in time 525, the user 115, while holding the pinch gesture drags the pinch gesture back towards the left slightly and releases the pinch gesture. When the user 115 drags the pinch gesture back towards the left, the tracking element 555 moves back towards the left of the positional-control UI 550, and the turn element 562 also moves back towards the center of the navigation UI element 560. Additionally, when the user 115 releases the pinch gesture, the head-wearable device 110 causes the representation of the user's position within the AR environment 130 to instantaneously change a first predetermined snap turn (e.g., the head-wearable device 110 causes the performance of a variable perspective change, such as a right turn). A magnitude of the first predetermined snap turn is based on the location, relative to the positional-control UI 550, that the user 115 releases the pinch gesture. For example, as the pinch gesture is released to the right of a central point of the positional-control UI 550 (as shown by the tracking element 555), the representation of the user's position within the AR environment is changed by a first variable position change (e.g., a perspective change of 5 to 15 degrees to the right).

In some embodiments, after a positional-control action is performed, such as the first variable position change, the head-wearable device 110 ceases to display the positional-control UI 550.

In FIG. 5B, the user 115 performs another positional-control activation hand gesture (e.g., another pinch gesture) at a fifth point in time 530. As described above, the head-wearable device 110, in response to receiving an indication that the user 115 has performed the other pinch gesture, displays the positional-control UI 550. At a sixth point in time 535, the user 115, while holding the pinch gesture drags the pinch gesture towards the left (e.g., towards the first positional-control UI element 552). As the user 115 drags the pinch gesture, the turn element 562 moves towards the left on the navigation UI element 560, and the tracking element 555 moves to the left is within the positional-control UI 550. At the sixth point in time 535, the user 115 has not released the pinch gesture and, as a result, no action is performed.

At a seventh point in time 540, the user 115, while holding the pinch gesture drags the pinch gesture further to the left. As the user 115 drags the pinch gesture further to the left, the tracking element 555 moves further towards an outer left edge of the positional-control UI 550, and the turn element 562 also moves further towards a left endpoint of the navigation UI element 560. No action is performed at the seventh point in time 540, as the user 115 has not released the pinch gesture.

At an eight point in time 545, the user 115 releases the pinch gesture, the head-wearable device 110 causes the representation of the user's position within the AR environment 130 to instantaneously change a second predetermined snap turn (e.g., the head-wearable device 110 causes the performance of a variable perspective change, such as a left turn). A magnitude of the second predetermined snap turn is based on the location, relative to the positional-control UI 550, that the user 115 releases the pinch gesture. For example, as the pinch gesture is released to near an outer left edge of the positional-control UI 550 (as shown by the tracking element 555), the representation of the user's position within the AR environment is changed by a second variable position change (e.g., a perspective change of 45 to 60 degrees to the left).

Figure 6A:
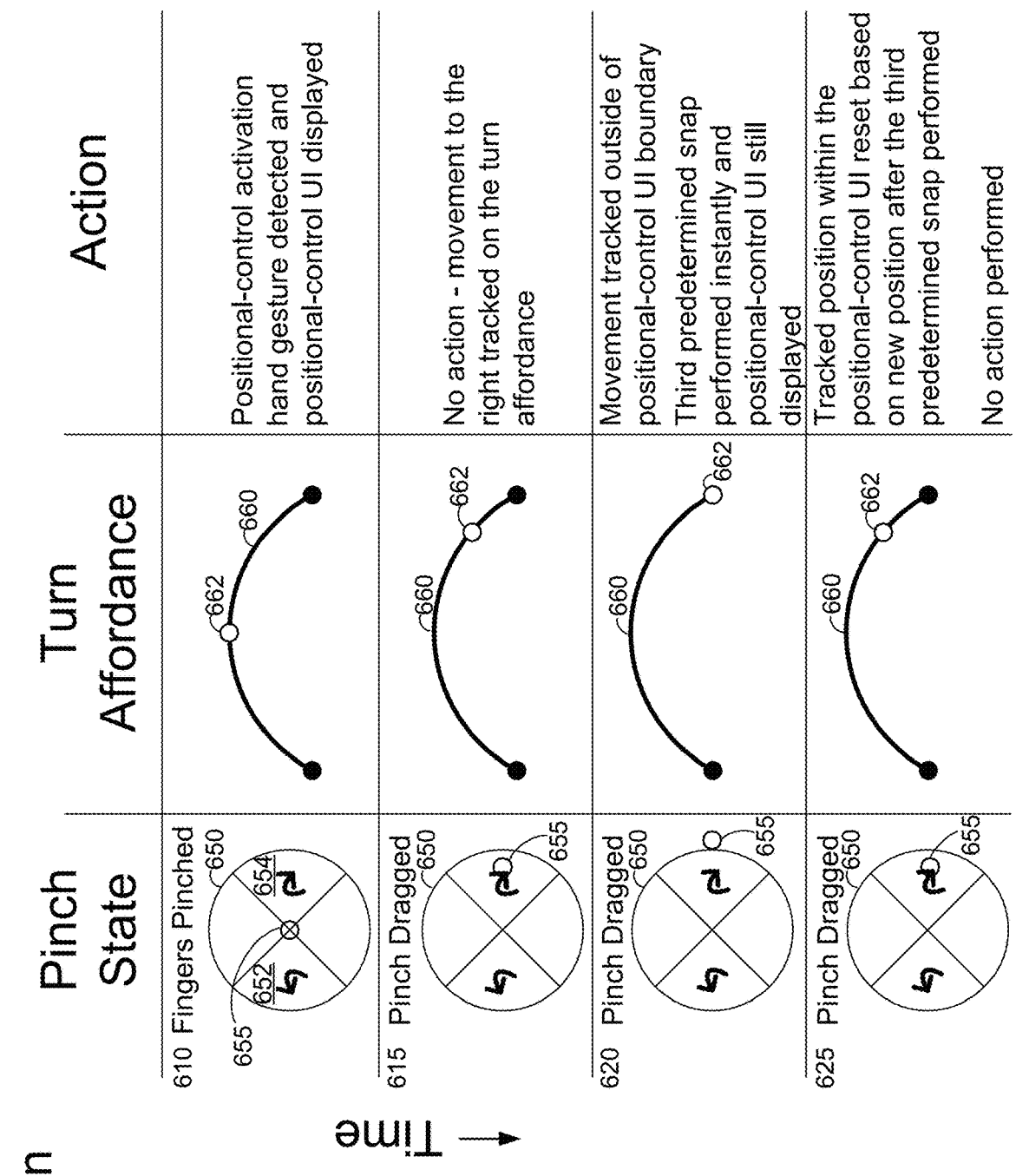
FIGS. 6A and 6B illustrate example edge-triggered snap turns to change the representation of the user's position within the artificial-reality environment, in accordance with some embodiments.
Figure 6B:
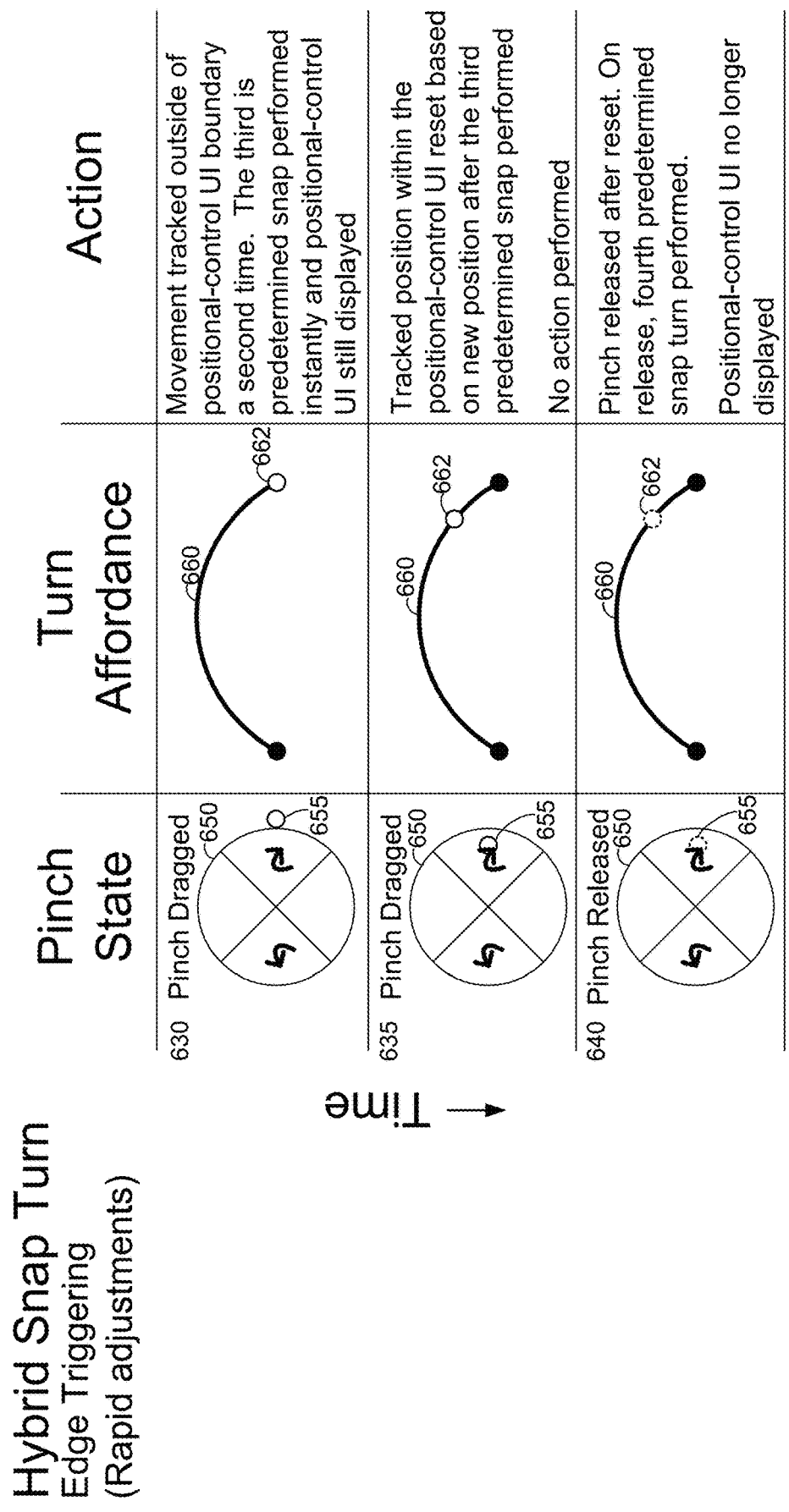

FIGS. 6A and 6B illustrate example edge-triggered snap turns to change the representation of the user's position within the AR environment, in accordance with some embodiments. FIGS. 6A and 6B build on the features described above in reference to FIGS. 5A and 5B by showing user 115 inputs at distinct points of time that perform rapid adjustments to their positional representation within the AR environment 130. Similar to FIGS. 4-5B, FIGS. 6A and 6B show a positional-control UI 650 including a first positional-control UI element 652 (associated with a left turn positional-control action), a second positional-control UI element 654 (associated with a right turn positional-control action), and a navigation UI element 660. The positional-control UI 650 also includes a tracking element 655, and the navigation UI element 660 includes a turn element 662. The positional-control UI 650 and the navigation UI element 660 are analogous to the positional-control UIs and the navigation UI elements described above in reference to FIGS. 1A-5B.

In some embodiments, the head-wearable device 110 allows for rapid adjustments to the representation of the user 115's position within the AR environment 130 (e.g., rapid perspective changes). In particular, the head-wearable device 110 causes the representation of the user 115's position within the AR environment 130 to change by a predetermined (or variable) sinistral or dextral amount based on a positional-control action performed by the user 115. For example, as the user 115 drags a held pinch gesture outside of an outer edge of the positional-control UI 650, a predetermined position change is performed (e.g., 60 to 90 degrees). In some embodiments, as shown in FIGS. 6A and 6B, the user 115 can perform and hold a pinch gesture to perform one or more positional-control actions continuously or in sequence.

In FIG. 6A, the user 115 performs a positional-control activation hand gesture (e.g., a pinch gesture) at a first point in time 610. The head-wearable device 110, in response to receiving an indication that the user 115 has performed the pinch gesture, displays the positional-control UI 650. At a second point in time 615, the user 115, while holding the pinch gesture drags the pinch gesture towards the right (e.g., towards the second positional-control UI element 654). As the user 115 drags the pinch gesture, the turn element 662 moves towards the right on the navigation UI element 660, and the tracking element 655 also moves to right within the positional-control UI 650. As shown at the second point in time 615, the user 115 has not released the pinch gesture and, as a result, no action is performed.

At a third point in time 620, the user 115, while holding the pinch gesture, drags the pinch gesture outside of an outer right edge of the positional-control UI 650. When the user 115 drags the pinch gesture outside of an outer right edge of the positional-control UI 650 (as shown by the tracking element 655 outside of the outer right edge of the positional-control UI 650), the head-wearable device 110 causes the representation of the user 115's position within the AR environment 130 to change by the predetermined amount to the right (e.g., 60 to 90 degrees to the right). After the head-wearable device 110 causes the representation of the user 115's position within the AR environment 130 to change by the predetermined amount to the right, the positional-control UI 650 remains displayed and the tracking element 655 is moved within the positional-control UI 650 (e.g., the tracking element 655 is reset to allow the user 115 to perform additional positional-control actions).

At a fourth point in time 625, the tracking element 655 is shown automatically moved within the positional-control UI 650, which allows the user 115 to further drag the maintained pinch gesture within the positional-control UI 650 to perform another positional-control action. For example, the user 115 can move the maintained pinch gesture within the positional-control UI 650 to select a variable perspective change to be performed (e.g., when the user 115 releases the pinch gesture).

Turning to FIG. 6B, at a fifth point in time 630, while holding the pinch gesture the user 115 drags the pinch gesture outside of the outer right edge of the positional-control UI 650 a subsequent time. When the user 115 drags the pinch gesture outside of the outer right edge of the positional-control UI 650 (as shown by the tracking element 655 outside of the outer right edge of the positional-control UI 650), the head-wearable device 110 causes the representation of the user 115's position within the AR environment 130 to change by the predetermined amount to the right. As described above, after the head-wearable device 110 causes the representation of the user 115's position within the AR environment 130 to change by the predetermined amount to the right, the positional-control UI 650 remains displayed and the tracking element 655 is reset to allow the user 115 to perform additional positional-control actions.

At a sixth point in time 635, the tracking element 655 is shown automatically moved within the positional-control UI 650. The user 115 further drags the maintained pinch gesture within the positional-control UI 650 to perform another positional-control action, as shown by a seventh point in time 640.

At the seventh point in time 640, the user 115 releases the pinch gesture. When the user 115 releases the pinch gesture, the head-wearable device 110 causes the representation of the user's position within the AR environment 130 to instantaneously change another predetermined snap turn (e.g., the head-wearable device 110 causes the performance of a variable perspective change based on a location that the pinch gestures is released as described above in reference to FIGS. 5A and 5B). For example, when the pinch gesture is released within the second positional-control UI element 654 near the outer right edge of the positional-control UI 650 (as shown by the tracking element 555), the representation of the user's position within the AR environment is changed by the other variable position change (e.g., a perspective change of 45 to 60 degrees to the right).

In some embodiments, after a positional-control action is performed, such as the first variable position change, the head-wearable device 110 ceases to display the positional-control UI 650. The edge-triggered snap turns shown in FIGS. 6A and 6B allow the user 115 to quickly adjustments their positional representation within the AR environment 130 while also allowing the user 115 to select with certainty their desired position within the within the AR environment 130. For example, the user can quickly rotate 90 degrees to the left or right, perform a 180-degree turn, or turn a specific amount (e.g., 0 to 360 degrees).

FIGS. 7A-7D illustrate examples of automatically repeated snap turns to change the representation of the user's position within the AR environment, in accordance with some embodiments. FIGS. 7A-7D show a user's inputs at distinct points of time and automatically repeated adjustments to their positional representation within the AR environment 130. Similar to FIGS. 4-6B, FIGS. 7A-7D show a positional-control UI 750 including a first positional-control UI element 752 (associated with a left turn positional-control action), a second positional-control UI element 754 (associated with a right turn positional-control action), and a navigation UI element 760. The positional-control UI 750 also includes a tracking element 755, and the navigation UI element 760 includes a turn element 762. The positional-control UI 750 and the navigation UI element 760 are analogous to the positional-control UIs and the navigation UI elements described above in reference to FIGS. 1A-6B.

In some embodiments, the head-wearable device 110 allows for automatically repeated adjustments to the representation of the user 115's position within the AR environment 130 (e.g., rapid perspective changes). In particular, the head-wearable device 110 causes the representation of the user 115's position within the AR environment 130 to change by a predetermined (or variable) sinistral or dextral amount a repeated number of times based on a positional-control action performed by the user 115. For example, when the user 115 drags and holds a held pinch gesture outside of an outer edge of the positional-control UI 750, a predetermined position change is performed (e.g., 60 to 90 degrees) and a countdown is initiated that, when triggered, causes repeated performance of additional predetermined position changes. More specifically, FIGS. 7A-7D build on the examples provided above in reference to FIGS. 5A-6B by showing multiple additional predetermined position changes that can be performed by the user 115 when they hold the pinch gesture outside of the outer edge of the positional-control 750 for a predetermined amount of time.

Figure 7A:
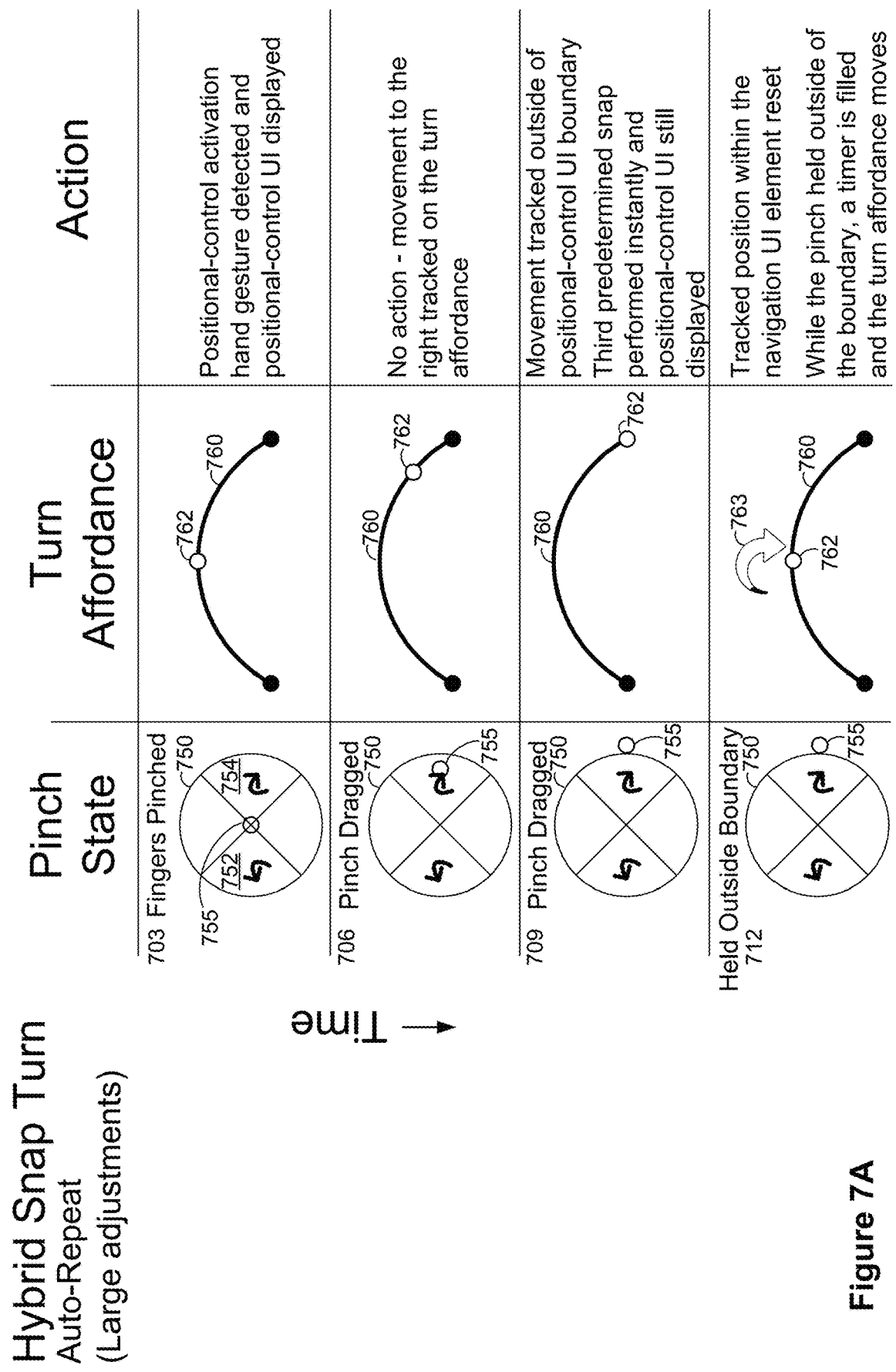

In FIG. 7A, the user 115 performs a positional-control activation hand gesture (e.g., a pinch gesture) at a first point in time 703, which causes the head-wearable device 110 to display the positional-control UI 750. At a second point in time 706, the user 115, while holding the pinch gesture drags the pinch gesture towards the right (e.g., towards the second positional-control UI element 754), which causes the turn element 762, as displayed by the head-wearable device 110, to move towards the right on the navigation UI element 760, and the tracking element 755 to move to right within the positional-control UI 750. At the second point in time 706, the user 115 has not released the pinch gesture and, as a result, no action is performed. At a third point in time 709, the user 115, while holding the pinch gesture, drags the pinch gesture outside of an outer right edge of the positional-control UI 750, which causes the representation of the user 115's position within the AR environment 130 to change by the predetermined amount to the right as described above in reference to FIG. 6A (e.g., 60 to 90 degrees to the right).

At a fourth point in time 712, the user 115, after dragging the held pinch gesture outside of the outer right edge of the positional-control UI 750, holds the held pinch gesture outside of the outer right edge of the positional-control UI 750 (which is represented by the tracking element 755 remaining outside of the outer right edge of the positional-control UI 750). Holding the pinch gesture outside of the outer right edge of the positional-control UI 750 means, in accordance with some embodiments, maintaining the pinch gesture at a predetermined sinistral distance or a predetermined dextral distance from an initial position that the pinch gesture was initially performed. For example, the user 115 can hold the pinch gesture 15 cm to 30 cm to the left or the right of an initial position that the pinch gesture was initially performed.

In some embodiments, when the pinch gesture is held outside of an outer edge of the positional-control UI 750, the head-wearable device 110 causes the turn element 762 to reset or recenter on the navigation UI element 760 and a turn timer UI element 763 to be displayed. The turn element 762 is configured to move in the same direction that the pinch gesture is held the longer the user 115 holds the pinch gesture outside of an outer edge of the positional-control UI 750. The timer UI element 763 provides the user 115 with a visual indicator of a predetermined period of time before an action performed. More specifically, after the pinch gesture is held outside of an outer edge of the positional-control UI 750 for the predetermined period of time, the head-wearable device 110 causes the representation of the user 115's position within the AR environment 130 to change by a predetermined (or variable) sinistral or dextral amount a repeatedly as described below. In some embodiments, the timer UI element 763 is configured to fill the longer the user 115 holds the pinch gesture outside of an outer edge of the positional-control UI 750.

Turning to FIG. 7B where at a fifth point in time 715, while the user 115 continues to hold the pinch gesture outside of the outer right edge of the positional-control UI 750, the timer UI element 763 begins to fill and the turn element 762 starts to move toward the right (e.g., same direction in which the pinch gesture is held outside of an outer edge of the positional-control UI 750). At a sixth point in time 718, the user 115 continues to hold the pinch gesture outside of the outer right edge of the positional-control UI 750 even longer. As a result, the timer UI element 763 continues to fill and the turn element 762 moves further to the right. At a seventh point in time 721, the user 115 holds the pinch gesture outside of the outer right edge of the positional-control UI 750 for the predetermined period of time (as represented by the filled in timer UI element 763 and the turn element 762 at the right endpoint of the navigation UI element 760). When the user 115 holds the pinch gesture outside of the outer right edge of the positional-control UI 750 for the predetermined period of time, the head-wearable device 110 causes the representation of the user 115's position within the AR environment 130 to repeatedly change by an additional predetermined amount to the right. For example, the head-wearable device 110 can causes the representation of the user 115's position within the AR environment 130 to repeatedly change by 5 to 25 degrees to the right until the user 115 reaches a desired position within the AR environment 130. The head-wearable device 110 ceases to causes the representation of the user 115's position within the AR environment 130 to repeatedly change by the additional predetermined amount when the user 115 moves the maintained pinch gesture back within the positional-control UI 750 or releases the pinch gesture.

The predetermined period of time for filling the timer UI element 763 can be 3 to 5 seconds or any amount of time defined by the user 115. In some embodiments, the predetermined period of time for filling the timer UI element 763 is based on how far outside of an outer edge of the positional-control UI 750 that the user 115 holds the pinch gesture. For example, as discussed below, the further from an outer edge of the positional-control UI 750 that the user 115 holds the pinch gesture the less time that is required to fill the timer UI element 763 (and move the turn element 762).

At an eighth point in time 724, the user 115 drags the held pinch gesture to the left such that it is within the second positional-control UI element 754. When the user 115 moves the held pinch gesture back inside the positional-control UI 750, the head-wearable device 110 ceases to causes the representation of the user 115's position within the AR environment 130 to repeatedly change. Additionally, at the eighth point in time 724, the user 115 release the held punch gesture within the second positional-control UI element 754. When the user 115 releases the pinch gesture within the second positional-control UI element 754, the head-wearable device 110 causes the representation of the user's position within the AR environment 130 to instantaneously change another predetermined snap turn to the right as described above in reference to FIGS. 5A-6B. When the user 115 releases the pinch gesture, the head-wearable device 110 ceases to display the positional-control UI 750.

Figure 7C:
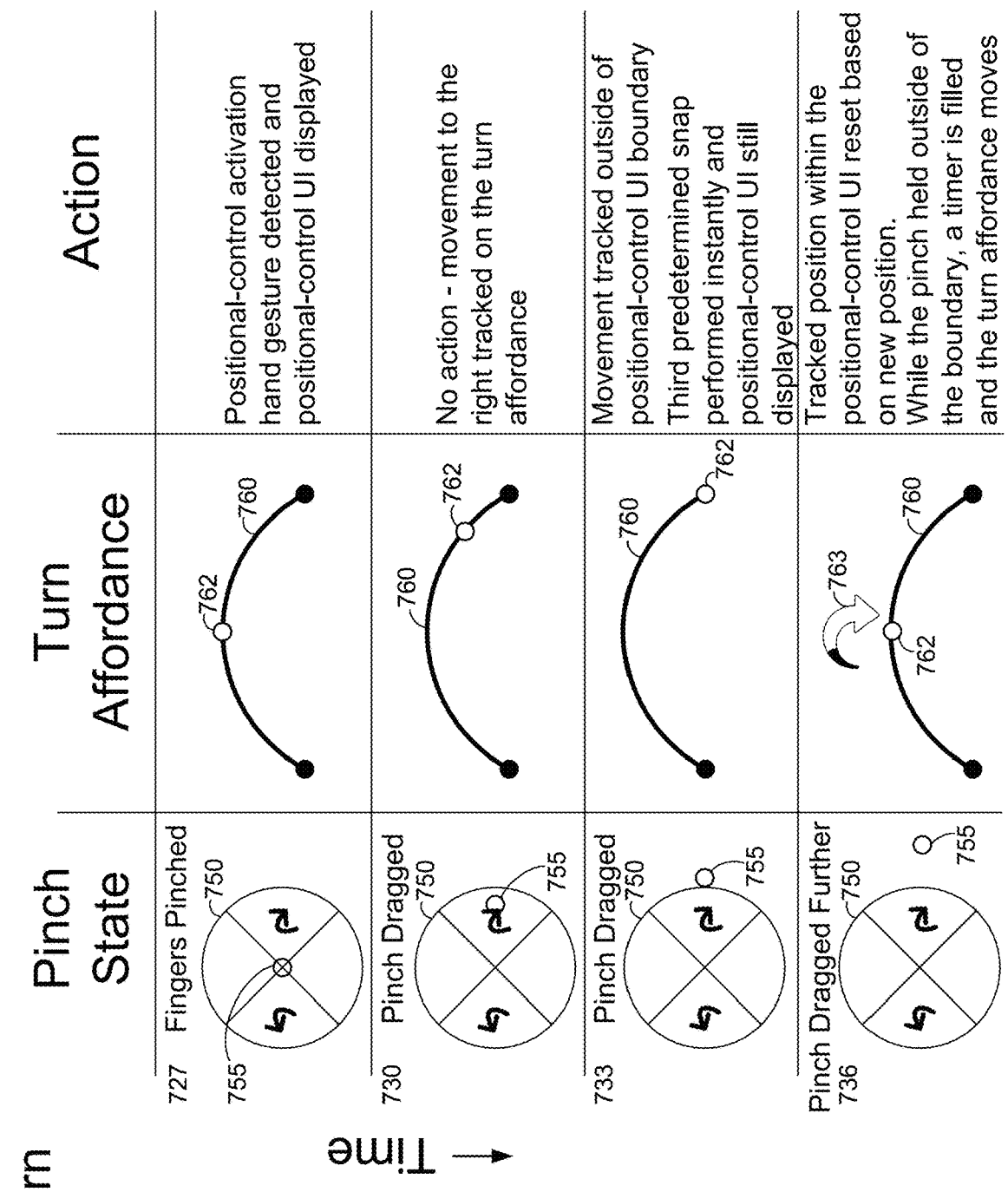

FIGS. 7C and 7D show the user 115 holding the pinch gesture further outside the outer right edge of the positional-control UI 750 to fill the timer UI element 763 faster. The ninth through eleventh points in time 727-733 are similar to the first through third points in time 703-709. At a twelfth point in time 736, the user 115, after dragging the held pinch gesture outside of the outer right edge of the positional-control UI 750, holds the held pinch gesture further outside of the outer right edge of the positional-control UI 750 than shown with respect to the fourth point in time. For example, the user 115 can hold the pinch gesture 30 cm to 40 cm to the left or the right of an initial position that the pinch gesture was initially performed. As a result of holding the pinch gesture outside of the outer right edge of the positional-control UI 750, the head-wearable device 110 causes the turn element 762 to reset or recenter on the navigation UI element 760 and a turn timer UI element 763 to be displayed.

Turning to FIG. 7D, at a thirteenth point in time 739, while the user 115 continues to hold the pinch gesture outside of the outer right edge of the positional-control UI 750, the timer UI element 763 substantially fills and the turn element 762 moves adjacent to the right endpoint of the navigation UI element 760. At a fourteenth point in time 742, the user 115 continues to hold the pinch gesture outside of the outer right edge of the positional-control UI 750, which causes the timer UI element 763 to completely fill and the turn element 762 to move to the right endpoint of the navigation UI element 760. As described above in reference to the seventh point in time 721, the head-wearable device 110 causes the representation of the user 115's position within the AR environment 130 to repeatedly change by an additional predetermined amount to the right (when the timer UI element 763 is filled). As shown by the ninth through the fourteenth points in time 727-742, the user 115 can reduce the predetermined period of time for filling the timer UI element 763 by holding the pinch gesture further outside of an outer edge of the positional-control UI 750. For example, the predetermined period of time for filling the timer UI element 763 can be reduced from 3 to 5 seconds to 1 to 3 seconds. This gives the user 115 greater control of their representation within the AR environment 130 and allows them to finely control their position.

At a fifteenth point in time 745, the user 115 drags the held pinch gesture to the left and releases the pinch gesture within the second positional-control UI element 754 as discussed above in reference to the eighth point in time 724.

The repeated snap turns shown in FIGS. 7A-7D allow the user 115 to quickly adjustments their positional representation within the AR environment 130 while reducing the number of inputs required by the user 115. For example, instead of repeatedly selecting a positional-control UI element, the user 115 can hold a particular gesture and perform multiple adjustments with a at least one input.

Figure 8:
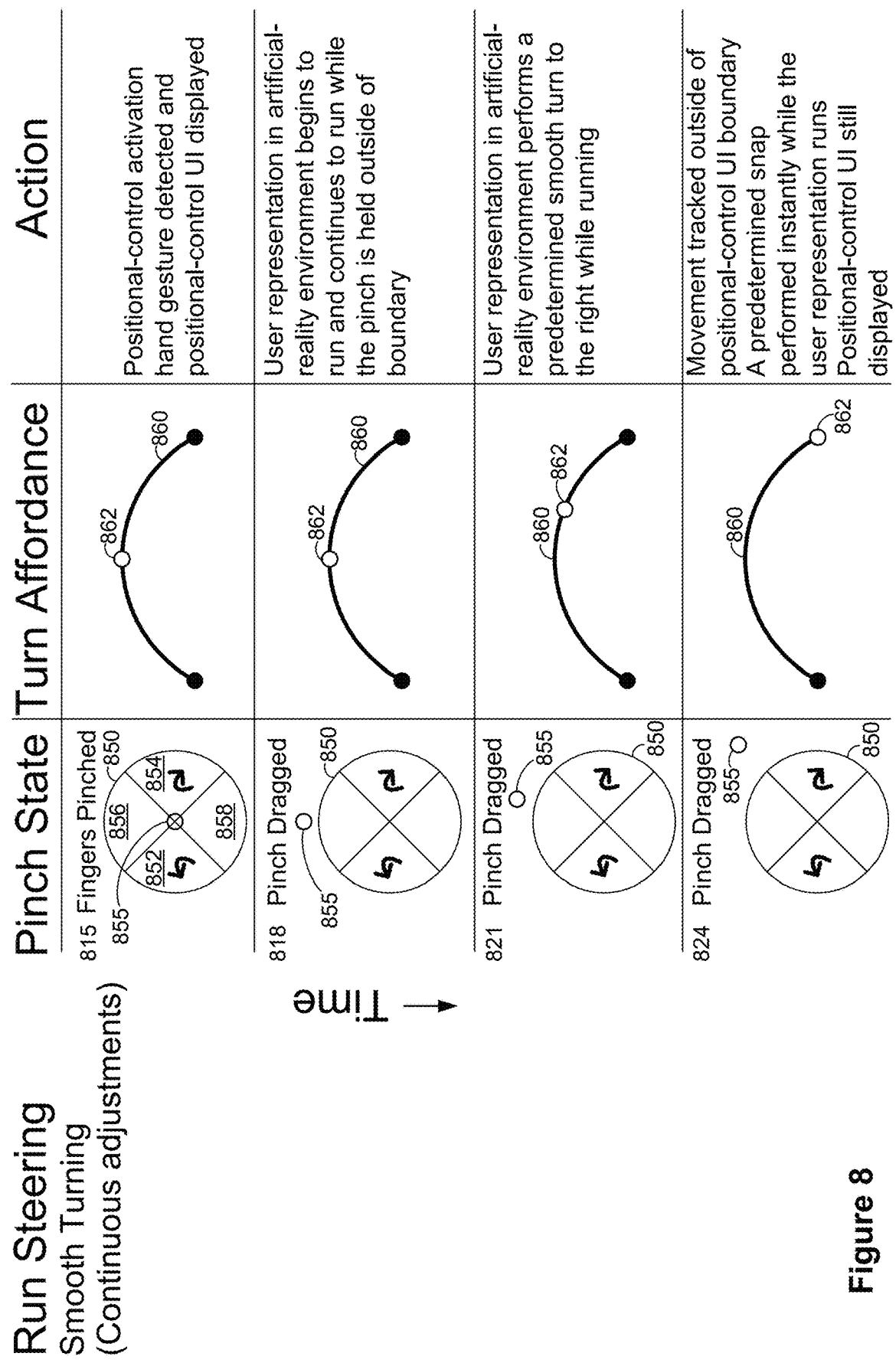
FIG. 8 illustrates run steering or smooth turning to change the representation of the user's position within the artificial-reality environment, in accordance with some embodiments.

FIG. 8 illustrates run steering or smooth turning to change the representation of the user's position within the AR environment, in accordance with some embodiments. FIG. 8 shows a user's inputs at distinct points of time that cause the representation of the user's position within the AR environment to move forward at a predetermined rate, turn while moving forward at a predetermined rate, and/or perform a snap turn while moving forward at the predetermined rate. Similar to FIGS. 4-7D, FIG. 8 shows a positional-control UI 850 including a first positional-control UI element 852 (associated with a left turn positional-control action), a second positional-control UI element 854 (associated with a right turn positional-control action), a third positional-control UI element 856 between the first and second positional-control UI elements 852 and 854 in a forward position (e.g., in the direction of the user's 115 current field of view within the AR environment), a fourth positional-control UI element 858 opposite the third positional-control UI element 856 (e.g., in a back position), and a navigation UI element 860. In this example, the third and fourth positional-control UI elements 856 and 858 are not associated with a respective positional-control action. The positional-control UI 850 also includes a tracking element 855, and the navigation UI element 860 includes a turn element 862. The positional-control UI 850 and the navigation UI element 860 are analogous to the positional-control UIs and the navigation UI elements described above in reference to FIGS. 1A-7D.

In some embodiments, the head-wearable device 110 allows for a user to change their representation within the AR environment 130 at a constant or variable rate in one or more directions. In particular, the head-wearable device 110 causes the representation of the user 115's position within the AR environment 130 to change by a predetermined (or variable) rate in one or more directions based on a positional-control action performed by the user 115. For example, when the user 115 drags and holds a held pinch gesture outside of a front outer edge of the positional-control UI 850 (e.g., beyond or in front of the third positional-control UI element 856), the head-wearable device 110 causes the representation of the user 115's position within the AR environment 130 to walk, jog, run, or otherwise move in a forward direction by a predetermined (or variable) rate. Similarly, when the user 115 drags and holds a pinch gesture outside of a rear outer edge of the positional-control UI 850 (e.g., beyond or behind of the fourth positional-control UI element 858), the head-wearable device 110 causes the representation of the user 115's position within the AR environment 130 to backpedal, step back or otherwise move in a backward direction by a predetermined (or variable) rate. FIG. 8 builds on the examples provided above in reference to FIGS. 5A-7D by showing user 115 inputs that can be used to move their representation within the artificial-realty environment 130 forward or backward at a predetermined or variable rate, as well as turn left or right.

In FIG. 8, the user 115 performs a positional-control activation hand gesture (e.g., a pinch gesture) at a first point in time 815, which causes the head-wearable device 110 to display the positional-control UI 850. At a second point in time 818, the user 115, while holding the pinch gesture, drags the pinch gesture forward outside of an outer front edge of the positional-control UI 850 (e.g., in front of the third positional-control UI element 856 as shown by the tracking element 855). When the user 115 drags the pinch gesture outside of the outer front edge of the positional-control UI 850, the head-wearable device 110 causes the representation of the user 115 within the AR environment 130 to move forward at a predetermined rate. In some embodiments, the predetermined rate at which the head-wearable device 110 causes the representation of the user 115 within the AR environment 130 to move forward is based on how far forward (from the outer front edge of the positional-control UI 850) the user 115 drags the held pinch gesture. More specially, the further forward (from the outer front edge of the positional-control UI 850) the user 115 holds the pinch gesture, the greater the predetermined rate at which the representation of the user 115 within the AR environment 130 moves forward.

In some embodiments, the predetermined rate is a variable rate based on how fast the user 115 drags their pinch gesture in a particular direction. For example, when a user holds and drags a pinch gesture forward from a first position within the positional-control UI 850 to a second position outside of the outer front edge of the positional-control UI 850 within a first predetermined period of time (e.g., within 1 second), the head-wearable device 110 causes the representation of the user 115 within the AR environment 130 to move forward at a first rate. Alternatively, when the user holds and drags a pinch gesture forward from the first position within the positional-control UI 850 to the second position outside of the outer front edge of the positional-control UI 850 within a second predetermined period of time (e.g., within 0.5 seconds), the head-wearable device 110 causes the representation of the user 115 within the AR environment 130 to move forward at a second rate greater than the first rate. Additionally or alternatively, in some embodiments, the head-wearable device 110 causes the representation of the user 115 within the AR environment 130 to transition between different rates. For example, if the first rate is a walking rate (e.g., 2-4 MPH in the AR environment 130) and the second rate is a sprinting rate (e.g., 9-15 MPH in the AR environment 130), when the user 115 holds and drags the to cause their representation the user 115 within the AR environment 130 to change from the first rate to the second rate, the head-wearable device causes the representation of the user 115 within the AR environment 130 to move forward at a transitionary rate that starts from the first rate an continuously increases until the second rate is reached. In other words, the head-wearable device 110 can cause the representation of the user 115 within the AR environment 130 to transition from a stationary position to a walk, from the walk to a power walk, from the power walk to a jog, from the jog to a run, from the run to a sprint, etc.

At a third point in time 821, the user 115, while holding the pinch gesture outside of the outer front edge of the positional-control UI 850, drags the pinch gesture to the right (as represented by the tracking element 855 and the turn element 862 moving slightly to the right into a region above the second positional-control UI elements 854). When the user 115 drags the held pinch gesture to the right, the head-wearable device 110 causes the representation of the user 115's position within the AR environment 130 to change at a predetermined rate in at least two directions (e.g., forward and to the right). The further to the right that the user 115 drags the held pinch gesture, the greater the predetermined rate to the right (e.g., a sharper continuous right turn is performed); and/or the further forward that the user 115 drags the held pinch gesture, the greater the predetermined rate to the front (e.g., a run or sprint is performed). If the user 115 drags the held pinch gesture to the left, the predetermined rate to the right is decreased until it reaches zero and/or a predetermined rate to the left is increased (if the user 115 drags and holds the pinch gesture into a region above the first positional-control UI element 852). Similarly, if the user 115 drags the held pinch gesture back (e.g., towards the third positional-control UI element 856), the predetermined rate to the front is decreased until it reaches zero and/or a predetermined rate to the back is increased (e.g., if the user 115 drags and holds the pinch gesture beyond or behind of the fourth positional-control UI element 858).

At a fourth point in time 824, the user 115 drags the pinch gesture outside of an outer right edge of the positional-control UI 850, which causes the representation of the user 115's position within the AR environment 130 to change by the predetermined amount to the right (as described above in reference to FIG. 6A (e.g., 60 to 90 degrees to the right)) while also causing the representation of the user 115's position within the AR environment 130 to change at a predetermined rate in the front. In other words, the head-wearable device 110 can cause the representation of the user 115's position within the AR environment 130 to perform a snap turn (or instant 60 to 90 degree turn) while walking, jogging, running, etc. In some embodiments, the positional-control UI 850 is displayed until the pinch gesture is released.

The smooth turning shown in FIG. 8 allows the user 115 to emulate real-world movement by causing the representation of the user 115's position within the AR environment 130 to move and turn continuously. Smooth turning improves a user 115's immersion in the AR environment 130 and improves their overall experience.

Figure 9:
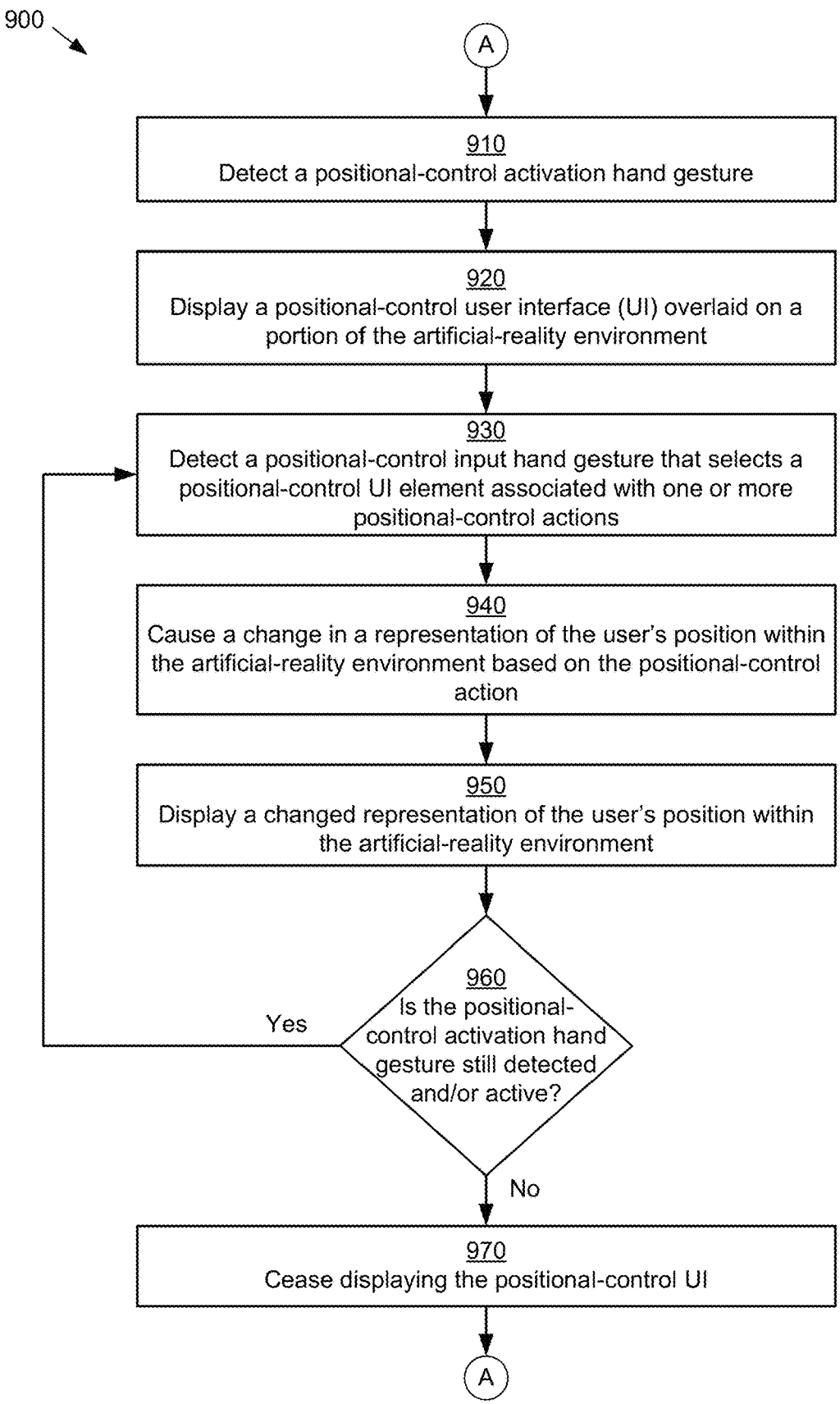
FIG. 9 illustrates a flow diagram of a method of adjusting a representation of a user's position within an artificial-reality application using a hand gesture, in accordance with some embodiments.

FIG. 9 illustrates a flow diagram of a method of adjusting a representation of a user's position within an AR application using a hand gesture, in accordance with some embodiments. Operations (e.g., steps) of the method 900 can be performed by one or more processors (e.g., central processing unit and/or MCU; processors 1279, 1348, 1477, and 1577 (FIGS. 12A-15C) of a system including a head-wearable device 110 (e.g., AR systems 1100a-1100d; FIGS. 11A-11D-2, as well as FIGS. 1A-1G). In some embodiments, the head-wearable device 110 is coupled with one or more sensors (e.g., various sensors discussed in reference to FIGS. 12A-15C, such as a heart rate sensor, IMU, an EMG sensor, SpO2 sensor, altimeter, thermal sensor or thermal couple, ambient light sensor, ambient noise sensor), a display, a speaker, an image device (e.g., a camera), and a microphone to perform the one or more operations. At least some of the operations shown in FIG. 9 correspond to instructions stored in a computer memory or computer-readable storage medium (e.g., storage, RAM, and/or memory 1280, 1350, 1478, and 1578 (FIGS. 12A-15C)). Operations of the method 900 can be performed by the head-wearable device 110 alone or in conjunction with one or more processors and/or hardware components of another device communicatively coupled to the head-wearable device 110 (e.g., a wrist-wearable device 120, a handheld intermediary processing device 1400, a smartphone 1150, a laptop, a tablet, etc.) and/or instructions stored in memory or computer-readable medium of the other device communicatively coupled to the head-wearable device 110.

The method 900 includes detecting (910) a positional-control activation hand gesture and, in response to detecting a positional-control activation hand gesture, displaying (920) a positional-control UI overlaid on a portion of the AR environment. For example, as shown and described above in reference to FIGS. 1A-8, when an indication that a positional-control activation hand gesture is first performed (e.g., a pinch gesture), the head-wearable device 110 can cause a positional-control UI 150 to be overlaid on a portion of an AR environment 130. The positional-control UI 150 can include one or more positional-control UI elements that are associated with respective positional-control actions.

The method 900 includes detecting (930) a positional-control input hand gesture that selects a positional-control UI element associated with one or more positional-control actions and, in response to detecting the positional-control input hand gesture, causing (940) a change in a representation of the user's position within the AR environment based on the positional-control action. For example, as shown and described above in reference to FIGS. 1A-8, the user 115 can select a positional-control UI element (e.g., first through fourth positional-control UI elements 152 through 158) and/or trigger one or more positional-control UI elements based on performed positional-control input hand gestures (e.g., a released pinch gesture, a held pinch gesture, a pinch gesture held and dragged outside the positional-control UI 150, etc.). The different positional-control actions include, but are not limited to, walking, jobbing, running, turning left, turning right, jumping, crouching, teleporting, sliding, strafing, changing a field-of-view, etc. Non-positional control actions can also be performed using one or more user input hand gesture, such as interactions with one or more objects in an AR environment 130, interaction with one or more applications, one or more AR environment 130 specific commands (e.g., inputs within a game or application), etc. After causing the change in the representation of the user's position within the AR environment, the method 900 includes displaying (950) a changed representation of the user's position within the AR environment.

The method 900 further includes determining (960) whether the positional-control activation hand gesture is still detected and/or active. In some embodiments, the positional-control activation hand gesture is detected as long as the user maintains the initial gesture (e.g., the user holds the initial pinch gesture performed at operation 910). In some embodiments, the positional-control activation hand gesture is active until positional-control input hand gesture is performed or a predetermined time period elapses (e.g., 10 seconds, 20 seconds, 30 seconds, etc. without any user input). In some embodiments, the user can perform a positional-control deactivation hand gesture (e.g., a hand wave, a wrist rotation, a hand shake, etc.).

In accordance with a determination that the positional-control activation hand gesture is still detected and/or active ("Yes" at operation 960), the method 900 returns to operation 930 to detect any additional positional-control input hand gestures. Alternatively, in accordance with a determination that the positional-control activation hand gesture is not detected and/or no longer active ("No" at operation 960), the method 900 includes ceasing (970) to display the positional-control UI.

Figure 10:
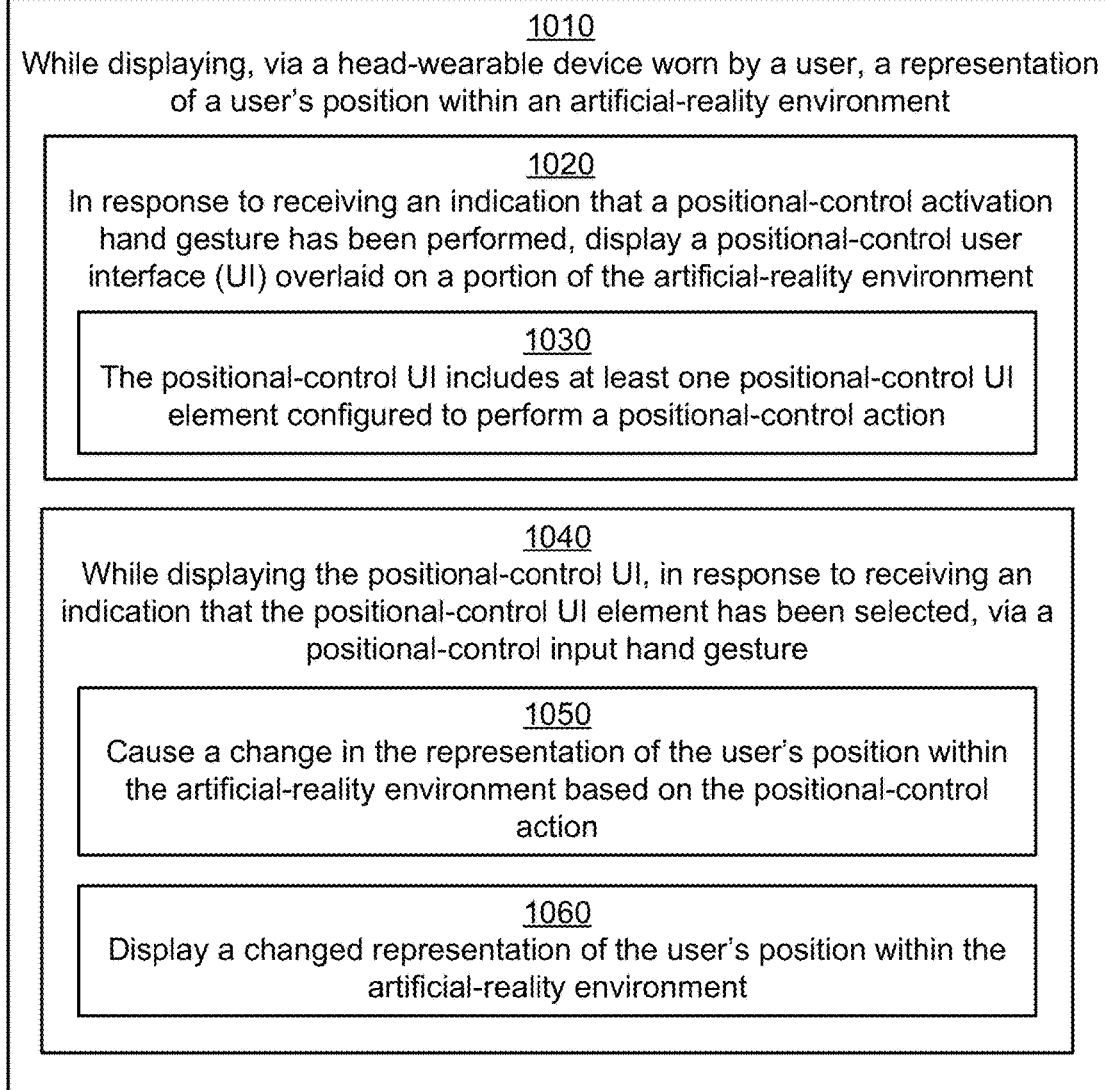
FIG. 10 illustrates a detailed flow diagram of a method of adjusting a representation of a user's position within an artificial-reality application using a hand gesture, in accordance with some embodiments.

FIG. 10 illustrates a detailed flow diagram of a method of adjusting a representation of a user's position within an AR application using a hand gesture, in accordance with some embodiments. Similar to method 900 of FIG. 9, operations of the method 1000 can be performed by one or more processors of a system 1100 including a head-wearable device 110. At least some of the operations shown in FIG. 10 correspond to instructions stored in a computer memory or computer-readable storage medium. Operations of the method 1000 can be performed by the head-wearable device 110 alone or in conjunction with one or more processors and/or hardware components of another device (e.g., a wrist-wearable device 120 and/or an handheld intermediary processing device 1400 described below in reference to FIGS. 11A-11D-2) communicatively coupled to the head-wearable device 110 and/or instructions stored in memory or computer-readable medium of the other device communicatively coupled to the head-wearable device 110.

Method 1000 can be performed while a representation of a user's position within an AR environment is displayed (1010) to the user (e.g., via a worn head-wearable device 110). The method 100 includes, in response to receiving an indication that a positional-control activation hand gesture has been performed, displaying (1020) a positional-control UI overlaid on a portion of the AR environment. In some embodiments, the positional-control UI 150 is displayed at an initial position within the AR environment based on where a representation of the user's hand is within the AR environment when the positional-control input hand gesture is detected. In other words, the positional-control UI 150 is displayed at the location of the user 115's hand within the AR environment 130 when the positional-control activation hand gesture is performed. The positional-control UI includes (1030) a positional-control UI element configured to perform a positional-control action. For example, as shown and described above in reference to FIGS. 1A-1G, the user 115 can perform a positional-control activation hand gesture (e.g., a pinch gesture) that, when detected, causes a positional-control UI 150 to be displayed by the head-wearable device 110.

In some embodiments, the positional-control UI includes a plurality positional-control UI element (e.g., a first positional-control UI element, a second positional-control UI element, a third positional-control UI element, etc.). Each positional-control UI element of the plurality of positional-control UI elements can be associated with a respective positional-control action. Each positional-control UI element forms a portion of the positional-control UI 150. In some embodiments, one or more positional-control UI elements of the plurality of positional-control UI elements are continuous. Different examples of the positional-control UI elements included in the positional-control UI 150 are shown and described above in reference to FIGS. 1A-8. Although the primary examples disclosed relate to position adjustments, an artisan skilled in the art can appreciate that application specific action can be mapped to different UI elements. For example, jumping, shooting a gun, interacting with the environment, etc.

In some embodiments, the method 1000 includes displaying at least on additional positional-control UI element adjacent to the positional-control UI, the additional positional-control UI element configured to perform an additional positional-control action (e.g., a jump command as shown and described above in reference to FIG. 2). In some embodiments, the method 1000 includes displaying a navigation UI element overlaid on another portion of the AR environment adjacent to the positional-control UI. The navigation UI element is configured to display a representation of the user's hand movements with respect to the positional-control UI. In some embodiments, the navigation UI element displays the user's hand movements as the user's hand moves from left to right. Additional examples of the navigation UI element 160 are provided above in reference to FIGS. 4-8.

The method 1000 includes, while the positional-control UI is displaying, in response to receiving (1040) an indication that the positional-control UI element has been selected, via a positional-control input hand gesture, causing (1050) a change in the representation of the user's position within the AR environment based on the positional-control action, and displaying (1060) a changed representation of the user's position within the AR environment.

In some embodiments, the positional-control UI element is a first positional-control UI element, the positional-control action is a first positional-control action, the positional-control UI further includes a second positional-control UI element configured to perform a second positional-control action, and the positional-control input hand gesture is a first positional-control input hand gesture. In some embodiments, the method 1000 further includes, while displaying the positional-control UI, in response to receiving an indication that the second positional-control UI element has been selected, via a second positional-control input hand gesture, causing another change in the representation of the user's position within the AR environment based on the second positional-control action, and displaying another changed representation of the user's position within the AR environment. In other words, each positional-control UI element can be associated with a respective positional-control action. Each positional-control UI element can be selected by a positional-control input hand gesture, as described above in reference to FIGS. 1A-8.

In some embodiments, the positional-control action is a perspective change, and causing the change in the representation of the user's position within the AR environment based on the positional-control action includes instantaneously causing a variable sinistral or variable dextral change in a perspective of the representation of the user's position within the AR environment. For example, as described above in reference to FIGS. 5A and 5B, the user 115 can select different positional-control UI elements (e.g., via a pinch gesture, releasing a pinch gesture, etc.) to cause their representation within an AR environment 130 to change their perspective to the left or right by a predetermined amount (e.g., 0 to 30 degrees, 0 to 60 degrees, 0 to 90 degrees, etc.). In some embodiments, the user 115 can perform a variable position change based on a location, relative to the positional-control UI 150, that the positional-control input hand gesture is performed. A magnitude of the variable sinistral or variable dextral change can be based on a location, relative to the positional-control UI, that the positional-control input hand gesture is performed. In other words, a magnitude of the perspective change is based on where the positional-control input hand is performed relative to positional-control UI 150. For example, if the user 115 performs the positional-control input hand gesture at or outside of the positional-control UI boundary, the variable position change may be an instant 30° change. Alternatively, if the gesture is performed halfway between the boundary and the center point, then the variable position change may be an instant 15° change. Additional examples of perspective changes are provided above in reference to FIGS. 5A-8.

In some embodiments, the positional-control action is an instant position change (e.g., teleportation), and causing the change in the representation of the user's position within the AR environment based on the positional-control action includes instantaneously causing a variable position change to the representation of the user's position within the AR environment such that the user's position is adjusted by the variable position change. In some embodiments, a magnitude of the variable position change is based on a location, relative to the positional-control UI, that the positional-control input hand gesture is performed. As described above, the magnitude of the teleportation can be based on where the position-control action is performed. For example, if the user performs the action at or outside of the positional-control UI boundary, the teleportation may be an instant positional change (e.g., a 5 meter (or other value) instant positional change within the AR environment 130). Alternatively, if the gesture is performed halfway between the boundary and the center point, then the teleportation may be a smaller instant positional change (e.g., a 2 meter instant positional change within the AR environment 130). Additional examples of instant position changes are provided above in reference to FIG. 2.

In some embodiments, the positional-control action is a continuous position change (e.g., running); and causing the change in the representation of the user's position within the AR environment based on the positional-control action includes continuously causing a predetermined constant position change to the representation of the user's position within the AR environment such that the user's position is continuously adjusted by the predetermined constant position change. In some embodiments, the predetermined constant position change is based on a location, relative to the positional-control UI, that the positional-control input hand gesture is performed. In other words, a magnitude of the constant position change is based on where the position-control action is performed. For example, if the user performs the action at or outside of the positional-control UI boundary, the constant may be at a maximum (e.g., a full sprint). Alternatively, if the gesture is performed halfway between the boundary and the center point, then the run may be a jog or half sprint. Additional examples of the continuous position changes are provided above in reference to FIGS. 3 and 8.

In some embodiments, the positional-control input hand gesture is maintained and the positional-control action is based on movement a user's hand while the positional-control input hand gesture is maintained. In other words, the user 115's hand can be tracked such that a positional-control input hand gesture performs a different position-control action based on the positional-control input hand gesture's location relative to the positional-control UI 150. For example, based on the positional-control input hand gesture performed by the user 115, the user 115's representation within the AR environment 130 can transition from walking to running, looking left to looking right; etc. In some embodiments, the user 115 can maintain the positional-control input hand gesture (which is tracked) to perform multiple positional-control actions. For example, the user 115 can perform positional-control input hand gestures to perform a running jump, a diagonal walk or run (e.g., movement in at least two directions), an interaction with an object while moving, a non-positional-control action in conjunction with a positional-control action (e.g., aim and shoot a rifle or throw an object while moving), etc. Additional examples of tracked positional-control input hand gestures are provided above in reference to FIGS. 5A-8.

In some embodiments, the positional-control UI is associated with a UI boundary, and the method 1000 further includes, in response to detecting that a relative position the representation of the user's hand within the AR environment moves outside of the UI boundary performing the positional-control action, and continuing to display the positional-control UI. In other words, in some embodiments, when a user 115 moves their hand outside of a boundary area defined by the positional-control UI 150, an associated positional-control action is automatically performed and the positional-control UI remains still displayed. This allows the user to quickly select a positional-control UI element and continue to adjustments the representation of their position within the AR environment 130 as desired. For example, when the positional-control input hand gesture is performed and held outside of a positional-control UI 150, the perspective changes is performed and the positional-control UI 150 remains displayed to allow the user 115 to perform additional positional-control input hand gestures. In another example, when the positional-control input hand gesture is performed and held outside of a positional-control UI 150, the instant positional change is performed and the positional-control UI 150 remains displayed to allow the user 115 to perform additional positional-control input hand gestures. Additional examples of positional-control actions performed when a positional-control input hand gesture is detected outside of a UI boundary of a positional-control UI 150 are provided above in reference to FIGS. 6A-8.

In some embodiments, the method 1000 includes, while displaying the positional-control UI, receiving an indication that a non-positional control input hand gesture is performed, preforming a non-positional-control action associated with the non-positional control input hand gesture, and continuing to display the positional-control UI.

In some embodiments, the method 1000 includes, while displaying the first positional-control UI, in response to receiving an indication that another positional-control activation hand gesture has been performed ceasing to display the first positional-control UI, and displaying a second positional-control UI, in place of the first positional-control UI, overlaid on the portion of the AR environment. The second positional-control UI includes at least a third positional-control UI element configured to perform a third positional-control action. The method 1000, while displaying the second positional-control UI, includes, in response to receiving an indication that the third positional-control UI element has been selected, causing a change in the representation of the user's position within the AR environment based on the third positional-control action, and displaying a changed representation of the user's position within the AR environment. The first positional-control UI element and the first positional-control action are distinct from the third positional-control UI element and the third positional-control action, respectively. In other words, the second positional-control UI 170 can be used by the user 115 to perform at least one positional-control action that cannot be performed using the first positional-control UI 150. Examples of the different positional-control UIs are provided above in reference to FIGS. 1A-1G. For example, the user 115 can perform an additional positional-control activation hand gesture (e.g., turning their hand palm-side up), that, when detected, causes the head-wearable device 110 to present a second positional-control UI 170 in place of the first positional-control UI 150.

In some embodiments, the positional-control activation hand gesture is performed by a first hand and the positional-control UI is a first positional-control UI, and the method 1000 further includes, while displaying the first positional-control UI, in response to receiving an indication that a third positional-control activation hand gesture has been performed by a second hand of the user, displaying a third positional-control UI overlaid on another portion of the AR environment. The third positional-control UI include a respective positional-control UI element configured to perform a respective positional-control action. The method includes, while displaying the third positional-control UI, in response to receiving an indication that the respective positional-control UI element has been selected, via a third positional-control input hand gesture performed by the second hand of the user, causing a change in the representation of the user's position within the AR environment based on the respective positional-control action, and displaying a changed representation of the user's position within the AR environment. In other words, as shown in FIG. 2, a first positional-control activation hand gesture performed a first hand and a second positional-control activation hand gesture performed by a second hand cause respective positional-control UIs to be presented (e.g., a first positional-control UIs for user inputs via their right hand and a second positional-control UIs for user inputs via their left hand). In some embodiments, respective positional-control UIs for a user 115's first and second hands can be presented at the same time. This allows the user 115 to use each hand to provide inputs (e.g., in-air hand gesture.)

In some embodiments, the method 1000 includes, after displaying the changed representation of the user's position within the AR environment, ceasing to display the positional-control UI.

While the primary examples discussed herein relate to the use of hand gestures to control AR movements, it is also contemplated that the use of layered interfaces (e.g., layers shown in at least FIGS. 2 and 3) for controller-based interactions (not limited to only hand gestures and controller-based gestures can also be used to supplement the hand-gesture-based interactions) is also a promising area. For example, the layered locomotion control interface discussed above in connection with FIGS. 1A-10 can also be activated and controlled using a handheld controller and not only by way of hand gestures. For example, one or more buttons and/or triggers on a controller can be used to change the button layouts of a controller. Alternatively, the controller can be tilted or rotated to change the button layouts of a controller.

The devices described above are further detailed below, including systems, wrist-wearable devices, headset devices, and smart textile-based garments. Specific operations described above may occur as a result of specific hardware, such hardware is described in further detail below. The devices described below are not limiting and features on these devices can be removed or additional features can be added to these devices. The different devices can include one or more analogous hardware components. For brevity, analogous devices and components are described below. Any differences in the devices and components are described below in their respective sections.

As described herein, a processor (e.g., a central processing unit (CPU) or microcontroller unit (MCU)), is an electronic component that is responsible for executing instructions and controlling the operation of an electronic device (e.g., a wrist-wearable device 1200, a head-wearable device, an HIPD 1400, a smart textile-based garment 1500, or other computer system). There are various types of processors that may be used interchangeably or specifically required by embodiments described herein. For example, a processor may be (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) a graphics processing unit (GPU) designed to accelerate the creation and rendering of images, videos, and animations (e.g., virtual-reality animations, such as three-dimensional modeling); (iv) a field-programmable gate array (FPGA) that can be programmed and reconfigured after manufacturing and/or customized to perform specific tasks, such as signal processing, cryptography, and machine learning; (v) a digital signal processor (DSP) designed to perform mathematical operations on signals such as audio, video, and radio waves. One of skill in the art will understand that one or more processors of one or more electronic devices may be used in various embodiments described herein.

As described herein, controllers are electronic components that manage and coordinate the operation of other components within an electronic device (e.g., controlling inputs, processing data, and/or generating outputs). Examples of controllers can include (i) microcontrollers, including small, low-power controllers that are commonly used in embedded systems and Internet of Things (IOT) devices; (ii) programmable logic controllers (PLCs) that may be configured to be used in industrial automation systems to control and monitor manufacturing processes; (iii) system-on-a-chip (SoC) controllers that integrate multiple components such as processors, memory, I/O interfaces, and other peripherals into a single chip; and/or DSPs. As described herein, a graphics module is a component or software module that is designed to handle graphical operations and/or processes, and can include a hardware module and/or a software module.

As described herein, memory refers to electronic components in a computer or electronic device that store data and instructions for the processor to access and manipulate. The devices described herein can include volatile and non-volatile memory. Examples of memory can include (i) random access memory (RAM), such as DRAM, SRAM, DDR RAM or other random access solid state memory devices, configured to store data and instructions temporarily; (ii) read-only memory (ROM) configured to store data and instructions permanently (e.g., one or more portions of system firmware and/or boot loaders); (iii) flash memory, magnetic disk storage devices, optical disk storage devices, other non-volatile solid state storage devices, which can be configured to store data in electronic devices (e.g., universal serial bus (USB) drives, memory cards, and/or solid-state drives (SSDs)); and (iv) cache memory configured to temporarily store frequently accessed data and instructions. Memory, as described herein, can include structured data (e.g., SQL databases, MongoDB databases, GraphQL data, or JSON data). Other examples of memory can include: (i) profile data, including user account data, user settings, and/or other user data stored by the user; (ii) sensor data detected and/or otherwise obtained by one or more sensors; (iii) media content data including stored image data, audio data, documents, and the like; (iv) application data, which can include data collected and/or otherwise obtained and stored during use of an application; and/or any other types of data described herein.

As described herein, a power system of an electronic device is configured to convert incoming electrical power into a form that can be used to operate the device. A power system can include various components, including (i) a power source, which can be an alternating current (AC) adapter or a direct current (DC) adapter power supply; (ii) a charger input that can be configured to use a wired and/or wireless connection (which may be part of a peripheral interface, such as a USB, micro-USB interface, near-field magnetic coupling, magnetic inductive and magnetic resonance charging, and/or radio frequency (RF) charging); (iii) a power-management integrated circuit, configured to distribute power to various components of the device and ensure that the device operates within safe limits (e.g., regulating voltage, controlling current flow, and/or managing heat dissipation); and/or (iv) a battery configured to store power to provide usable power to components of one or more electronic devices.

As described herein, peripheral interfaces are electronic components (e.g., of electronic devices) that allow electronic devices to communicate with other devices or peripherals and can provide a means for input and output of data and signals. Examples of peripheral interfaces can include (i) USB and/or micro-USB interfaces configured for connecting devices to an electronic device; (ii) Bluetooth interfaces configured to allow devices to communicate with each other, including Bluetooth low energy (BLE); (iii) near-field communication (NFC) interfaces configured to be short-range wireless interfaces for operations such as access control; (iv) POGO pins, which may be small, spring-loaded pins configured to provide a charging interface; (v) wireless charging interfaces; (vi) global-position system (GPS) interfaces; (vii) Wi-Fi interfaces for providing a connection between a device and a wireless network; and (viii) sensor interfaces.

As described herein, sensors are electronic components (e.g., in and/or otherwise in electronic communication with electronic devices, such as wearable devices) configured to detect physical and environmental changes and generate electrical signals. Examples of sensors can include (i) imaging sensors for collecting imaging data (e.g., including one or more cameras disposed on a respective electronic device); (ii) biopotential-signal sensors; (iii) inertial measurement unit (e.g., IMUs) for detecting, for example, angular rate, force, magnetic field, and/or changes in acceleration; (iv) heart rate sensors for measuring a user's heart rate; (v) SpO2 sensors for measuring blood oxygen saturation and/or other biometric data of a user; (vi) capacitive sensors for detecting changes in potential at a portion of a user's body (e.g., a sensor-skin interface) and/or the proximity of other devices or objects; and (vii) light sensors (e.g., time-of-flight sensors, infrared light sensors, or visible light sensors), and/or sensors for sensing data from the user or the user's environment. As described herein biopotential-signal-sensing components are devices used to measure electrical activity within the body (e.g., biopotential-signal sensors). Some types of biopotential-signal sensors include: (i) electroencephalography (EEG) sensors configured to measure electrical activity in the brain to diagnose neurological disorders; (ii) electrocardiography (ECG or EKG) sensors configured to measure electrical activity of the heart to diagnose heart problems; (iii) electromyography (EMG) sensors configured to measure the electrical activity of muscles and diagnose neuromuscular disorders; (iv) electrooculography (EOG) sensors configured to measure the electrical activity of eye muscles to detect eye movement and diagnose eye disorders.

As described herein, an application stored in memory of an electronic device (e.g., software) includes instructions stored in the memory. Examples of such applications include (i) games; (ii) word processors; (iii) messaging applications; (iv) media-streaming applications; (v) financial applications; (vi) calendars; (vii) clocks; (viii) web browsers; (ix) social media applications, (x) camera applications, (xi) web-based applications; (xii) health applications; (xiii) artificial-reality (AR) applications, and/or any other applications that can be stored in memory. The applications can operate in conjunction with data and/or one or more components of a device or communicatively coupled devices to perform one or more operations and/or functions.

As described herein, communication interface modules can include hardware and/or software capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document. A communication interface is a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, or Bluetooth). In some embodiments, a communication interface can refer to a software layer that enables different software programs to communicate with each other (e.g., application programming interfaces (APIs) and protocols such as HTTP and TCP/IP).

As described herein, a graphics module is a component or software module that is designed to handle graphical operations and/or processes, and can include a hardware module and/or a software module.

As described herein, non-transitory computer-readable storage media are physical devices or storage medium that can be used to store electronic data in a non-transitory form (e.g., such that the data is stored permanently until it is intentionally deleted or modified).

Example AR Systems

FIGS. 11A-11D-2 illustrate example AR systems, in accordance with some embodiments. FIG. 11A shows a first AR system 1100a and first example user interactions using a wrist-wearable device 1200, a head-wearable device (e.g., AR device 1300), and/or a handheld intermediary processing device (HIPD) 1400. FIG. 11B shows a second AR system 1100b and second example user interactions using a wrist-wearable device 1200, AR device 1300, and/or an HIPD 1400. FIGS. 11C-1 and 11C-2 show a third AR system 1100c and third example user interactions using a wrist-wearable device 1200, a head-wearable device (e.g., virtual-reality (VR) device 1310), and/or an HIPD 1400. FIGS. 11D-1 and 11D-2 show a fourth AR system 1100d and fourth example user interactions using a wrist-wearable device 1200, VR device 1310, and/or a smart textile-based garment 1500 (e.g., wearable gloves, haptic gloves). As the skilled artisan will appreciate upon reading the descriptions provided herein, the above-example AR systems (described in detail below) can perform various functions and/or operations described above with reference to FIGS. 1A-10.

The wrist-wearable device 1200 and its constituent components are described below in reference to FIGS. 12A-12B, the head-wearable devices and their constituent components are described below in reference to FIGS. 13A-13D, and the HIPD 1400 and its constituent components are described below in reference to FIGS. 14A-14B. The smart textile-based garment 1500 and its one or more components are described below in reference to FIGS. 15A-15C. The wrist-wearable device 1200, the head-wearable devices, and/or the HIPD 1400 can communicatively couple via a network 1125 (e.g., cellular, near field, Wi-Fi, personal area network, or wireless LAN). Additionally, the wrist-wearable device 1200, the head-wearable devices, and/or the HIPD 1400 can also communicatively couple with one or more servers 1130, computers 1140 (e.g., laptops or computers), smart phones 1150 (e.g., and other mobile devices such as tablets), and/or other electronic devices via the network 1125 (e.g., cellular, near field, Wi-Fi, personal area network, or wireless LAN). Similarly, the smart textile-based garment 1500, when used, can also communicatively couple with the wrist-wearable device 1200, the head-wearable devices, the HIPD 1400, the one or more servers 1130, the computers 1140, the smartphone 1150 (e.g., and other mobile devices), and/or other electronic devices via the network 1125.

Turning to FIG. 11A, a user 1102 is shown wearing the wrist-wearable device 1200 and the AR device 1300, and having the HIPD 1400 on their desk. The wrist-wearable device 1200, the AR device 1300, and the HIPD 1400 facilitate user interaction with an AR environment. In particular, as shown by the first AR system 1100a, the wrist-wearable device 1200, the AR device 1300, and/or the HIPD 1400 cause presentation of one or more avatars 1104, digital representations of contacts 1106, and virtual objects 1108. As discussed below, the user 1102 can interact with the one or more avatars 1104, digital representations of the contacts 1106, and virtual objects 1108 via the wrist-wearable device 1200, the AR device 1300, and/or the HIPD 1400.

The user 1102 can use any of the wrist-wearable device 1200, the AR device 1300, and/or the HIPD 1400 to provide user inputs. For example, the user 1102 can perform one or more hand gestures that are detected by the wrist-wearable device 1200 (e.g., using one or more EMG sensors and/or IMUs, described below in reference to FIGS. 12A-12B) and/or AR device 1300 (e.g., using one or more image sensors or cameras, described below in reference to FIGS. 13A-13B) to provide a user input. Alternatively, or additionally, the user 1102 can provide a user input via one or more touch surfaces of the wrist-wearable device 1200, the AR device 1300, and/or the HIPD 1400, and/or voice commands captured by a microphone of the wrist-wearable device 1200, the AR device 1300, and/or the HIPD 1400. In some embodiments, the wrist-wearable device 1200, the AR device 1300, and/or the HIPD 1400 include a digital assistant to help the user in providing a user input (e.g., completing a sequence of operations, suggesting different operations or commands, providing reminders, or confirming a command). In some embodiments, the user 1102 can provide a user input via one or more facial gestures and/or facial expressions. For example, cameras of the wrist-wearable device 1200, the AR device 1300, and/or the HIPD 1400 can track the user 1102's eyes for navigating a user interface.

The wrist-wearable device 1200, the AR device 1300, and/or the HIPD 1400 can operate alone or in conjunction to allow the user 1102 to interact with the AR environment. In some embodiments, the HIPD 1400 is configured to operate as a central hub or control center for the wrist-wearable device 1200, the AR device 1300, and/or another communicatively coupled device. For example, the user 1102 can provide an input to interact with the AR environment at any of the wrist-wearable device 1200, the AR device 1300, and/or the HIPD 1400, and the HIPD 1400 can identify one or more back-end and front-end tasks to cause the performance of the requested interaction and distribute instructions to cause the performance of the one or more back-end and front-end tasks at the wrist-wearable device 1200, the AR device 1300, and/or the HIPD 1400. In some embodiments, a back-end task is a background-processing task that is not perceptible by the user (e.g., rendering content, decompression, or compression), and a front-end task is a user-facing task that is perceptible to the user (e.g., presenting information to the user or providing feedback to the user). As described below in reference to FIGS. 14A-14B, the HIPD 1400 can perform the back-end tasks and provide the wrist-wearable device 1200 and/or the AR device 1300 operational data corresponding to the performed back-end tasks such that the wrist-wearable device 1200 and/or the AR device 1300 can perform the front-end tasks. In this way, the HIPD 1400, which has more computational resources and greater thermal headroom than the wrist-wearable device 1200 and/or the AR device 1300, performs computationally intensive tasks and reduces the computer resource utilization and/or power usage of the wrist-wearable device 1200 and/or the AR device 1300.

In the example shown by the first AR system 1100*a*, the HIPD 1400 identifies one or more back-end tasks and front-end tasks associated with a user request to initiate an AR video call with one or more other users (represented by the avatar 1104 and the digital representation of the contact 1106) and distributes instructions to cause the performance of the one or more back-end tasks and front-end tasks. In particular, the HIPD 1400 performs back-end tasks for processing and/or rendering image data (and other data) associated with the AR video call and provides operational data associated with the performed back-end tasks to the AR device 1300 such that the AR device 1300 performs front-end tasks for presenting the AR video call (e.g., presenting the avatar 1104 and the digital representation of the contact 1106).

In some embodiments, the HIPD 1400 can operate as a focal or anchor point for causing the presentation of information. This allows the user 1102 to be generally aware of where information is presented. For example, as shown in the first AR system 1100*a*, the avatar 1104 and the digital representation of the contact 1106 are presented above the HIPD 1400. In particular, the HIPD 1400 and the AR device 1300 operate in conjunction to determine a location for presenting the avatar 1104 and the digital representation of the contact 1106. In some embodiments, information can be presented within a predetermined distance from the HIPD 1400 (e.g., within five meters). For example, as shown in the first AR system 1100*a*, virtual object 1108 is presented on the desk some distance from the HIPD 1400. Similar to the above example, the HIPD 1400 and the AR device 1300 can operate in conjunction to determine a location for presenting the virtual object 1108. Alternatively, in some embodiments, presentation of information is not bound by the HIPD 1400. More specifically, the avatar 1104, the digital representation of the contact 1106, and the virtual object 1108 do not have to be presented within a predetermined distance of the HIPD 1400.

User inputs provided at the wrist-wearable device 1200, the AR device 1300, and/or the HIPD 1400 are coordinated such that the user can use any device to initiate, continue, and/or complete an operation. For example, the user 1102 can provide a user input to the AR device 1300 to cause the AR device 1300 to present the virtual object 1108 and, while the virtual object 1108 is presented by the AR device 1300, the user 1102 can provide one or more hand gestures via the wrist-wearable device 1200 to interact and/or manipulate the virtual object 1108.

FIG. 11B shows the user 1102 wearing the wrist-wearable device 1200 and the AR device 1300, and holding the HIPD 1400. In the second AR system 1100*b*, the wrist-wearable device 1200, the AR device 1300, and/or the HIPD 1400 are used to receive and/or provide one or more messages to a contact of the user 1102. In particular, the wrist-wearable device 1200, the AR device 1300, and/or the HIPD 1400 detect and coordinate one or more user inputs to initiate a messaging application and prepare a response to a received message via the messaging application.

In some embodiments, the user 1102 initiates, via a user input, an application on the wrist-wearable device 1200, the AR device 1300, and/or the HIPD 1400 that causes the application to initiate on at least one device. For example, in the second AR system 1100*b*, the user 1102 performs a hand gesture associated with a command for initiating a messaging application (represented by messaging user interface 1112), the wrist-wearable device 1200 detects the hand gesture, and, based on a determination that the user 1102 is wearing AR device 1300, causes the AR device 1300 to present a messaging user interface 1112 of the messaging application. The AR device 1300 can present the messaging user interface 1112 to the user 1102 via its display (e.g., as shown by user 1102's field of view 1110). In some embodiments, the application is initiated and can be run on the device (e.g., the wrist-wearable device 1200, the AR device 1300, and/or the HIPD 1400) that detects the user input to initiate the application, and the device provides another device operational data to cause the presentation of the messaging application. For example, the wrist-wearable device 1200 can detect the user input to initiate a messaging application, initiate and run the messaging application, and provide operational data to the AR device 1300 and/or the HIPD 1400 to cause presentation of the messaging application. Alternatively, the application can be initiated and run at a device other than the device that detected the user input. For example, the wrist-wearable device 1200 can detect the hand gesture associated with initiating the messaging application and cause the HIPD 1400 to run the messaging application and coordinate the presentation of the messaging application.

Further, the user 1102 can provide a user input provided at the wrist-wearable device 1200, the AR device 1300, and/or the HIPD 1400 to continue and/or complete an operation initiated at another device. For example, after initiating the messaging application via the wrist-wearable device 1200 and while the AR device 1300 presents the messaging user interface 1112, the user 1102 can provide an input at the HIPD 1400 to prepare a response (e.g., shown by the swipe gesture performed on the HIPD 1400). The user 1102's gestures performed on the HIPD 1400 can be provided and/or displayed on another device. For example, the user 1102's swipe gestures performed on the HIPD 1400 are displayed on a virtual keyboard of the messaging user interface 1112 displayed by the AR device 1300.

In some embodiments, the wrist-wearable device 1200, the AR device 1300, the HIPD 1400, and/or other communicatively coupled devices can present one or more notifications to the user 1102. The notification can be an indication of a new message, an incoming call, an application update, a status update, etc. The user 1102 can select the notification via the wrist-wearable device 1200, the AR device 1300, or the HIPD 1400 and cause presentation of an application or operation associated with the notification on at least one device. For example, the user 1102 can receive a notification that a message was received at the wrist-wearable device 1200, the AR device 1300, the HIPD 1400, and/or other communicatively coupled device and provide a user input at the wrist-wearable device 1200, the AR device 1300, and/or the HIPD 1400 to review the notification, and the device detecting the user input can cause an application associated with the notification to be initiated and/or presented at the wrist-wearable device 1200, the AR device 1300, and/or the HIPD 1400.

While the above example describes coordinated inputs used to interact with a messaging application, the skilled artisan will appreciate upon reading the descriptions that user inputs can be coordinated to interact with any number of applications including, but not limited to, gaming applications, social media applications, camera applications, web-based applications, financial applications, etc. For example, the AR device 1300 can present to the user 1102 game application data and the HIPD 1400 can use a controller to provide inputs to the game. Similarly, the user 1102 can use the wrist-wearable device 1200 to initiate a camera of the AR device 1300, and the user can use the wrist-wearable device 1200, the AR device 1300, and/or the HIPD

1400 to manipulate the image capture (e.g., zoom in or out or apply filters) and capture image data.

Turning to FIGS. 11C-1 and 11C-2, the user 1102 is shown wearing the wrist-wearable device 1200 and a VR device 1310, and holding the HIPD 1400. In the third AR system 1100c, the wrist-wearable device 1200, the VR device 1310, and/or the HIPD 1400 are used to interact within an AR environment, such as a VR game or other AR application. While the VR device 1310 presents a representation of a VR game (e.g., first AR game environment 1120) to the user 1102, the wrist-wearable device 1200, the VR device 1310, and/or the HIPD 1400 detect and coordinate one or more user inputs to allow the user 1102 to interact with the VR game.

In some embodiments, the user 1102 can provide a user input via the wrist-wearable device 1200, the VR device 1310, and/or the HIPD 1400 that causes an action in a corresponding AR environment. For example, the user 1102 in the third AR system 1100c (shown in FIG. 11C-1) raises the HIPD 1400 to prepare for a swing in the first AR game environment 1120. The VR device 1310, responsive to the user 1102 raising the HIPD 1400, causes the AR representation of the user 1122 to perform a similar action (e.g., raise a virtual object, such as a virtual sword 1124). In some embodiments, each device uses respective sensor data and/or image data to detect the user input and provide an accurate representation of the user 1102's motion. For example, image sensors 1454 (e.g., SLAM cameras or other cameras discussed below in FIGS. 14A and 14B) of the HIPD 1400 can be used to detect a position of the 1400 relative to the user 1102's body such that the virtual object can be positioned appropriately within the first AR game environment 1120; sensor data from the wrist-wearable device 1200 can be used to detect a velocity at which the user 1102 raises the HIPD 1400 such that the AR representation of the user 1122 and the virtual sword 1124 are synchronized with the user 1102's movements; and image sensors 1326 (FIGS. 13A-13C) of the VR device 1310 can be used to represent the user 1102's body, boundary conditions, or real-world objects within the first AR game environment 1120.

In FIG. 11C-2, the user 1102 performs a downward swing while holding the HIPD 1400. The user 1102's downward swing is detected by the wrist-wearable device 1200, the VR device 1310, and/or the HIPD 1400 and a corresponding action is performed in the first AR game environment 1120. In some embodiments, the data captured by each device is used to improve the user's experience within the AR environment. For example, sensor data of the wrist-wearable device 1200 can be used to determine a speed and/or force at which the downward swing is performed and image sensors of the HIPD 1400 and/or the VR device 1310 can be used to determine a location of the swing and how it should be represented in the first AR game environment 1120, which, in turn, can be used as inputs for the AR environment (e.g., game mechanics, which can use detected speed, force, locations, and/or aspects of the user 1102's actions to classify a user's inputs (e.g., user performs a light strike, hard strike, critical strike, glancing strike, miss) or calculate an output (e.g., amount of damage)).

While the wrist-wearable device 1200, the VR device 1310, and/or the HIPD 1400 are described as detecting user inputs, in some embodiments, user inputs are detected at a single device (with the single device being responsible for distributing signals to the other devices for performing the user input). For example, the HIPD 1400 can operate an application for generating the first AR game environment 1120 and provide the VR device 1310 with corresponding data for causing the presentation of the first AR game environment 1120, as well as detect the 1102's movements (while holding the HIPD 1400) to cause the performance of corresponding actions within the first AR game environment 1120. Additionally or alternatively, in some embodiments, operational data (e.g., sensor data, image data, application data, device data, and/or other data) of one or more devices is provide to a single device (e.g., the HIPD 1400) to process the operational data and cause respective devices to perform an action associated with processed operational data.

In FIGS. 11D-1 and 11D-2, the user 1102 is shown wearing the wrist-wearable device 1200, the VR device 1310, and smart textile-based garments 1500. In the fourth AR system 1100d, the wrist-wearable device 1200, the VR device 1310, and/or the smart textile-based garments 1500 are used to interact within an AR environment (e.g., any AR system described above in reference to FIGS. 11A-11C-2, as well as FIGS. 1A-10). While the VR device 1310 presents a representation of a VR game (e.g., second AR game environment 1131) to the user 1102, the wrist-wearable device 1200, the VR device 1310, and/or the smart textile-based garments 1500 detect and coordinate one or more user inputs to allow the user 1102 to interact with the AR environment.

In some embodiments, the user 1102 can provide a user input via the wrist-wearable device 1200, the VR device 1310, and/or the smart textile-based garments 1500 that causes an action in a corresponding AR environment. For example, the user 1102 in the fourth AR system 1100d (shown in FIG. 11D-1) raises a hand wearing the smart textile-based garments 1500 to prepare to cast a spell or throw an object within the second AR game environment 1131. The VR device 1310, responsive to the user 1102 holding up their hand (wearing smart textile-based garments 1500), causes the AR representation of the user 1122 to perform a similar action (e.g., hold a virtual object or throw a fireball 1134). In some embodiments, each device uses respective sensor data and/or image data to detect the user input and provides an accurate representation of the user 1102's motion.

In FIG. 11D-2, the user 1102 performs a throwing motion while wearing the smart textile-based garment 1500. The user 1102's throwing motion is detected by the wrist-wearable device 1200, the VR device 1310, and/or the smart textile-based garments 1500, and a corresponding action is performed in the second AR game environment 1131. As described above, the data captured by each device is used to improve the user's experience within the AR environment. Although not shown, the smart textile-based garments 1500 can be used in conjunction with an AR device 1310 and/or an HIPD 1400.

Having discussed example AR systems, devices for interacting with such AR systems, and other computing systems more generally, devices and components will now be discussed in greater detail below. Some definitions of devices and components that can be included in some or all of the example devices discussed below are defined here for ease of reference. A skilled artisan will appreciate that certain types of the components described below may be more suitable for a particular set of devices and less suitable for a different set of devices. But subsequent references to the components defined here should be considered to be encompassed by the definitions provided.

In some embodiments discussed below, example devices and systems, including electronic devices and systems, will be discussed. Such example devices and systems are not intended to be limiting, and one of skill in the art will understand that alternative devices and systems to the example devices and systems described herein may be used to perform the operations and construct the systems and devices that are described herein.

As described herein, an electronic device is a device that uses electrical energy to perform a specific function. It can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device is a device that sits between two other electronic devices and/or a subset of components of one or more electronic devices, which facilitates communication, and/or data processing, and/or data transfer between the respective electronic devices and/or electronic components.

Example Wrist-Wearable Devices

FIGS. 12A and 12B illustrate an example wrist-wearable device 1200, in accordance with some embodiments. The wrist-wearable device 1200 is an instance of the wrist-wearable device 120 described in reference to FIGS. 1A-10 herein, such that the wrist-wearable device 120 should be understood to have the features of the wrist-wearable device 1200 and vice versa. FIG. 12A illustrates components of the wrist-wearable device 1200, which can be used individually or in combination, including combinations that include other electronic devices and/or electronic components.

FIG. 12A shows a wearable band 1210 and a watch body 1220 (or capsule) being coupled, as discussed below, to form the wrist-wearable device 1200. The wrist-wearable device 1200 can perform various functions and/or operations associated with navigating through user interfaces and selectively opening applications, as well as the functions and/or operations described above with reference to FIGS. 1A-10.

As will be described in more detail below, operations executed by the wrist-wearable device 1200 can include (i) presenting content to a user (e.g., displaying visual content via a display 1205); (ii) detecting (e.g., sensing) user input (e.g., sensing a touch on peripheral button 1223 and/or at a touch screen of the display 1205, a hand gesture detected by sensors (e.g., biopotential sensors)); (iii) sensing biometric data via one or more sensors 1213 (e.g., neuromuscular signals, heart rate, temperature, or sleep); messaging (e.g., text, speech, or video); image capture via one or more imaging devices or cameras 1225; wireless communications (e.g., cellular, near field, Wi-Fi, or personal area network); location determination; financial transactions; providing haptic feedback; alarms; notifications; biometric authentication; health monitoring; and/or sleep monitoring.

The above-example functions can be executed independently in the watch body 1220, independently in the wearable band 1210, and/or via an electronic communication between the watch body 1220 and the wearable band 1210. In some embodiments, functions can be executed on the wrist-wearable device 1200 while an AR environment is being presented (e.g., via one of the AR systems 1100a to 1100d). As the skilled artisan will appreciate upon reading the descriptions provided herein, the novel wearable devices described herein can be used with other types of AR environments.

The wearable band 1210 can be configured to be worn by a user such that an inner (or inside) surface of the wearable structure 1211 of the wearable band 1210 is in contact with the user's skin. When worn by a user, sensors 1213 contact the user's skin. The sensors 1213 can sense biometric data such as a user's heart rate, saturated oxygen level, temperature, sweat level, neuromuscular-signal sensors, or a combination thereof. The sensors 1213 can also sense data about a user's environment, including a user's motion, altitude, location, orientation, gait, acceleration, position, or a combination thereof. In some embodiments, the sensors 1213 are configured to track a position and/or motion of the wearable band 1210. The one or more sensors 1213 can include any of the sensors defined above and/or discussed below with respect to FIG. 12B.

The one or more sensors 1213 can be distributed on an inside and/or an outside surface of the wearable band 1210. In some embodiments, the one or more sensors 1213 are uniformly spaced along the wearable band 1210. Alternatively, in some embodiments, the one or more sensors 1213 are positioned at distinct points along the wearable band 1210. As shown in FIG. 12A, the one or more sensors 1213 can be the same or distinct. For example, in some embodiments, the one or more sensors 1213 can be shaped as a pill (e.g., sensor 1213a), an oval, a circle a square, an oblong (e.g., sensor 1213c), and/or any other shape that maintains contact with the user's skin (e.g., such that neuromuscular signal and/or other biometric data can be accurately measured at the user's skin). In some embodiments, the one or more sensors 1213 are aligned to form pairs of sensors (e.g., for sensing neuromuscular signals based on differential sensing within each respective sensor). For example, sensor 1213b is aligned with an adjacent sensor to form sensor pair 1214a, and sensor 1213d is aligned with an adjacent sensor to form sensor pair 1214b. In some embodiments, the wearable band 1210 does not have a sensor pair. Alternatively, in some embodiments, the wearable band 1210 has a predetermined number of sensor pairs (one pair of sensors, three pairs of sensors, four pairs of sensors, six pairs of sensors, or sixteen pairs of sensors).

The wearable band 1210 can include any suitable number of sensors 1213. In some embodiments, the amount and arrangements of sensors 1213 depend on the particular application for which the wearable band 1210 is used. For instance, a wearable band 1210 configured as an armband, wristband, or chest-band may include a plurality of sensors 1213 with a different number of sensors 1213 and different arrangement for each use case, such as medical use cases, compared to gaming or general day-to-day use cases.

In accordance with some embodiments, the wearable band 1210 further includes an electrical ground electrode and a shielding electrode. The electrical ground and shielding electrodes, like the sensors 1213, can be distributed on the inside surface of the wearable band 1210 such that they contact a portion of the user's skin. For example, the electrical ground and shielding electrodes can be at an inside surface of coupling mechanism 1216 or an inside surface of a wearable structure 1211. The electrical ground and shielding electrodes can be formed and/or use the same components as the sensors 1213. In some embodiments, the wearable band 1210 includes more than one electrical ground electrode and more than one shielding electrode.

The sensors 1213 can be formed as part of the wearable structure 1211 of the wearable band 1210. In some embodiments, the sensors 1213 are flush or substantially flush with the wearable structure 1211 such that they do not extend beyond the surface of the wearable structure 1211. While flush with the wearable structure 1211, the sensors 1213 are still configured to contact the user's skin (e.g., via a skin-contacting surface). Alternatively, in some embodiments, the sensors 1213 extend beyond the wearable structure 1211 a predetermined distance (e.g., 0.1 mm to 2 mm) to make contact and depress into the user's skin. In some embodiments, the sensors 1213 are coupled to an actuator (not shown) configured to adjust an extension height (e.g., a distance from the surface of the wearable structure 1211) of the sensors 1213 such that the sensors 1213 make contact and depress into the user's skin. In some embodiments, the actuators adjust the extension height between 0.01 mm to 1.2 mm. This allows the user to customize the positioning of the sensors 1213 to improve the overall comfort of the wearable band 1210 when worn while still allowing the sensors 1213 to contact the user's skin. In some embodiments, the sensors 1213 are indistinguishable from the wearable structure 1211 when worn by the user.

The wearable structure 1211 can be formed of an elastic material, elastomers, etc., configured to be stretched and fitted to be worn by the user. In some embodiments, the wearable structure 1211 is a textile or woven fabric. As described above, the sensors 1213 can be formed as part of a wearable structure 1211. For example, the sensors 1213 can be molded into the wearable structure 1211 or be integrated into a woven fabric (e.g., the sensors 1213 can be sewn into the fabric and mimic the pliability of fabric (e.g., the sensors 1213 can be constructed from a series of woven strands of fabric)).

The wearable structure 1211 can include flexible electronic connectors that interconnect the sensors 1213, the electronic circuitry, and/or other electronic components (described below in reference to FIG. 12B) that are enclosed in the wearable band 1210. In some embodiments, the flexible electronic connectors are configured to interconnect the sensors 1213, the electronic circuitry, and/or other electronic components of the wearable band 1210 with respective sensors and/or other electronic components of another electronic device (e.g., watch body 1220). The flexible electronic connectors are configured to move with the wearable structure 1211 such that the user adjustment to the wearable structure 1211 (e.g., resizing, pulling, or folding) does not stress or strain the electrical coupling of components of the wearable band 1210.

As described above, the wearable band 1210 is configured to be worn by a user. In particular, the wearable band 1210 can be shaped or otherwise manipulated to be worn by a user. For example, the wearable band 1210 can be shaped to have a substantially circular shape such that it can be configured to be worn on the user's lower arm or wrist. Alternatively, the wearable band 1210 can be shaped to be worn on another body part of the user, such as the user's upper arm (e.g., around a bicep), forearm, chest, legs, etc. The wearable band 1210 can include a retaining mechanism 1212 (e.g., a buckle or a hook and loop fastener) for securing the wearable band 1210 to the user's wrist or other body part. While the wearable band 1210 is worn by the user, the sensors 1213 sense data (referred to as sensor data) from the user's skin. In particular, the sensors 1213 of the wearable band 1210 obtain (e.g., sense and record) neuromuscular signals.

The sensed data (e.g., sensed neuromuscular signals) can be used to detect and/or determine the user's intention to perform certain motor actions. In particular, the sensors 1213 sense and record neuromuscular signals from the user as the user performs muscular activations (e.g., movements or gestures). The detected and/or determined motor action (e.g., phalange (or digits) movements, wrist movements, hand movements, and/or other muscle intentions) can be used to determine control commands or control information (instructions to perform certain commands after the data is sensed) for causing a computing device to perform one or more input commands. For example, the sensed neuromuscular signals can be used to control certain user interfaces displayed on the display 1205 of the wrist-wearable device 1200 and/or can be transmitted to a device responsible for rendering an AR environment (e.g., a head-mounted display) to perform an action in an associated AR environment, such as to control the motion of a virtual device displayed to the user. The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using submuscular activations. The muscular activations performed by the user can include symbolic gestures (e.g., gestures mapped to other gestures, interactions, or commands, for example, based on a gesture vocabulary that specifies the mapping of gestures to commands).

The sensor data sensed by the sensors 1213 can be used to provide a user with an enhanced interaction with a physical object (e.g., devices communicatively coupled with the wearable band 1210) and/or a virtual object in an AR application generated by an AR system (e.g., user interface objects presented on the display 1205 or another computing device (e.g., a smartphone)).

In some embodiments, the wearable band 1210 includes one or more haptic devices 1246 (FIG. 12B; e.g., a vibratory haptic actuator) that are configured to provide haptic feedback (e.g., a cutaneous and/or kinesthetic sensation) to the user's skin. The sensors 1213 and/or the haptic devices 1246 can be configured to operate in conjunction with multiple applications including, without limitation, health monitoring, social media, games, and AR (e.g., the applications associated with AR).

The wearable band 1210 can also include a coupling mechanism 1216 (e.g., a cradle or a shape of the coupling mechanism can correspond to the shape of the watch body 1220 of the wrist-wearable device 1200) for detachably coupling a capsule (e.g., a computing unit) or watch body 1220 (via a coupling surface of the watch body 1220) to the wearable band 1210. In particular, the coupling mechanism 1216 can be configured to receive a coupling surface proximate to the bottom side of the watch body 1220 (e.g., a side opposite to a front side of the watch body 1220 where the display 1205 is located), such that a user can push the watch body 1220 downward into the coupling mechanism 1216 to attach the watch body 1220 to the coupling mechanism 1216. In some embodiments, the coupling mechanism 1216 can be configured to receive a top side of the watch body 1220 (e.g., a side proximate to the front side of the watch body 1220 where the display 1205 is located) that is pushed upward into the cradle, as opposed to being pushed downward into the coupling mechanism 1216. In some embodiments, the coupling mechanism 1216 is an integrated component of the wearable band 1210 such that the wearable band 1210 and the coupling mechanism 1216 are a single unitary structure. In some embodiments, the coupling mechanism 1216 is a type of frame or shell that allows the watch body 1220 coupling surface to be retained within or on the wearable band 1210 coupling mechanism 1216 (e.g., a cradle, a tracker band, a support base, or a clasp).

The coupling mechanism 1216 can allow for the watch body 1220 to be detachably coupled to the wearable band 1210 through a friction fit, a magnetic coupling, a rotation-based connector, a shear-pin coupler, a retention spring, one or more magnets, a clip, a pin shaft, a hook-and-loop fastener, or a combination thereof. A user can perform any type of motion to couple the watch body 1220 to the wearable band 1210 and to decouple the watch body 1220 from the wearable band 1210. For example, a user can twist, slide, turn, push, pull, or rotate the watch body 1220 relative to the wearable band 1210, or a combination thereof, to attach the watch body 1220 to the wearable band 1210 and to detach the watch body 1220 from the wearable band 1210. Alternatively, as discussed below, in some embodiments, the watch body 1220 can be decoupled from the wearable band 1210 by actuation of the release mechanism 1229.

The wearable band 1210 can be coupled with a watch body 1220 to increase the functionality of the wearable band 1210 (e.g., converting the wearable band 1210 into a wrist-wearable device 1200, adding an additional computing unit and/or battery to increase computational resources and/or a battery life of the wearable band 1210, or adding additional sensors to improve sensed data). As described above, the wearable band 1210 (and the coupling mechanism 1216) is configured to operate independently (e.g., execute functions independently) from watch body 1220. For example, the coupling mechanism 1216 can include one or more sensors 1213 that contact a user's skin when the wearable band 1210 is worn by the user and provide sensor data for determining control commands.

A user can detach the watch body 1220 (or capsule) from the wearable band 1210 in order to reduce the encumbrance of the wrist-wearable device 1200 to the user. For embodiments in which the watch body 1220 is removable, the watch body 1220 can be referred to as a removable structure, such that in these embodiments the wrist-wearable device 1200 includes a wearable portion (e.g., the wearable band 1210) and a removable structure (the watch body 1220).

Turning to the watch body 1220, the watch body 1220 can have a substantially rectangular or circular shape. The watch body 1220 is configured to be worn by the user on their wrist or on another body part. More specifically, the watch body 1220 is sized to be easily carried by the user, attached on a portion of the user's clothing, and/or coupled to the wearable band 1210 (forming the wrist-wearable device 1200). As described above, the watch body 1220 can have a shape corresponding to the coupling mechanism 1216 of the wearable band 1210. In some embodiments, the watch body 1220 includes a single release mechanism 1229 or multiple release mechanisms (e.g., two release mechanisms 1229 positioned on opposing sides of the watch body 1220, such as spring-loaded buttons) for decoupling the watch body 1220 and the wearable band 1210. The release mechanism 1229 can include, without limitation, a button, a knob, a plunger, a handle, a lever, a fastener, a clasp, a dial, a latch, or a combination thereof.

A user can actuate the release mechanism 1229 by pushing, turning, lifting, depressing, shifting, or performing other actions on the release mechanism 1229. Actuation of the release mechanism 1229 can release (e.g., decouple) the watch body 1220 from the coupling mechanism 1216 of the wearable band 1210, allowing the user to use the watch body 1220 independently from wearable band 1210 and vice versa. For example, decoupling the watch body 1220 from the wearable band 1210 can allow the user to capture images using rear-facing camera 1225*b*. Although the coupling mechanism 1216 is shown positioned at a corner of watch body 1220, the release mechanism 1229 can be positioned anywhere on watch body 1220 that is convenient for the user to actuate. In addition, in some embodiments, the wearable band 1210 can also include a respective release mechanism for decoupling the watch body 1220 from the coupling mechanism 1216. In some embodiments, the release mechanism 1229 is optional and the watch body 1220 can be decoupled from the coupling mechanism 1216, as described above (e.g., via twisting or rotating).

The watch body 1220 can include one or more peripheral buttons 1223 and 1227 for performing various operations at the watch body 1220. For example, the peripheral buttons 1223 and 1227 can be used to turn on or wake (e.g., transition from a sleep state to an active state) the display 1205, unlock the watch body 1220, increase or decrease volume, increase or decrease brightness, interact with one or more applications, interact with one or more user interfaces. Additionally, or alternatively, in some embodiments, the display 1205 operates as a touch screen and allows the user to provide one or more inputs for interacting with the watch body 1220.

In some embodiments, the watch body 1220 includes one or more sensors 1221. The sensors 1221 of the watch body 1220 can be the same or distinct from the sensors 1213 of the wearable band 1210. The sensors 1221 of the watch body 1220 can be distributed on an inside and/or an outside surface of the watch body 1220. In some embodiments, the sensors 1221 are configured to contact a user's skin when the watch body 1220 is worn by the user. For example, the sensors 1221 can be placed on the bottom side of the watch body 1220 and the coupling mechanism 1216 can be a cradle with an opening that allows the bottom side of the watch body 1220 to directly contact the user's skin. Alternatively, in some embodiments, the watch body 1220 does not include sensors that are configured to contact the user's skin (e.g., including sensors internal and/or external to the watch body 1220 that are configured to sense data of the watch body 1220 and the watch body 1220's surrounding environment). In some embodiments, the sensors 1213 are configured to track a position and/or motion of the watch body 1220.

The watch body 1220 and the wearable band 1210 can share data using a wired communication method (e.g., a Universal Asynchronous Receiver/Transmitter (UART) or a USB transceiver) and/or a wireless communication method (e.g., near-field communication or Bluetooth). For example, the watch body 1220 and the wearable band 1210 can share data sensed by the sensors 1213 and 1221, as well as application- and device-specific information (e.g., active and/or available applications), output devices (e.g., display or speakers), and/or input devices (e.g., touch screens, microphones, or imaging sensors).

In some embodiments, the watch body 1220 can include, without limitation, a front-facing camera 1225*a* and/or a rear-facing camera 1225*b*, sensors 1221 (e.g., a biometric sensor, an IMU sensor, a heart rate sensor, a saturated oxygen sensor, a neuromuscular-signal sensor, an altimeter sensor, a temperature sensor, a bioimpedance sensor, a pedometer sensor, an optical sensor (e.g., FIG. 12B; imaging sensor 1263), a touch sensor, a sweat sensor). In some embodiments, the watch body 1220 can include one or more haptic devices 1276 (FIG. 12B; a vibratory haptic actuator) that is configured to provide haptic feedback (e.g., a cutaneous and/or kinesthetic sensation) to the user. The sensors 1221 and/or the haptic device 1276 can also be configured to operate in conjunction with multiple applications, including, without limitation, health-monitoring applications, social media applications, game applications, and AR applications (e.g., the applications associated with AR).

As described above, the watch body 1220 and the wearable band 1210, when coupled, can form the wrist-wearable device 1200. When coupled, the watch body 1220 and wearable band 1210 operate as a single device to execute functions (e.g., operations, detections, or communications) described herein. In some embodiments, each device is provided with particular instructions for performing the one or more operations of the wrist-wearable device 1200. For example, in accordance with a determination that the watch body 1220 does not include neuromuscular-signal sensors, the wearable band 1210 can include alternative instructions for performing associated instructions (e.g., providing sensed neuromuscular-signal data to the watch body 1220 via a different electronic device). Operations of the wrist-wearable device 1200 can be performed by the watch body 1220 alone or in conjunction with the wearable band 1210 (e.g., via respective processors and/or hardware components) and vice versa. In some embodiments, operations of the wrist-wearable device 1200, the watch body 1220, and/or the wearable band 1210 can be performed in conjunction with one or more processors and/or hardware components of another communicatively coupled device (e.g., FIGS. 14A-14B; the HIPD 1400).

As described below with reference to the block diagram of FIG. 12B, the wearable band 1210 and/or the watch body 1220 can each include independent resources required to independently execute functions. For example, the wearable band 1210 and/or the watch body 1220 can each include a power source (e.g., a battery), a memory, data storage, a processor (e.g., a CPU), communications, a light source, and/or input/output devices.

FIG. 12B shows block diagrams of a computing system 1230 corresponding to the wearable band 1210 and a computing system 1260 corresponding to the watch body 1220, according to some embodiments. A computing system of the wrist-wearable device 1200 includes a combination of components of the wearable band computing system 1230 and the watch body computing system 1260, in accordance with some embodiments.

The watch body 1220 and/or the wearable band 1210 can include one or more components shown in watch body computing system 1260. In some embodiments, a single integrated circuit includes all or a substantial portion of the components of the watch body computing system 1260 that are included in a single integrated circuit. Alternatively, in some embodiments, components of the watch body computing system 1260 are included in a plurality of integrated circuits that are communicatively coupled. In some embodiments, the watch body computing system 1260 is configured to couple (e.g., via a wired or wireless connection) with the wearable band computing system 1230, which allows the computing systems to share components, distribute tasks, and/or perform other operations described herein (individually or as a single device).

The watch body computing system 1260 can include one or more processors 1279, a controller 1277, a peripherals interface 1261, a power system 1295, and memory (e.g., a memory 1280), each of which are defined above and described in more detail below.

The power system 1295 can include a charger input 1296, a power-management integrated circuit (PMIC) 1297, and a battery 1298, each of which are defined above. In some embodiments, a watch body 1220 and a wearable band 1210 can have respective charger inputs (e.g., charger inputs 1296 and 1257), respective batteries (e.g., batteries 1298 and 1259), and can share power with each other (e.g., the watch body 1220 can power and/or charge the wearable band 1210 and vice versa). Although watch body 1220 and/or the wearable band 1210 can include respective charger inputs, a single charger input can charge both devices when coupled. The watch body 1220 and the wearable band 1210 can receive a charge using a variety of techniques. In some embodiments, the watch body 1220 and the wearable band 1210 can use a wired charging assembly (e.g., power cords) to receive the charge. Alternatively, or in addition, the watch body 1220 and/or the wearable band 1210 can be configured for wireless charging. For example, a portable charging device can be designed to mate with a portion of watch body 1220 and/or wearable band 1210 and wirelessly deliver usable power to a battery of watch body 1220 and/or wearable band 1210. The watch body 1220 and the wearable band 1210 can have independent power systems (e.g., power system 1295 and 1256) to enable each to operate independently. The watch body 1220 and wearable band 1210 can also share power (e.g., one can charge the other) via respective PMICs (e.g., PMICs 1297 and 1258) that can share power over power and ground conductors and/or over wireless charging antennas.

In some embodiments, the peripherals interface 1261 can include one or more sensors 1221, many of which listed below are defined above. The sensors 1221 can include one or more coupling sensors 1262 for detecting when the watch body 1220 is coupled with another electronic device (e.g., a wearable band 1210). The sensors 1221 can include imaging sensors 1263 (one or more of the cameras 1225 and/or separate imaging sensors 1263 (e.g., thermal-imaging sensors)). In some embodiments, the sensors 1221 include one or more SpO2 sensors 1264. In some embodiments, the sensors 1221 include one or more biopotential-signal sensors (e.g., EMG sensors 1265, which may be disposed on a user-facing portion of the watch body 1220 and/or the wearable band 1210). In some embodiments, the sensors 1221 include one or more capacitive sensors 1266. In some embodiments, the sensors 1221 include one or more heart rate sensors 1267. In some embodiments, the sensors 1221 include one or more IMUs 1268. In some embodiments, one or more IMUs 1268 can be configured to detect movement of a user's hand or other location that the watch body 1220 is placed or held.

In some embodiments, the peripherals interface 1261 includes an NFC component 1269, a GPS component 1270, a long-term evolution (LTE) component 1271, and/or a Wi-Fi and/or Bluetooth communication component 1272. In some embodiments, the peripherals interface 1261 includes one or more buttons 1273 (e.g., the peripheral buttons 1223 and 1227 in FIG. 12A), which, when selected by a user, cause operations to be performed at the watch body 1220. In some embodiments, the peripherals interface 1261 includes one or more indicators, such as a light-emitting diode (LED), to provide a user with visual indicators (e.g., message received, low battery, an active microphone, and/or a camera).

The watch body 1220 can include at least one display 1205 for displaying visual representations of information or data to the user, including user-interface elements and/or three-dimensional (3D) virtual objects. The display can also include a touch screen for inputting user inputs, such as touch gestures, swipe gestures, and the like. The watch body 1220 can include at least one speaker 1274 and at least one microphone 1275 for providing audio signals to the user and receiving audio input from the user. The user can provide user inputs through the microphone 1275 and can also receive audio output from the speaker 1274 as part of a haptic event provided by the haptic controller 1278. The watch body 1220 can include at least one camera 1225, including a front-facing camera 1225a and a rear-facing camera 1225b. The cameras 1225 can include ultra-wide-angle cameras, wide-angle cameras, fish-eye cameras, spherical cameras, telephoto cameras, depth-sensing cameras, or other types of cameras.

The watch body computing system 1260 can include one or more haptic controllers 1278 and associated componentry (e.g., haptic devices 1276) for providing haptic events at the watch body 1220 (e.g., a vibrating sensation or audio output in response to an event at the watch body 1220). The haptic controllers 1278 can communicate with one or more haptic devices 1276, such as electroacoustic devices, including a speaker of the one or more speakers 1274 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 1278 can provide haptic events to respective haptic actuators that are capable of being sensed by a user of the watch body 1220. In some embodiments, the one or more haptic controllers 1278 can receive input signals from an application of the applications 1282.

In some embodiments, the computer system 1230 and/or the computer system 1260 can include memory 1280, which can be controlled by a memory controller of the one or more controllers 1277 and/or one or more processors 1279. In some embodiments, software components stored in the memory 1280 include one or more applications 1282 configured to perform operations at the watch body 1220. In some embodiments, the one or more applications 1282 include games, word processors, messaging applications, calling applications, web browsers, social media applications, media streaming applications, financial applications, calendars, clocks, etc. In some embodiments, software components stored in the memory 1280 include one or more communication interface modules 1283 as defined above. In some embodiments, software components stored in the memory 1280 include one or more graphics modules 1284 for rendering, encoding, and/or decoding audio and/or visual data; and one or more data management modules 1285 for collecting, organizing, and/or providing access to the data 1287 stored in memory 1280. In some embodiments, software components stored in the memory 1280 include a locomotion control module 1286A, which is configured to perform the features described above in reference to FIGS. 1A-10. For example, the locomotion control module 1286A can use sensor data, image data, and/or other data captured by the wrist-wearable device 1200 and/or a communicatively coupled device to determine a hand gesture, an operation (or action) associated with the hand gesture, a type of positional-control operation (e.g., teleportation, snap turn, steering, or other movements described above in reference to FIGS. 1A-10), a change in an AR environment (e.g., position change, view change, etc.), etc. In some embodiments, one or more of applications 1282 and/or one or more modules can work in conjunction with one another to perform various tasks at the watch body 1220.

In some embodiments, software components stored in the memory 1280 can include one or more operating systems 1281 (e.g., a Linux-based operating system, an Android operating system, etc.). The memory 1280 can also include data 1287. The data 1287 can include profile data 1288A, sensor data 1289A, media content data 1290, application data 1291, and locomotion control data 1292A, which stores data related to the performance of the features described above in reference to FIGS. 1A-10. For example, the locomotion control data 1292A can include one or more types of position-control control operations, one or more models for determining a type of position-control control operation, one or more models for determining a change in an AR environment, etc.

It should be appreciated that the watch body computing system 1260 is an example of a computing system within the watch body 1220, and that the watch body 1220 can have more or fewer components than shown in the watch body computing system 1260, combine two or more components, and/or have a different configuration and/or arrangement of the components. The various components shown in watch body computing system 1260 are implemented in hardware, software, firmware, or a combination thereof, including one or more signal processing and/or application-specific integrated circuits.

Turning to the wearable band computing system 1230, one or more components that can be included in the wearable band 1210 are shown. The wearable band computing system 1230 can include more or fewer components than shown in the watch body computing system 1260, combine two or more components, and/or have a different configuration and/or arrangement of some or all of the components. In some embodiments, all, or a substantial portion of the components of the wearable band computing system 1230 are included in a single integrated circuit. Alternatively, in some embodiments, components of the wearable band computing system 1230 are included in a plurality of integrated circuits that are communicatively coupled. As described above, in some embodiments, the wearable band computing system 1230 is configured to couple (e.g., via a wired or wireless connection) with the watch body computing system 1260, which allows the computing systems to share components, distribute tasks, and/or perform other operations described herein (individually or as a single device).

The wearable band computing system 1230, similar to the watch body computing system 1260, can include one or more processors 1249, one or more controllers 1247 (including one or more haptics controller 1248), a peripherals interface 1231 that can include one or more sensors 1213 and other peripheral devices, power source (e.g., a power system 1256), and memory (e.g., a memory 1250) that includes an operating system (e.g., an operating system 1251), data (e.g., data 1254 including profile data 1288B, sensor data 1289B, locomotion control module data 1292B, etc.), and one or more modules (e.g., a communications interface module 1252, a data management module 1253, a locomotion control module 1286B, etc.).

The one or more sensors 1213 can be analogous to sensors 1221 of the computer system 1260 in light of the definitions above. For example, sensors 1213 can include one or more coupling sensors 1232, one or more SpO2 sensors 1234, one or more EMG sensors 1235, one or more capacitive sensors 1236, one or more heart rate sensors 1237, and one or more IMU sensors 1238.

The peripherals interface 1231 can also include other components analogous to those included in the peripheral interface 1261 of the computer system 1260, including an NFC component 1239, a GPS component 1240, an LTE component 1241, a Wi-Fi and/or Bluetooth communication component 1242, and/or one or more haptic devices 1276 as described above in reference to peripherals interface 1261. In some embodiments, the peripherals interface 1231 includes one or more buttons 1243, a display 1233, a speaker 1244, a microphone 1245, and a camera 1255. In some embodiments, the peripherals interface 1231 includes one or more indicators, such as an LED.

It should be appreciated that the wearable band computing system 1230 is an example of a computing system within the wearable band 1210, and that the wearable band 1210 can have more or fewer components than shown in the wearable band computing system 1230, combine two or more components, and/or have a different configuration and/or arrangement of the components. The various components shown in wearable band computing system 1230 can be implemented in one or a combination of hardware, software, and firmware, including one or more signal processing and/or application-specific integrated circuits.

The wrist-wearable device 1200 with respect to FIG. 12A is an example of the wearable band 1210 and the watch body 1220 coupled, so the wrist-wearable device 1200 will be understood to include the components shown and described for the wearable band computing system 1230 and the watch body computing system 1260. In some embodiments, wrist-wearable device 1200 has a split architecture (e.g., a split mechanical architecture or a split electrical architecture) between the watch body 1220 and the wearable band 1210. In other words, all of the components shown in the wearable band computing system 1230 and the watch body computing system 1260 can be housed or otherwise disposed in a combined watch device 1200, or within individual components of the watch body 1220, wearable band 1210, and/or portions thereof (e.g., a coupling mechanism 1216 of the wearable band 1210).

The techniques described above can be used with any device for sensing neuromuscular signals, including the arm-wearable devices of FIG. 12A-12B, but could also be used with other types of wearable devices for sensing neuromuscular signals (such as body-wearable or head-wearable devices that might have neuromuscular sensors closer to the brain or spinal column).

In some embodiments, a wrist-wearable device 1200 can be used in conjunction with a head-wearable device described below (e.g., AR device 1300 and VR device 1310) and/or an HIPD 1400, and the wrist-wearable device 1200 can also be configured to be used to allow a user to control aspect of the artificial reality (e.g., by using EMG-based gestures to control user interface objects in the artificial reality and/or by allowing a user to interact with the touchscreen on the wrist-wearable device to also control aspects of the artificial reality). In some embodiments, a wrist-wearable device 1200 can also be used in conjunction with a wearable garment, such as smart textile-based garment 1500 described below in reference to FIGS. 15A-15C. Having thus described example wrist-wearable device, attention will now be turned to example head-wearable devices, such AR device 1300 and VR device 1310.

Example Head-Wearable Devices

FIGS. 13A-13C show example head-wearable devices, in accordance with some embodiments. Head-wearable devices can include, but are not limited to, AR devices 1300 (e.g., AR or smart eyewear devices, such as smart glasses, smart monocles, smart contacts, etc.), VR devices 1310 (e.g., VR headsets or head-mounted displays (HMDs)), or other ocularly coupled devices. The AR devices 1300 and the VR devices 1310 are instances of the head-wearable device 110 described in reference to FIGS. 1A-10 herein, such that the head-wearable device 110 should be understood to have the features of the AR devices 1300 and/or the VR devices 1310 and vice versa. The AR devices 1300 and the VR devices 1310 can perform various functions and/or operations associated with navigating through user interfaces and selectively opening applications, as well as the functions and/or operations described above with reference to FIGS. 1A-10.

In some embodiments, an AR system (e.g., FIGS. 11A-11D-2; AR systems 1100a-1100d) includes an AR device 1300 (as shown in FIG. 13A) and/or VR device 1310 (as shown in FIGS. 13B-1-B-2). In some embodiments, the AR device 1300 and the VR device 1310 can include one or more analogous components (e.g., components for presenting interactive AR environments, such as processors, memory, and/or presentation devices, including one or more displays and/or one or more waveguides), some of which are described in more detail with respect to FIG. 13C. The head-wearable devices can use display projectors (e.g., display projector assemblies 1307A and 1307B) and/or waveguides for projecting representations of data to a user. Some embodiments of head-wearable devices do not include displays.

FIG. 13A shows an example visual depiction of the AR device 1300 (e.g., which may also be described herein as augmented-reality glasses and/or smart glasses). The AR device 1300 can work in conjunction with additional electronic components that are not shown in FIGS. 13A, such as a wearable accessory device and/or an intermediary processing device, in electronic communication or otherwise configured to be used in conjunction with the AR device 1300. In some embodiments, the wearable accessory device and/or the intermediary processing device may be configured to couple with the AR device 1300 via a coupling mechanism in electronic communication with a coupling sensor 1324, where the coupling sensor 1324 can detect when an electronic device becomes physically or electronically coupled with the AR device 1300. In some embodiments, the AR device 1300 can be configured to couple to a housing (e.g., a portion of frame 1304 or temple arms 1305), which may include one or more additional coupling mechanisms configured to couple with additional accessory devices. The components shown in FIG. 13A can be implemented in hardware, software, firmware, or a combination thereof, including one or more signal-processing components and/or application-specific integrated circuits (ASICs).

The AR device 1300 includes mechanical glasses components, including a frame 1304 configured to hold one or more lenses (e.g., one or both lenses 1306-1 and 1306-2). One of ordinary skill in the art will appreciate that the AR device 1300 can include additional mechanical components, such as hinges configured to allow portions of the frame 1304 of the AR device 1300 to be folded and unfolded, a bridge configured to span the gap between the lenses 1306-1 and 1306-2 and rest on the user's nose, nose pads configured to rest on the bridge of the nose and provide support for the AR device 1300, earpieces configured to rest on the user's ears and provide additional support for the AR device 1300, temple arms 1305 configured to extend from the hinges to the earpieces of the AR device 1300, and the like. One of ordinary skill in the art will further appreciate that some examples of the AR device 1300 can include none of the mechanical components described herein. For example, smart contact lenses configured to present AR to users may not include any components of the AR device 1300.

The lenses 1306-1 and 1306-2 can be individual displays or display devices (e.g., a waveguide for projected representations). The lenses 1306-1 and 1306-2 may act together or independently to present an image or series of images to a user. In some embodiments, the lenses 1306-1 and 1306-2 can operate in conjunction with one or more display projector assemblies 1307A and 1307B to present image data to a user. While the AR device 1300 includes two displays, embodiments of this disclosure may be implemented in AR devices with a single near-eye display (NED) or more than two NEDs.

The AR device 1300 includes electronic components, many of which will be described in more detail below with respect to FIG. 13C. Some example electronic components are illustrated in FIG. 13A, including sensors 1323-1, 1323-2, 1323-3, 1323-4, 1323-5, and 1323-6, which can be distributed along a substantial portion of the frame 1304 of the AR device 1300. The different types of sensors are described below in reference to FIG. 13C. The AR device 1300 also includes a left camera 1339A and a right camera 1339B, which are located on different sides of the frame 1304. And the eyewear device includes one or more processors 1348A and 1348B (e.g., an integral microprocessor, such as an ASIC) that is embedded into a portion of the frame 1304.

FIGS. 13B-1 and 13B-2 show an example visual depiction of the VR device 1310 (e.g., a head-mounted display (HMD) 1312, also referred to herein as an AR headset, a head-wearable device, or a VR headset). The HMD 1312 includes a front body 1314 and a frame 1316 (e.g., a strap or band) shaped to fit around a user's head. In some embodiments, the front body 1314 and/or the frame 1316 includes one or more electronic elements for facilitating presentation of and/or interactions with an AR and/or VR system (e.g., displays, processors (e.g., processor 1348A-1), IMUs, tracking emitters or detectors, or sensors). In some embodiments, the HMD 1312 includes output audio transducers (e.g., an audio transducer 1318-1), as shown in FIG. 13B-2. In some embodiments, one or more components, such as the output audio transducer(s) 1318 and the frame 1316, can be configured to attach and detach (e.g., are detachably attachable) to the HMD 1312 (e.g., a portion or all of the frame 1316 and/or the output audio transducer 1318), as shown in FIG. 13B-2. In some embodiments, coupling a detachable component to the HMD 1312 causes the detachable component to come into electronic communication with the HMD 1312. The VR device 1310 includes electronic components, many of which will be described in more detail below with respect to FIG. 13C.

FIGS. 13B-1 and 13B-2 also show that the VR device 1310 having one or more cameras, such as the left camera 1339A and the right camera 1339B, which can be analogous to the left and right cameras on the frame 1304 of the AR device 1300. In some embodiments, the VR device 1310 includes one or more additional cameras (e.g., cameras 1339C and 1339D), which can be configured to augment image data obtained by the cameras 1339A and 1339B by providing more information. For example, the camera 1339C can be used to supply color information that is not discerned by cameras 1339A and 1339B. In some embodiments, one or more of the cameras 1339A to 1339D can include an optional IR cut filter configured to remove IR light from being received at the respective camera sensors.

The VR device 1310 can include a housing 1390 storing one or more components of the VR device 1310 and/or additional components of the VR device 1310. The housing 1390 can be a modular electronic device configured to couple with the VR device 1310 (or an AR device 1300) and supplement and/or extend the capabilities of the VR device 1310 (or an AR device 1300). For example, the housing 1390 can include additional sensors, cameras, power sources, and processors (e.g., processor 1348A-2). to improve and/or increase the functionality of the VR device 1310. Examples of the different components included in the housing 1390 are described below in reference to FIG. 13C.

Alternatively, or in addition, in some embodiments, the head-wearable device, such as the VR device 1310 and/or the AR device 1300, includes, or is communicatively coupled to, another external device (e.g., a paired device), such as an HIPD 14 (discussed below in reference to FIGS. 14A-14B) and/or an optional neckband. The optional neckband can couple to the head-wearable device via one or more connectors (e.g., wired or wireless connectors). The head-wearable device and the neckband can operate independently without any wired or wireless connection between them. In some embodiments, the components of the head-wearable device and the neckband are located on one or more additional peripheral devices paired with the head-wearable device, the neckband, or some combination thereof. Furthermore, the neckband is intended to represent any suitable type or form of paired device. Thus, the following discussion of neckbands may also apply to various other paired devices, such as smartwatches, smartphones, wrist bands, other wearable devices, hand-held controllers, tablet computers, or laptop computers.

In some situations, pairing external devices, such as an intermediary processing device (e.g., an HIPD device 1400, an optional neckband, and/or a wearable accessory device) with the head-wearable devices (e.g., an AR device 1300 and/or a VR device 1310) enables the head-wearable devices to achieve a similar form factor of a pair of glasses while still providing sufficient battery and computational power for expanded capabilities. Some, or all, of the battery power, computational resources, and/or additional features of the head-wearable devices can be provided by a paired device or shared between a paired device and the head-wearable devices, thus reducing the weight, heat profile, and form factor of the head-wearable device overall while allowing the head-wearable device to retain its desired functionality. For example, the intermediary processing device (e.g., the HIPD 1400) can allow components that would otherwise be included in a head-wearable device to be included in the intermediary processing device (and/or a wearable device or accessory device), thereby shifting a weight load from the user's head and neck to one or more other portions of the user's body. In some embodiments, the intermediary processing device has a larger surface area over which to diffuse and disperse heat to the ambient environment. Thus, the intermediary processing device can allow for greater battery and computational capacity than might otherwise have been possible on the head-wearable devices, standing alone. Because weight carried in the intermediary processing device can be less invasive to a user than weight carried in the head-wearable devices, a user may tolerate wearing a lighter eyewear device and carrying or wearing the paired device for greater lengths of time than the user would tolerate wearing a heavier eyewear device standing alone, thereby enabling an AR environment to be incorporated more fully into a user's day-to-day activities.

In some embodiments, the intermediary processing device is communicatively coupled with the head-wearable device and/or to other devices. The other devices may provide certain functions (e.g., tracking, localizing, depth mapping, processing, and/or storage) to the head-wearable device. In some embodiments, the intermediary processing device includes a controller and a power source. In some embodiments, sensors of the intermediary processing device are configured to sense additional data that can be shared with the head-wearable devices in an electronic format (analog or digital).

The controller of the intermediary processing device processes information generated by the sensors on the intermediary processing device and/or the head-wearable devices. The intermediary processing device, such as an HIPD 1400, can process information generated by one or more of its sensors and/or information provided by other communicatively coupled devices. For example, a head-wearable device can include an IMU, and the intermediary processing device (a neckband and/or an HIPD 1400) can compute all inertial and spatial calculations from the IMUs located on the head-wearable device. Additional examples of processing performed by a communicatively coupled device, such as the HIPD 1400, are provided below in reference to FIGS. 14A and 14B.

AR systems may include a variety of types of visual feedback mechanisms. For example, display devices in the AR devices 1300 and/or the VR devices 1310 may include one or more liquid-crystal displays (LCDs), light emitting diode (LED) displays, organic LED (OLED) displays, and/or any other suitable type of display screen. AR systems may include a single display screen for both eyes or may provide a display screen for each eye, which may allow for additional flexibility for varifocal adjustments or for correcting a refractive error associated with the user's vision. Some AR systems also include optical subsystems having one or more lenses (e.g., conventional concave or convex lenses, Fresnel lenses, or adjustable liquid lenses) through which a user may view a display screen. In addition to or instead of using display screens, some AR systems include one or more projection systems. For example, display devices in the AR device 1300 and/or the VR device 1310 may include micro-LED projectors that project light (e.g., using a waveguide) into display devices, such as clear combiner lenses that allow ambient light to pass through. The display devices may refract the projected light toward a user's pupil and may enable a user to simultaneously view both AR content and the real world. AR systems may also be configured with any other suitable type or form of image projection system. As noted, some AR systems may, instead of blending an artificial reality with actual reality, substantially replace one or more of a user's sensory perceptions of the real world with a virtual experience.

While the example head-wearable devices are respectively described herein as the AR device 1300 and the VR device 1310, either or both of the example head-wearable devices described herein can be configured to present fully immersive VR scenes presented in substantially all of a user's field of view, additionally or alternatively to, subtler augmented-reality scenes that are presented within a portion, less than all, of the user's field of view.

In some embodiments, the AR device 1300 and/or the VR device 1310 can include haptic feedback systems. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback can be implemented using motors, piezoelectric actuators, fluidic systems, and/or a variety of other types of feedback mechanisms. The haptic feedback systems may be implemented independently of other AR devices, within other AR devices, and/or in conjunction with other AR devices (e.g., wrist-wearable devices that may be incorporated into headwear, gloves, body suits, handheld controllers, environmental devices (e.g., chairs or floormats), and/or any other type of device or system, such as a wrist-wearable device 1200, an HIPD 1400, smart textile-based garment 1500), and/or other devices described herein.

FIG. 13C illustrates a computing system 1320 and an optional housing 1390, each of which shows components that can be included in a head-wearable device (e.g., the AR device 1300 and/or the VR device 1310). In some embodiments, more or fewer components can be included in the optional housing 1390 depending on practical restraints of the respective head-wearable device being described. Additionally or alternatively, the optional housing 1390 can include additional components to expand and/or augment the functionality of a head-wearable device.

In some embodiments, the computing system 1320 and/or the optional housing 1390 can include one or more peripheral interfaces 1322A and 1322B, one or more power systems 1342A and 1342B (including charger input 1343, PMIC 1344, and battery 1345), one or more controllers 1346A and 1346B (including one or more haptic controllers 1347), one or more processors 1348A and 1348B (as defined above, including any of the examples provided), and memory 1350A and 1350B, which can all be in electronic communication with each other. For example, the one or more processors 1348A and/or 1348B can be configured to execute instructions stored in the memory 1350A and/or 1350B, which can cause a controller of the one or more controllers 1346A and/or 1346B to cause operations to be performed at one or more peripheral devices of the peripherals interfaces 1322A and/or 1322B. In some embodiments, each operation described can occur based on electrical power provided by the power system 1342A and/or 1342B.

In some embodiments, the peripherals interface 1322A can include one or more devices configured to be part of the computing system 1320, many of which have been defined above and/or described with respect to wrist-wearable devices shown in FIGS. 12A and 12B. For example, the peripherals interface can include one or more sensors 1323A. Some example sensors include one or more coupling sensors 1324, one or more acoustic sensors 1325, one or more imaging sensors 1326, one or more EMG sensors 1327, one or more capacitive sensors 1328, and/or one or more IMUs 1329. In some embodiments, the sensors 1323A further include depth sensors 1367, light sensors 1368, and/or any other types of sensors defined above or described with respect to any other embodiments discussed herein.

In some embodiments, the peripherals interface can include one or more additional peripheral devices, including one or more NFC devices 1330, one or more GPS devices 1331, one or more LTE devices 1332, one or more Wi-Fi and/or Bluetooth devices 1333, one or more buttons 1334 (e.g., including buttons that are slidable or otherwise adjustable), one or more displays 1335A, one or more speakers 1336A, one or more microphones 1337A, one or more cameras 1338A (e.g., including the first camera 1339-1 through nth camera 1339-*n*, which are analogous to the left camera 1339A and/or the right camera 1339B), one or more haptic devices 1340, and/or any other types of peripheral devices defined above or described with respect to any other embodiments discussed herein.

The head-wearable devices can include a variety of types of visual feedback mechanisms (e.g., presentation devices). For example, display devices in the AR device 1300 and/or the VR device 1310 can include one or more liquid-crystal displays (LCDs), light emitting diode (LED) displays, organic LED (OLED) displays, micro-LEDs, and/or any other suitable types of display screens. The head-wearable devices can include a single display screen (e.g., configured to be seen by both eyes) and/or can provide separate display screens for each eye, which can allow for additional flexibility for varifocal adjustments and/or for correcting a refractive error associated with the user's vision. Some embodiments of the head-wearable devices also include optical subsystems having one or more lenses (e.g., conventional concave or convex lenses, Fresnel lenses, or adjustable liquid lenses) through which a user can view a display screen. For example, respective displays 1335A can be coupled to each of the lenses 1306-1 and 1306-2 of the AR device 1300. The displays 1335A coupled to each of the lenses 1306-1 and 1306-2 can act together or independently to present an image or series of images to a user. In some embodiments, the AR device 1300 and/or the VR device 1310 includes a single display 1335A (e.g., a near-eye display) or more than two displays 1335A.

In some embodiments, a first set of one or more displays 1335A can be used to present an augmented-reality environment, and a second set of one or more display devices 1335A can be used to present a VR environment. In some embodiments, one or more waveguides are used in conjunction with presenting AR content to the user of the AR device 1300 and/or the VR device 1310 (e.g., as a means of delivering light from a display projector assembly and/or one or more displays 1335A to the user's eyes). In some embodiments, one or more waveguides are fully or partially integrated into the AR device 1300 and/or the VR device 1310. Additionally, or alternatively, to display screens, some AR systems include one or more projection systems. For example, display devices in the AR device 1300 and/or the VR device 1310 can include micro-LED projectors that project light (e.g., using a waveguide) into display devices, such as clear combiner lenses that allow ambient light to pass through. The display devices can refract the projected light toward a user's pupil and can enable a user to simultaneously view both AR content and the real world. The head-wearable devices can also be configured with any other suitable type or form of image projection system. In some embodiments, one or more waveguides are provided, additionally or alternatively, to the one or more display(s) 1335A.

In some embodiments of the head-wearable devices, ambient light and/or a real-world live view (e.g., a live feed of the surrounding environment that a user would normally see) can be passed through a display element of a respective head-wearable device presenting aspects of the AR system. In some embodiments, ambient light and/or the real-world live view can be passed through a portion, less than all, of an AR environment presented within a user's field of view (e.g., a portion of the AR environment co-located with a physical object in the user's real-world environment that is within a designated boundary (e.g., a guardian boundary) configured to be used by the user while they are interacting with the AR environment). For example, a visual user interface element (e.g., a notification user interface element) can be presented at the head-wearable devices, and an amount of ambient light and/or the real-world live view (e.g., 15%-50% of the ambient light and/or the real-world live view) can be passed through the user interface element, such that the user can distinguish at least a portion of the physical environment over which the user interface element is being displayed.

The head-wearable devices can include one or more external displays 1335A for presenting information to users. For example, an external display 1335A can be used to show a current battery level, network activity (e.g., connected, disconnected), current activity (e.g., playing a game, in a call, in a meeting, or watching a movie), and/or other relevant information. In some embodiments, the external displays 1335A can be used to communicate with others. For example, a user of the head-wearable device can cause the external displays 1335A to present a "do not disturb" notification. The external displays 1335A can also be used by the user to share any information captured by the one or more components of the peripherals interface 1322A and/or generated by the head-wearable device (e.g., during operation and/or performance of one or more applications).

The memory 1350A can include instructions and/or data executable by one or more processors 1348A (and/or processors 1348B of the housing 1390) and/or a memory controller of the one or more controllers 1346A (and/or controller 1346B of the housing 1390). The memory 1350A can include one or more operating systems 1351, one or more applications 1352, one or more communication interface modules 1353A, one or more graphics modules 1354A, one or more AR processing modules 1355A, a locomotion control module 1356A (analogous to the locomotion control module 1286A; 12B) for performing the features described above in reference to FIGS. 1A-10, and/or any other types of modules or components defined above or described with respect to any other embodiments discussed herein.

The data 1360 stored in memory 1350A can be used in conjunction with one or more of the applications and/or programs discussed above. The data 1360 can include profile data 1361, sensor data 1362, media content data 1363, AR application data 1364, locomotion control data 1365 (analogous to the locomotion control data 1292A; FIG. 12B) for storing data related to the performance of the features described above in reference to FIGS. 1A-10; and/or any other types of data defined above or described with respect to any other embodiments discussed herein.

In some embodiments, the controller 1346A of the head-wearable devices processes information generated by the sensors 1323A on the head-wearable devices and/or another component of the head-wearable devices and/or communicatively coupled with the head-wearable devices (e.g., components of the housing 1390, such as components of peripherals interface 1322B). For example, the controller 1346A can process information from the acoustic sensors 1323A and/or image sensors 1326. For each detected sound, the controller 1346A can perform a direction of arrival (DOA) estimation to estimate a direction from which the detected sound arrived at a head-wearable device. As one or more of the acoustic sensors 1323A detect sounds, the controller 1346A can populate an audio data set with the information (e.g., represented by sensor data 1362).

In some embodiments, a physical electronic connector can convey information between the head-wearable devices and another electronic device, and/or between one or more processors 1348A of the head-wearable devices and the controller 1346A. The information can be in the form of optical data, electrical data, wireless data, or any other transmittable data form. Moving the processing of information generated by the head-wearable devices to an intermediary processing device can reduce weight and heat in the eyewear device, making it more comfortable and safer for a user. In some embodiments, an optional accessory device (e.g., an electronic neckband or an HIPD 1400) is coupled to the head-wearable devices via one or more connectors. The connectors can be wired or wireless connectors and can include electrical and/or non-electrical (e.g., structural) components. In some embodiments, the head-wearable devices and the accessory device can operate independently without any wired or wireless connection between them.

The head-wearable devices can include various types of computer vision components and subsystems. For example, the AR device 1300 and/or the VR device 1310 can include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. A head-wearable device can process data from one or more of these sensors to identify a location of a user and/or aspects of the user's real-world physical surroundings, including the locations of real-world objects within the real-world physical surroundings. In some embodiments, the methods described herein are used to map the real world, to provide a user with context about real-world surroundings, and/or to generate interactable virtual objects (which can be replicas or digital twins of real-world objects that can be interacted with an AR environment), among a variety of other functions. For example, FIGS. 13B-1 and 13B-2 show the VR device 1310 having cameras 1339A-1339D, which can be used to provide depth information for creating a voxel field and a 2D mesh to provide object information to the user to avoid collisions.

The optional housing 1390 can include analogous components to those describe above with respect to the computing system 1320. For example, the optional housing 1390 can include a respective peripherals interface 1322B, including more or fewer components to those described above with respect to the peripherals interface 1322A. As described above, the components of the optional housing 1390 can be used to augment and/or expand on the functionality of the head-wearable devices. For example, the optional housing 1390 can include respective sensors 1323B, speakers 1336B, displays 1335B, microphones 1337B, cameras 1338B, and/or other components to capture and/or present data. Similarly, the optional housing 1390 can include one or more processors 1348B, controllers 1346B, and/or memory 1350B (including respective communication interface modules 1353B, one or more graphics modules 1354B, one or more AR processing modules 1355B, a locomotion control module 1356B, locomotion control data 1365B, etc.) that can be used individually and/or in conjunction with the components of the computing system 1320.

The techniques described above in FIGS. 13A-13C can be used with different head-wearable devices. In some embodiments, the head-wearable devices (e.g., the AR device 1300 and/or the VR device 1310) can be used in conjunction with one or more wearable devices such as a wrist-wearable device 1200 (or components thereof) and/or a smart textile-based garment 1500 (FIGS. 15A-15C), as well as an HIPD 1400. Having thus described example the head-wearable devices, attention will now be turned to example handheld intermediary processing devices, such as HIPD 1400.

Example Handheld Intermediary Processing Devices

FIGS. 14A and 14B illustrate an example handheld intermediary processing device (HIPD) 1400, in accordance with some embodiments. The HIPD 1400 is an instance of the intermediary device described in reference to FIGS. 1A-10 herein, such that the HIPD 1400 should be understood to have the features described with respect to any intermediary device defined above or otherwise described herein, and vice versa. The HIPD 1400 can perform various functions and/or operations associated with navigating through user interfaces and selectively opening applications, as well as the functions and/or operations described above with reference to FIGS. 1A-10.

FIG. 14A shows a top view 1405 and a side view 1425 of the HIPD 1400. The HIPD 1400 is configured to communicatively couple with one or more wearable devices (or other electronic devices) associated with a user. For example, the HIPD 1400 is configured to communicatively couple with a user's wrist-wearable device 1200 (or components thereof, such as the watch body 1220 and the wearable band 1210), AR device 1300, and/or VR device 1310. The HIPD 1400 can be configured to be held by a user (e.g., as a handheld controller), carried on the user's person (e.g., in their pocket or in their bag), placed in proximity of the user (e.g., placed on their desk while seated at their desk or on a charging dock), and/or placed at or within a predetermined distance from a wearable device or other electronic device (e.g., where, in some embodiments, the predetermined distance is the maximum distance (e.g., 10 meters) at which the HIPD 1400 can successfully be communicatively coupled with an electronic device, such as a wearable device).

The HIPD 1400 can perform various functions independently and/or in conjunction with one or more wearable devices (e.g., wrist-wearable device 1200, AR device 1300, and/or VR device 1310). The HIPD 1400 is configured to increase and/or improve the functionality of communicatively coupled devices, such as the wearable devices. The HIPD 1400 is configured to perform one or more functions or operations associated with interacting with user interfaces and applications of communicatively coupled devices, interacting with an AR environment, interacting with a VR environment, and/or operating as a human-machine interface controller, as well as functions and/or operations described above with reference to FIGS. 1A-10. Additionally, as will be described in more detail below, functionality and/or operations of the HIPD 1400 can include, without limitation, task offloading and/or handoffs, thermals offloading and/or handoffs, 6 degrees of freedom (6DoF) raycasting and/or gaming (e.g., using imaging devices or cameras 1414A and 1414B, which can be used for simultaneous localization and mapping (SLAM), and/or with other image processing techniques), portable charging; messaging, image capturing via one or more imaging devices or cameras (e.g., cameras 1422A and 1422B), sensing user input (e.g., sensing a touch on a multitouch input surface 1402), wireless communications and/or interlining (e.g., cellular, near field, Wi-Fi, or personal area network), location determination, financial transactions, providing haptic feedback, alarms, notifications, biometric authentication, health monitoring, sleep monitoring. The above-example functions can be executed independently in the HIPD 1400 and/or in communication between the HIPD 1400 and another wearable device described herein. In some embodiments, functions can be executed on the HIPD 1400 in conjunction with an AR environment. As the skilled artisan will appreciate upon reading the descriptions provided herein, the novel HIPD 1400 described herein can be used with any type of suitable AR environment.

While the HIPD 1400 is communicatively coupled with a wearable device and/or other electronic device, the HIPD 1400 is configured to perform one or more operations initiated at the wearable device and/or the other electronic device. In particular, one or more operations of the wearable device and/or the other electronic device can be offloaded to the HIPD 1400 to be performed. The HIPD 1400 performs one or more operations of the wearable device and/or the other electronic device and provides data corresponding to the completed operations to the wearable device and/or the other electronic device. For example, a user can initiate a video stream using the AR device 1300 and back-end tasks associated with performing the video stream (e.g., video rendering) can be offloaded to the HIPD 1400, which the HIPD 1400 performs and provides corresponding data to the AR device 1300 to perform remaining front-end tasks associated with the video stream (e.g., presenting the rendered video data via a display of the AR device 1300). In this way, the HIPD 1400, which has more computational resources and greater thermal headroom than a wearable device can perform computationally intensive tasks for the wearable device, improving performance of an operation performed by the wearable device.

The HIPD 1400 includes a multi-touch input surface 1402 on a first side (e.g., a front surface) that is configured to detect one or more user inputs. In particular, the multi-touch input surface 1402 can detect single-tap inputs, multi-tap inputs, swipe gestures and/or inputs, force-based and/or pressure-based touch inputs, held taps, and the like. The multi-touch input surface 1402 is configured to detect capacitive touch inputs and/or force (and/or pressure) touch inputs. The multi-touch input surface 1402 includes a first touch-input surface 1404 defined by a surface depression, and a second touch-input surface 1406 defined by a substantially planar portion. The first touch-input surface 1404 can be disposed adjacent to the second touch-input surface 1406. In some embodiments, the first touch-input surface 1404 and the second touch-input surface 1406 can be different dimensions, shapes, and/or cover different portions of the multi-touch input surface 1402. For example, the first touch-input surface 1404 can be substantially circular and the second touch-input surface 1406 is substantially rectangular. In some embodiments, the surface depression of the multi-touch input surface 1402 is configured to guide user handling of the HIPD 1400. In particular, the surface depression is configured such that the user holds the HIPD 1400 upright when held in a single hand (e.g., such that the using imaging devices or cameras 1414A and 1414B are pointed toward a ceiling or the sky). Additionally, the surface depression is configured such that the user's thumb rests within the first touch-input surface 1404.

In some embodiments, the different touch-input surfaces include a plurality of touch-input zones. For example, the second touch-input surface 1406 includes at least a first touch-input zone 1408 within a second touch-input zone 1406 and a third touch-input zone 1410 within the first touch-input zone 1408. In some embodiments, one or more of the touch-input zones are optional and/or user defined (e.g., a user can specific a touch-input zone based on their preferences). In some embodiments, each touch-input surface and/or touch-input zone is associated with a predetermined set of commands. For example, a user input detected within the first touch-input zone 1408 causes the HIPD 1400 to perform a first command and a user input detected within the second touch-input zone 1406 causes the HIPD 1400 to perform a second command, distinct from the first. In some embodiments, different touch-input surfaces and/or touch-input zones are configured to detect one or more types of user inputs. The different touch-input surfaces and/or touch-input zones can be configured to detect the same or distinct types of user inputs. For example, the first touch-input zone 1408 can be configured to detect force touch inputs (e.g., a magnitude at which the user presses down) and capacitive touch inputs, and the second touch-input zone 1406 can be configured to detect capacitive touch inputs.

The HIPD 1400 includes one or more sensors 1451 for sensing data used in the performance of one or more operations and/or functions. For example, the HIPD 1400 can include an IMU that is used in conjunction with cameras 1414 for 3-dimensional object manipulation (e.g., enlarging, moving, destroying, etc. an object) in an AR or VR environment. Non-limiting examples of the sensors 1451 included in the HIPD 1400 include a light sensor, a magnetometer, a depth sensor, a pressure sensor, and a force sensor. Additional examples of the sensors 1451 are provided below in reference to FIG. 14B.

The HIPD 1400 can include one or more light indicators 1412 to provide one or more notifications to the user. In some embodiments, the light indicators are LEDs or other types of illumination devices. The light indicators 1412 can operate as a privacy light to notify the user and/or others near the user that an imaging device and/or microphone are active. In some embodiments, a light indicator is positioned adjacent to one or more touch-input surfaces. For example, a light indicator can be positioned around the first touch-input surface 1404. The light indicators can be illuminated in different colors and/or patterns to provide the user with one or more notifications and/or information about the device. For example, a light indicator positioned around the first touch-input surface 1404 can flash when the user receives a notification (e.g., a message), change red when the HIPD 1400 is out of power, operate as a progress bar (e.g., a light ring that is closed when a task is completed (e.g., 0% to 100%)), operates as a volume indicator, etc.).

In some embodiments, the HIPD 1400 includes one or more additional sensors on another surface. For example, as shown FIG. 14A, HIPD 1400 includes a set of one or more sensors (e.g., sensor set 1420) on an edge of the HIPD 1400. The sensor set 1420, when positioned on an edge of the of the HIPD 1400, can be pe positioned at a predetermined tilt angle (e.g., 26 degrees), which allows the sensor set 1420 to be angled toward the user when placed on a desk or other flat surface. Alternatively, in some embodiments, the sensor set 1420 is positioned on a surface opposite the multi-touch input surface 1402 (e.g., a back surface). The one or more sensors of the sensor set 1420 are discussed in detail below.

The side view 1425 of the of the HIPD 1400 shows the sensor set 1420 and camera 1414B. The sensor set 1420 includes one or more cameras 1422A and 1422B, a depth projector 1424, an ambient light sensor 1428, and a depth receiver 1430. In some embodiments, the sensor set 1420 includes a light indicator 1426. The light indicator 1426 can operate as a privacy indicator to let the user and/or those around them know that a camera and/or microphone is active. The sensor set 1420 is configured to capture a user's facial expression such that the user can puppet a custom avatar (e.g., showing emotions, such as smiles, laughter, etc., on the avatar or a digital representation of the user). The sensor set 1420 can be configured as a side stereo RGB system, a rear indirect Time-of-Flight (iToF) system, or a rear stereo RGB system. As the skilled artisan will appreciate upon reading the descriptions provided herein, the novel HIPD 1400 described herein can use different sensor set 1420 configurations and/or sensor set 1420 placement.

In some embodiments, the HIPD 1400 includes one or more haptic devices 1471 (FIG. 14B; e.g., a vibratory haptic actuator) that are configured to provide haptic feedback (e.g., kinesthetic sensation). The sensors 1451, and/or the haptic devices 1471 can be configured to operate in conjunction with multiple applications and/or communicatively coupled devices including, without limitation, a wearable device, health monitoring applications, social media applications, game applications, and artificial reality applications (e.g., the applications associated with artificial reality).

The HIPD 1400 is configured to operate without a display. However, in optional embodiments, the HIPD 1400 can include a display 1468 (FIG. 14B). The HIPD 1400 can also income one or more optional peripheral buttons 1467 (FIG. 14B). For example, the peripheral buttons 1467 can be used to turn on or turn off the HIPD 1400. Further, the HIPD 1400 housing can be formed of polymers and/or elastomer elastomers. The HIPD 1400 can be configured to have a non-slip surface to allow the HIPD 1400 to be placed on a surface without requiring a user to watch over the HIPD 1400. In other words, the HIPD 1400 is designed such that it would not easily slide off a surface. In some embodiments, the HIPD 1400 include one or magnets to couple the HIPD 1400 to another surface. This allows the user to mount the HIPD 1400 to different surfaces and provide the user with greater flexibility in use of the HIPD 1400.

As described above, the HIPD 1400 can distribute and/or provide instructions for performing the one or more tasks at the HIPD 1400 and/or a communicatively coupled device. For example, the HIPD 1400 can identify one or more back-end tasks to be performed by the HIPD 1400 and one or more front-end tasks to be performed by a communicatively coupled device. While the HIPD 1400 is configured to offload and/or handoff tasks of a communicatively coupled device, the HIPD 1400 can perform both back-end and front-end tasks (e.g., via one or more processors, such as CPU 1477; FIG. 14B). The HIPD 1400 can, without limitation, can be used to perform augmenting calling (e.g., receiving and/or sending 3D or 2.5D live volumetric calls, live digital human representation calls, and/or avatar calls), discreet messaging, 6DoF portrait/landscape gaming, AR/VR object manipulation, AR/VR content display (e.g., presenting content via a virtual display), and/or other AR/VR interactions. The HIPD 1400 can perform the above operations alone or in conjunction with a wearable device (or other communicatively coupled electronic device).

FIG. 14B shows block diagrams of a computing system 1440 of the HIPD 1400, in accordance with some embodiments. The HIPD 1400, described in detail above, can include one or more components shown in HIPD computing system 1440. The HIPD 1400 will be understood to include the components shown and described below for the HIPD computing system 1440. In some embodiments, all, or a substantial portion of the components of the HIPD computing system 1440 are included in a single integrated circuit. Alternatively, in some embodiments, components of the HIPD computing system 1440 are included in a plurality of integrated circuits that are communicatively coupled.

The HIPD computing system 1440 can include a processor (e.g., a CPU 1477, a GPU, and/or a CPU with integrated graphics), a controller 1475, a peripherals interface 1450 that includes one or more sensors 1451 and other peripheral devices, a power source (e.g., a power system 1495), and memory (e.g., a memory 1478) that includes an operating system (e.g., an operating system 1479), data (e.g., data 1488), one or more applications (e.g., applications 1480), and one or more modules (e.g., a communications interface module 1481, a graphics module 1482, a task and processing management module 1483, an interoperability module 1484, an AR processing module 1485, a data management module 1486, a locomotion control module 1487 (analogous to the locomotion control module 1286A; 12B), etc.). The HIPD computing system 1440 further includes a power system 1495 that includes a charger input and output 1496, a PMIC 1497, and a battery 1498, all of which are defined above.

In some embodiments, the peripherals interface 1450 can include one or more sensors 1451. The sensors 1451 can include analogous sensors to those described above in reference to FIG. 12B. For example, the sensors 1451 can include imaging sensors 1454, (optional) EMG sensors 1456, IMUs 1458, and capacitive sensors 1460. In some embodiments, the sensors 1451 can include one or more pressure sensor 1452 for sensing pressure data, an altimeter 1453 for sensing an altitude of the HIPD 1400, a magnetometer 1455 for sensing a magnetic field, a depth sensor 1457 (or a time-of flight sensor) for determining a difference between the camera and the subject of an image, a position sensor 1459 (e.g., a flexible position sensor) for sensing a relative displacement or position change of a portion of the HIPD 1400, a force sensor 1461 for sensing a force applied to a portion of the HIPD 1400, and a light sensor 1462 (e.g., an ambient light sensor) for detecting an amount of lighting. The sensors 1451 can include one or more sensors not shown in FIG. 14B.

Analogous to the peripherals described above in reference to FIGS. 12B, the peripherals interface 1450 can also include an NFC component 1463, a GPS component 1464, an LTE component 1465, a Wi-Fi and/or Bluetooth communication component 1466, a speaker 1469, a haptic device 1471, and a microphone 1473. As described above in reference to FIG. 14A, the HIPD 1400 can optionally include a display 1468 and/or one or more buttons 1467. The peripherals interface 1450 can further include one or more cameras 1470, touch surfaces 1472, and/or one or more light emitters 1474. The multi-touch input surface 1402 described above in reference to FIG. 14A is an example of touch surface 1472. The light emitters 1474 can be one or more LEDs, lasers, etc. and can be used to project or present information to a user. For example, the light emitters 1474 can include light indicators 1412 and 1426 described above in reference to FIG. 14A. The cameras 1470 (e.g., cameras 1414A, 1414B, and 1422 described above in FIG. 14A) can include one or more wide angle cameras, fish-eye cameras, spherical cameras, compound eye cameras (e.g., stereo and multi cameras), depth cameras, RGB cameras, ToF cameras, RGB-D cameras (depth and ToF cameras), and/or other available cameras. Cameras 1470 can be used for SLAM; 6 DoF ray casting, gaming, object manipulation, and/or other rendering; facial recognition and facial expression recognition, etc.

Similar to the watch body computing system 1260 and the watch band computing system 1230 described above in reference to FIG. 12B, the HIPD computing system 1440 can include one or more haptic controllers 1476 and associated componentry (e.g., haptic devices 1471) for providing haptic events at the HIPD 1400.

Memory 1478 can include high-speed random-access memory and/or non-volatile memory, such as one or more magnetic disk storage devices, flash memory devices, or other non-volatile solid-state memory devices. Access to the memory 1478 by other components of the HIPD 1400, such as the one or more processors and the peripherals interface 1450, can be controlled by a memory controller of the controllers 1475.

In some embodiments, software components stored in the memory 1478 include one or more operating systems 1479, one or more applications 1480, one or more communication interface modules 1481, one or more graphics modules 1482, one or more data management modules 1485, which are analogous to the software components described above in reference to FIG. 12B. The software components stored in the memory 1478 can also include a locomotion control module 1486A, which is configured to perform the features described above in reference to FIGS. 1A-10.

In some embodiments, software components stored in the memory 1478 include a task and processing management module 1483 for identifying one or more front-end and back-end tasks associated with an operation performed by the user, performing one or more front-end and/or back-end tasks, and/or providing instructions to one or more communicatively coupled devices that cause performance of the one or more front-end and/or back-end tasks. In some embodiments, the task and processing management module 1483 uses data 1488 (e.g., device data 1490) to distribute the one or more front-end and/or back-end tasks based on communicatively coupled devices' computing resources, available power, thermal headroom, ongoing operations, and/or other factors. For example, the task and processing management module 1483 can cause the performance of one or more back-end tasks (of an operation performed at communicatively coupled AR device 1300) at the HIPD 1400 in accordance with a determination that the operation is utilizing a predetermined amount (e.g., at least 70%) of computing resources available at the AR device 1300.

In some embodiments, software components stored in the memory 1478 include an interoperability module 1484 for exchanging and utilizing information received and/or provided to distinct communicatively coupled devices. The interoperability module 1484 allows for different systems, devices, and/or applications to connect and communicate in a coordinated way without user input. In some embodiments, software components stored in the memory 1478 include an AR module 1485 that is configured to process signals based at least on sensor data for use in an AR and/or VR environment. For example, the AR processing module 1485 can be used for 3D object manipulation, gesture recognition, facial and facial expression, recognition, etc.

The memory 1478 can also include data 1488, including structured data. In some embodiments, the data 1488 can include profile data 1489, device data 1490 (including device data of one or more devices communicatively coupled with the HIPD 1400, such as device type, hardware, software, configurations, etc.), sensor data 1491, media content data 1492, application data 1493, and locomotion control data 1494 (analogous to the locomotion control data 1292A; FIG. 12B), which stores data related to the performance of the features described above in reference to FIGS. 1A-10.

It should be appreciated that the HIPD computing system 1440 is an example of a computing system within the HIPD 1400, and that the HIPD 1400 can have more or fewer components than shown in the HIPD computing system 1440, combine two or more components, and/or have a different configuration and/or arrangement of the components. The various components shown in HIPD computing system 1440 are implemented in hardware, software, firmware, or a combination thereof, including one or more signal processing and/or application-specific integrated circuits.

Figure 15B:
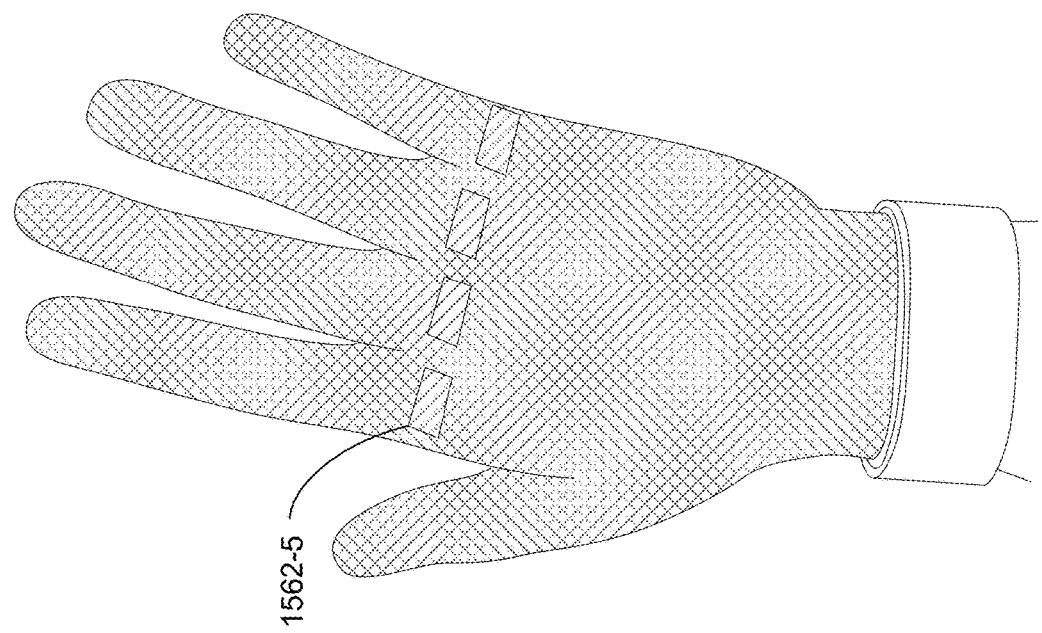
FIGS. 15A-15C illustrate an example smart textile-based garment, in accordance with some embodiments.
Figure 15A:
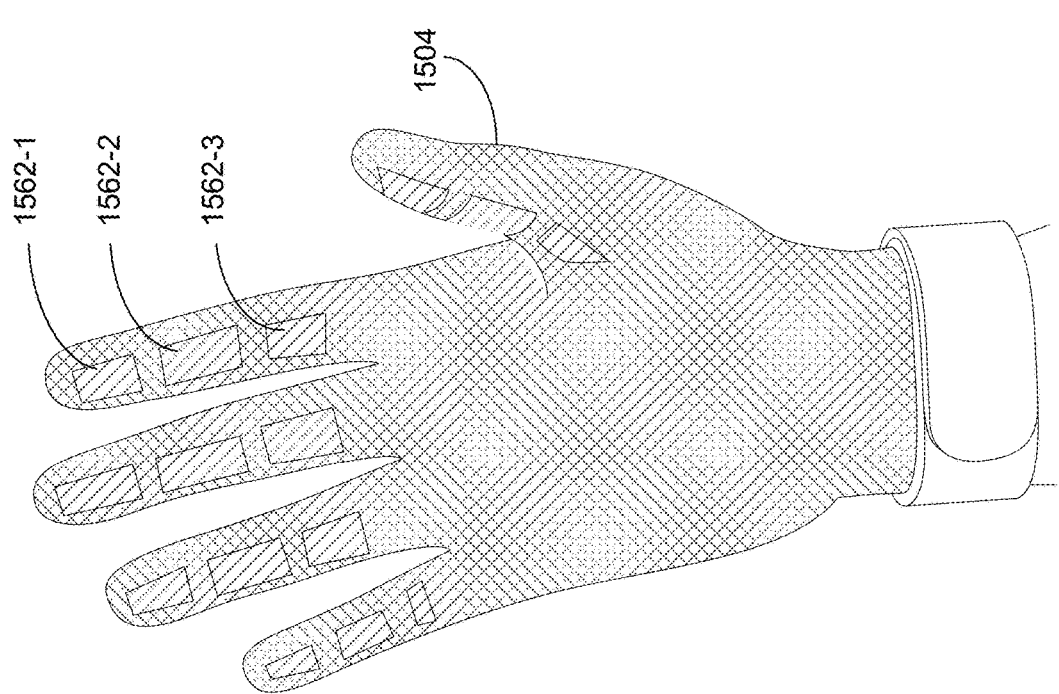
Figure 15C:
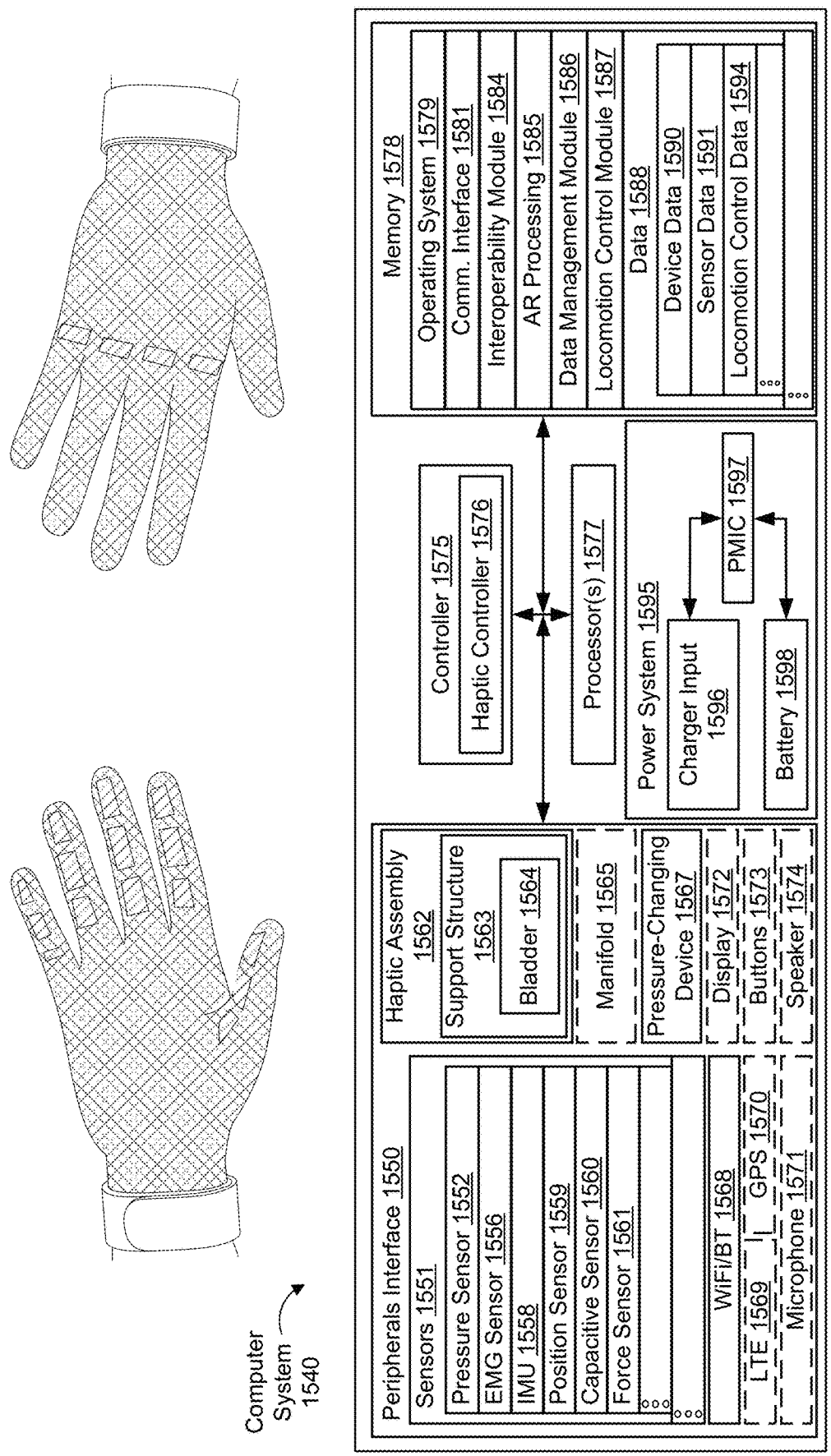

The techniques described above in FIG. 14A-14B can be used with any device used as a human-machine interface controller. In some embodiments, an HIPD 1400 can be used in conjunction with one or more wearable device such as a head-wearable device (e.g., AR device 1300 and VR device 1310) and/or a wrist-wearable device 1200 (or components thereof). In some embodiments, an HIPD 1400 can also be used in conjunction with a wearable garment, such as smart textile-based garment 1500 (FIGS. 15A-15C). Having thus described example HIPD 1400, attention will now be turned to example feedback devices, such as smart textile-based garment 1500.

Example Smart Textile-Based Garments

FIGS. 15A and 15B illustrate an example smart textile-based garment, in accordance with some embodiments. The smart textile-based garment 1500 (e.g., wearable gloves, a shirt, a headband, a wristband, socks, etc.) is configured to communicatively couple with one or more electronic devices, such as a wrist-wearable device 1200, a head-wearable device, an HIPD 1400, a laptop, tablet, and/or other computing devices. The smart textile-based garment 1500 is an instance of the smart textile-based garment described in reference to FIGS. 1A-10 herein, such that the smart textile-based garment 1500 should be understood to have the features described with respect to any smart textile-based garment defined above or otherwise described herein, and vice versa. The smart textile-based garment 1500 can perform various functions and/or operations associated with navigating through user interfaces and selectively opening applications, as well as the functions and/or operations described above with reference to FIGS. 1A-10.

The smart textile-based garment 1500 can be part of an AR system, such as AR system 1100d described above in reference to FIGS. 11D-1 and 11D-2. The smart textile-based garment 1500 is also configured to provide feedback (e.g., tactile or other haptic feedback) to a user based on the user's interactions with a computing system (e.g., navigation of a user interface, operation of an application (e.g., game vibrations, media responsive haptics), device notifications, etc.)), and/or the user's interactions within an AR environment. In some embodiments, the smart textile-based garment 1500 receives instructions from a communicatively coupled device (e.g., the wrist-wearable device 1200, a head-wearable device, and HIPD 1400, etc.) for causing the performance of a feedback response. Alternatively, or in addition, in some embodiments, the smart textile-based garment 1500 determines one or more feedback responses to provide a user. The smart textile-based garment 1500 can determine the one or more feedback responses based on sensor data captured by one or more of its sensors (e.g., sensors 1551; FIG. 15C) or communicatively coupled sensors (e.g., sensors of a wrist-wearable device 1200, a head-wearable device, an HIPD 1400, and/or other computing device).

Non-limiting examples of the feedback determined by the smart textile-based garment 1500 and/or a communicatively coupled device include visual feedback, audio feedback, haptic (e.g., tactile, kinesthetic, etc.) feedback, thermal or temperature feedback, and/or other sensory perceptible feedback. The smart textile-based garment 1500 can include respective feedback devices (e.g., a haptic device or assembly 1562 or other feedback devices or assemblies) to provide the feedback responses to the user. Similarly, the smart textile-based garment 1500 can communicatively couple with another device (and/or the other device's feedback devices) to coordinate the feedback provided to the user. For example, a VR device 1310 can present an AR environment to a user and as the user interacts with objects within the AR environment, such as a virtual cup, the smart textile-based garment 1500 provides respective response to the user. In particular, the smart textile-based garment 1500 can provide haptic feedback to prevent (or, at a minimum, hinder/resist movement of) one or more of the user's fingers from bending past a certain point to simulate the sensation of touching a solid cup and/or thermal feedback to simulate the sensation of a cold or warm beverage.

Additionally or alternatively, in some embodiments, the smart textile-based garment 1500 is configured to operate as a controller configured to perform one or more functions or operations associated with interacting with user interfaces and applications of communicatively coupled devices, interacting with an AR environment, interacting with VR environment, and/or operating as a human-machine interface controller, as well as functions and/or operations described above with reference to FIGS. 1A-10.

FIG. 15A shows one or more haptic assemblies 1562 (e.g., first through fourth haptic assemblies 1562-1 through 1562-4) on a portion of the smart textile-based garment 1500 adjacent to a palmar side of the user's hand and FIG. 15B shows additional haptic assemblies (e.g., a fifth haptic assembly 1562-5) on a portion of the smart textile-based garment 1500 adjacent to a dorsal side of the user's hand. In some embodiments, the haptic assemblies 1562 include a mechanism that, at a minimum, provide resistance when a respective haptic assembly 1562 is transitioned from a first state (e.g., a first pressurized state (e.g., at atmospheric pressure or deflated)) to a second state (e.g., a second pressurized state (e.g., inflated to a threshold pressure)). In other words, the haptic assemblies 1562 described can transition between a first pressurized state and a second pressurized state to provide haptic feedback to the user. Structures of haptic assemblies 1562 can be integrated into various devices configured to be in contact or proximity to a user's skin, including, but not limited to devices such as glove worn devices, body worn clothing device, headset devices. Each of the haptic assemblies 1562 can be included in or physically coupled to a garment component 1504 of the smart textile-based garment 1500. For example, each of the haptic assemblies 1562-1, 1562-2, 1562-3, . . . 1562-N are physically coupled to the garment 1504 are configured to contact respective phalanges of a user's thumb and fingers.

Due to the ever-changing nature of artificial-reality, the haptic assemblies 1562 may be required to transition between the multiple states hundreds, or perhaps thousands of times, during a single use. Thus, the haptic assemblies 1562 described herein are durable and designed to quickly transition from state to state. To provide some context, in a first pressurized state, the haptic assemblies 1562 do not impede free movement of a portion of the wearer's body. For example, one or more haptic assemblies 1562 incorporated into a glove are made from flexible materials that do not impede free movement of the wearer's hand and fingers (e.g., an electrostatic-zipping actuator). The haptic assemblies 1562 are configured to conform to a shape of the portion of the wearer's body when in the first pressurized state. However, once in a second pressurized state, the haptic assemblies 1562 can be configured to restrict and/or impede free movement of the portion of the wearer's body (e.g., appendages of the user's hand). For example, the respective haptic assembly 1562 (or multiple respective haptic assemblies) can restrict movement of a wearer's finger (e.g., prevent the finger from curling or extending) when the haptic assembly 1562 is in the second pressurized state. Moreover, once in the second pressurized state, the haptic assemblies 1562 may take different shapes, with some haptic assemblies 1562 configured to take a planar, rigid shape (e.g., flat and rigid), while some other haptic assemblies 1562 are configured to curve or bend, at least partially.

The smart textile-based garment 1500 can be one of a plurality of devices in an AR system (e.g., AR systems of FIGS. 11A-11D-2). For example, a user can wear a pair of gloves (e.g., a first type of smart textile-based garment 1500), wear a haptics component of a wrist-wearable device 1200 (FIGS. 12A-12B), wear a headband (e.g., a second type of smart textile-based garment 1500), hold an HIPD 1400, etc. As explained above, the haptic assemblies 1562 are configured to provide haptic simulations to a wearer of the smart textile-based garments 1500. The garment 1504 of each smart textile-based garment 1500 can be one of various articles of clothing (e.g., gloves, socks, shirts, pants, etc.). Thus, a user may wear multiple smart textile-based garments 1500 that are each configured to provide haptic stimulations to respective parts of the body where the smart textile-based garments 1500 are being worn. Although the smart textile-based garment 1500 are described as an individual device, in some embodiments, the smart textile-based garment 1500 can be combined with other wearable devices described herein. For example, the smart textile-based garment 1500 can form part of a VR device 1310 (e.g., a headband portion).

FIG. 15C shows block diagrams of a computing system 1540 of the haptic assemblies 1562, in accordance with some embodiments. The computing system 1540 can include one or more peripheral interfaces 1550, one or more power systems 1595 (including charger input 1596, PMIC 1597, and battery 1598), one or more controllers 1575 (including one or more haptic controllers 1576), one or more processors 1577 (as defined above, including any of the examples provided), and memory 1578, which can all be in electronic communication with each other. For example, the one or more processors 1577 can be configured to execute instructions stored in the memory 1578, which can cause a controller of the one or more controllers 1575 to cause operations to be performed at one or more peripheral devices of the peripherals interface 1550. In some embodiments, each operation described can occur based on electrical power provided by the power system 1595.

In some embodiments, the peripherals interface 1550 can include one or more devices configured to be part of the computing system 1540, many of which have been defined above and/or described with respect to wrist-wearable devices shown in FIGS. 12A-14B. For example, the peripherals interface 1550 can include one or more sensors 1551, such as one or more pressure sensors 1552, one or more EMG sensors 1556, one or more IMUs 1558, one or more position sensors 1559, one or more capacitive sensors 1560, one or more force sensors 1561; and/or any other types of sensors defined above or described with respect to any other embodiments discussed herein. In some embodiments, the peripherals interface can include one or more additional peripheral devices, including one or more Wi-Fi and/or Bluetooth devices 1568, an LTE component 1569, a GPS component 1570, a microphone 1571, one or more haptic assemblies 1562, one or more support structures 1563 (which can include one or more bladders 1564, one or more manifolds 1565, one or more pressure-changing devices 1567, one or more displays 1572, one or more buttons 1573, one or more speakers 1574, and/or any other types of peripheral devices defined above or described with respect to any other embodiments discussed herein. In some embodiments, computing system 1540 includes more or fewer components than those shown in FIG. 15C.

In some embodiments, each haptic assembly 1562 includes a support structure 1563 and at least one bladder 1564. The bladder 1564 (e.g., a membrane) is a sealed, inflatable pocket made from a durable and puncture-resistant material, such as thermoplastic polyurethane (TPU), a flexible polymer, or the like. The bladder 1564 contains a medium (e.g., a fluid such as air, inert gas, or even a liquid) that can be added to or removed from the bladder 1564 to change pressure (e.g., fluid pressure) inside the bladder 1564. The support structure 1563 is made from a material that is stronger and stiffer than the material of the bladder 1564. A respective support structure 1563 coupled to a respective bladder 1564 is configured to reinforce the respective bladder 1564 as the respective bladder changes shape and size due to changes in pressure (e.g., fluid pressure) inside the bladder. The above example haptic assembly 1562 is non-limiting. The haptic assembly 1562 can include eccentric rotating mass (ERM), linear resonant actuators (LRA), voice coil motor (VCM), piezo haptic actuator, thermoelectric devices, solenoid actuators, ultrasonic transducers, thermo-resistive heaters, Peltier devices, and/or other devices configured to generate a perceptible response.

The smart textile-based garment 1500 also includes a haptic controller 1576 and a pressure-changing device 1567. Alternatively, in some embodiments, the computing system 1540 is communicatively coupled with a haptic controller 1576 and/or pressure-changing device 1567 (e.g., in electronic communication with one or more processors 1577 of the computing system 1540). The haptic controller 1576 is configured to control operation of the pressure-changing device 1567, and in turn operation of the smart textile-based garments 1500. For example, the haptic controller 1576 sends one or more signals to the pressure-changing device 1567 to activate the pressure-changing device 1567 (e.g., turn it on and off). The one or more signals can specify a desired pressure (e.g., pounds per square inch) to be output by the pressure-changing device 1567. Generation of the one or more signals, and in turn the pressure output by the pressure-changing device 1567, can be based on information collected by sensors 1551 of the smart textile-based garment 1500 and/or other communicatively coupled device. For example, the haptic controller 1576 can provide one or more signals, based on collected sensor data, to cause the pressure-changing device 1567 to increase the pressure (e.g., fluid pressure) inside a first haptic assembly 1562 at a first time, and provide one or more additional signals, based on additional sensor data, to the pressure-changing device 1567, to cause the pressure-changing device 1567 to further increase the pressure inside a second haptic assembly 1562 at a second time after the first time. Further, the haptic controller 1576 can provide one or more signals to cause the pressure-changing device 1567 to inflate one or more bladders 1564 in a first portion of a smart textile-based garment 1500 (e.g., a first finger), while one or more bladders 1564 in a second portion of the smart textile-based garment 1500 (e.g., a second finger) remain unchanged. Additionally, the haptic controller 1576 can provide one or more signals to cause the pressure-changing device 1567 to inflate one or more bladders 1564 in a first smart textile-based garment 1500 to a first pressure and inflate one or more other bladders 1564 in the first smart textile-based garment 1500 to a second pressure different from the first pressure. Depending on the number of smart textile-based garments 1500 serviced by the pressure-changing device 1567, and the number of bladders therein, many different inflation configurations can be achieved through the one or more signals, and the examples above are not meant to be limiting.

The smart textile-based garment 1500 may include an optional manifold 1565 between the pressure-changing device 1567, the haptic assemblies 1562, and/or other portions of the smart textile-based garment 1500. The manifold 1565 may include one or more valves (not shown) that pneumatically couple each of the haptic assemblies 1562 with the pressure-changing device 1567 via tubing. In some embodiments, the manifold 1565 is in communication with the controller 1575, and the controller 1575 controls the one or more valves of the manifold 1565 (e.g., the controller generates one or more control signals). The manifold 1565 is configured to switchably couple the pressure-changing device 1567 with one or more haptic assemblies 1562 of the smart textile-based garment 1500. In some embodiments, one or more smart textile-based garments 1500 or other haptic devices can be coupled in a network of haptic devices, and the manifold 1565 can distribute the fluid between the coupled smart textile-based garments 1500.

In some embodiments, instead of using the manifold 1565 to pneumatically couple the pressure-changing device 1567 with the haptic assemblies 1562, the smart textile-based garment 1500 may include multiple pressure-changing devices 1567, where each pressure-changing device 1567 is pneumatically coupled directly with a single (or multiple) haptic assembly 1562. In some embodiments, the pressure-changing device 1567 and the optional manifold 1565 can be configured as part of one or more of the smart textile-based garments 1500 (not illustrated) while, in other embodiments, the pressure-changing device 1567 and the optional manifold 1565 can be configured as external to the smart textile-based garments 1500. In some embodiments, a single pressure-changing device 1567 can be shared by multiple smart textile-based garments 1500 or other haptic devices. In some embodiments, the pressure-changing device 1567 is a pneumatic device, hydraulic device, a pneudraulic device, or some other device capable of adding and removing a medium (e.g., fluid, liquid, or gas) from the one or more haptic assemblies 1562.

The memory 1578 includes instructions and data, some or all of which may be stored as non-transitory computer-readable storage media within the memory 1578. For example, the memory 1578 can include one or more operating systems 1579, one or more communication interface applications 1581, one or more interoperability modules 1584, one or more AR processing applications 1585, one or more data-management modules 1586, and/or one or more locomotion control modules 1587 (analogous to the locomotion control module 1286A; 12B) for performing the features described above in reference to FIGS. 1A-10, and/or any other types of data defined above or described with respect to FIGS. 12A-14B.

The memory 1578 also includes data 1588, which can be used in conjunction with one or more of the applications discussed above. The data 1588 can include device data 1590, sensor data 1591, locomotion control data 1594 (analogous to the locomotion control data 1292A; FIG. 12B) for storing data related to the performance of the features described above in reference to FIGS. 1A-10; and/or any other types of data defined above or described with respect to FIGS. 12A-14B.

The different components of the computing system 1540 (and the smart textile-based garment 1500) shown in FIGS. 15A-15C can be coupled via a wired connection (e.g., via busing). Alternatively, one or more of the devices shown in FIGS. 15A-15C may be wirelessly connected (e.g., via short-range communication signals).

Example Aspects

A few example aspects will now be briefly described.

(A1) In accordance with some embodiments, a method of adjusting a representation of a user's position within an artificial-reality application using a hand gesture is disclosed. The method includes, while displaying (via a head-wearable device worn by a user) a representation of a user's position within an artificial-reality environment, in response to receiving an indication that a positional-control activation hand gesture has been performed, displaying a positional-control user interface (UI) overlaid on a portion of the artificial-reality environment. The positional-control UI includes a positional-control UI element configured to perform a positional-control action. The method further includes, while displaying the positional-control UI, in response to receiving an indication that the positional-control UI element has been selected, via a positional-control input hand gesture, (i) causing a change in the representation of the user's position within the artificial-reality environment based on the positional-control action, and (ii) displaying a changed representation of the user's position within the artificial-reality environment.

(A2) In some embodiments of A1, the positional-control UI element is a first positional-control UI element, the positional-control action is a first positional-control action, the positional-control UI further includes a second positional-control UI element configured to perform a second positional-control action, and the positional-control input hand gesture is a first positional-control input hand gesture. The method further includes, while displaying the positional-control UI, in response to receiving an indication that the second positional-control UI element has been selected, via a second positional-control input hand gesture, (i) causing another change in the representation of the user's position within the artificial-reality environment based on the second positional-control action, and (ii) displaying another changed representation of the user's position within the artificial-reality environment.

(A3) In some embodiments of any of A1-A2, the positional-control action is a perspective change, and causing the change in the representation of the user's position within the artificial-reality environment based on the positional-control action includes instantaneously causing a variable sinistral (left) or variable dextral (right) change in a perspective of the representation of the user's position within the artificial-reality environment.

(A4) In some embodiments of A3, a magnitude of the variable sinistral or variable dextral change is based on a location, relative to the positional-control UI, that the positional-control input hand gesture is performed. The magnitude of the variable sinistral or variable dextral change is based on where the position-control action is performed. For example, if the user performs the action at or outside of the positional-control UI boundary, the snap turn may be an instant 30° position change. Alternatively, if the gesture is performed halfway between the boundary and the center point, then the snap turn may be an instant 15° position change. If the user performs and holds the gesture outside of the boundary, then the perspective changes are performed and the positional-control UI remains on the screen to allow the user to continue to change the perspective as desired. Additional examples of perspective changes are provided above in reference to FIGS. 5A-8.

(A5) In some embodiments of any of A1-A4, the positional-control action is an instant position change (e.g., teleportation), and causing the change in the representation of the user's position within the artificial-reality environment based on the positional-control action includes instantaneously causing a variable position change to the representation of the user's position within the artificial-reality environment such that the user's position is adjusted by the variable position change.

(A6) In some embodiments of A5, a magnitude of the variable position change is based on a location, relative to the positional-control UI, that the positional-control input hand gesture is performed. The magnitude of the teleportation is based on where the position-control action is performed. For example, if the user performs the action at or outside of the positional-control UI boundary, the teleportation may be an instant change (e.g., a 5 m (or other value) position change in the artificial-reality environment). Alternatively, if the gesture is performed halfway between the boundary and the center point, then the teleportation may be a smaller instant change (e.g., a 2 m position change in the artificial-reality environment). If the user performs and holds the gesture outside of the boundary, then the instant change is performed and the positional-control UI remains on the screen to allow the user to continue to change the position as desired. Additional examples of instant position changes are provided above in reference to FIGS. 1A-2.

(A7) In some embodiments of any of A1-A6, the positional-control action is a continuous position change (e.g., running), and causing the change in the representation of the user's position within the artificial-reality environment based on the positional-control action includes continuously causing a predetermined constant position change to the representation of the user's position within the artificial-reality environment such that the user's position is continuously adjusted by the predetermined constant position change.

(A8) In some embodiments of A7, the predetermined constant position change is based on a location, relative to the positional-control UI, that the positional-control input hand gesture is performed. The magnitude of the constant position change is based on where the position-control action is performed. For example, of the user performs the action at or outside of the positional-control UI boundary, the constant may be at a maximum (e.g., a full sprint). Alternatively, if the gesture is performed halfway between the boundary and the center point, then the run may be a jog or half sprint. Additional examples of the continuous position changes are provided above in reference to FIGS. 3 and 8.

(A9) In some embodiments of any of A1-A8, the positional-control input hand gesture is maintained and the positional-control action is based on movement a user's hand while the positional-control input hand gesture is maintained. The user's hand can be tracked and, while the gesture is maintained, the type of positional change is also adjusted. For example, the user can go from a walk to a sprint; from running/walking left to running/walking right; from looking left to looking right. Additionally, the maintained gesture can be tracked to perform multiple actions. For example, the user can perform a running/walking jump, walk/run and interact with an object, walk/run and perform an action (e.g., aim and shoot a rifle or throw an object); etc. Additional examples of positional-control actions performed when a positional-control input hand gesture is tracked are provided above in reference to FIGS. 4-8.

(A10) In some embodiments of any of A1-A9, the method includes displaying a navigation UI element overlaid on another portion of the artificial-reality environment adjacent to the positional-control UI, wherein the navigation UI element is configured to display a representation of the user's hand movements with respect to the positional-control UI.

(A11) In some embodiments of A10, the navigation UI element displays the user's hand movements as the user's hand moves from left to right.

(A12) In some embodiments of any of A1-A11, the positional-control UI is a first positional-control UI, the positional-control UI element is a first positional-control UI element, and the positional-control action is a first positional-control action. The method includes, while displaying the first positional-control UI, in response to receiving an indication that another positional-control activation hand gesture has been performed (i) ceasing to display the first positional-control UI, and (ii) displaying a second positional-control UI, in place of the first positional-control UI, overlaid on the portion of the artificial-reality environment, the second positional-control UI including a third positional-control UI element configured to perform a third positional-control action. The method further includes, while displaying the second positional-control UI, in response to receiving an indication that the third positional-control UI element has been selected (i) causing a change in the representation of the user's position within the artificial-reality environment based on the third positional-control action, and (ii) displaying a changed representation of the user's position within the artificial-reality environment. For example, as shown in FIG. 1D, the user can perform an additional positional-control activation hand gesture (such as turning ones and 180 degreed from palm-side up to palm-side down, or vice versa).

(A13) In some embodiments of A12, the first positional-control UI element and the first positional-control action are distinct from the third positional-control UI element and the third positional-control action, respectively. In other words, different positional-control UIs can include one or more positional-control actions that are the same or distinct.

(A14) In some embodiments of any of A1-A13, the positional-control UI is displayed at an initial position within the artificial-reality environment based on where a representation of the user's hand is within the artificial-reality environment when the positional-control input hand gesture is detected.

(A15) In some embodiments of A14, the positional-control UI is associated with a UI boundary and the method further includes, in response to detecting that a relative position the representation of the user's hand within the artificial-reality environment moves outside of the UI boundary, performing the positional-control action and continuing to display the positional-control UI. For example, as shown and described above in reference to FIGS. 6A-8, the positional-control UI can remain displayed based on the user inputs provided.

(A16) In some embodiments of any of A1-A15, the positional-control UI element is a first positional-control UI element and the positional-control UI further includes a second positional-control UI element, and the first positional-control UI element forms a first portion of the positional-control UI and the second positional-control UI element forms a second portion of the positional-control UI.

(A17) In some embodiments of A16, the first portion of the positional-control UI and the second portion of the positional-control UI are continuous.

(A18) In some embodiments of any of A1-A17, the positional-control activation hand gesture is a maintained gesture (e.g., a pinch) and the positional-control input hand gesture is release of the maintained gesture (e.g., a releasing pinch).

(A19) In some embodiments of any of A1-A18, the method includes displaying at least on additional positional-control UI element adjacent to the positional-control UI, the additional positional-control UI element configured to perform an additional positional-control action. For example, as shown in FIG. 2, additional positional-control UI elements can be displayed next to the positional-control UI.

(A20) In some embodiments of any of A1-A19, the method further includes, while displaying the positional-control UI, receiving an indication that a non-positional control input hand gesture is performed, preforming a non-positional-control action associated with the non-positional control input hand gesture, and continuing to display the positional-control UI. In other words, the user is able to continue to perform other non-position-based actions while the positional-control UI is displayed. Alternatively, in some embodiments, the non-positional control input hand gesture automatically causes the positional-control UI to no longer be displayed.

(A21) In some embodiments of any of A1-A20, method further includes, after displaying the changed representation of the user's position within the artificial-reality environment, ceasing to display the positional-control UI. Alternatively, in some embodiments, the positional-control UI is displayed until the user provides another input requesting to cease displaying the positional-control UI.

(A22) In some embodiments of any of A1-A21, the positional-control activation hand gesture, positional-control input hand gesture, and/or other user hand gestures are an in-air hand gesture.

(A23) In some embodiments of any of A1-A22, the positional-control activation hand gesture is performed by a first hand, the positional-control UI is a first positional-control UI, the positional-control UI element is a first positional-control UI element, the positional-control action is a first positional-control action, and the positional-control input hand gesture is a first positional-control input hand gesture. The method includes, while displaying the first positional-control UI, in response to receiving an indication that a third positional-control activation hand gesture has been performed by a second hand of the user, displaying a third positional-control UI overlaid on another portion of the artificial-reality environment, the third positional-control UI including a fourth positional-control UI element configured to perform a fourth positional-control action. The method further includes, while displaying the third positional-control UI, in response to receiving an indication that the fourth positional-control UI element has been selected, via a third positional-control input hand gesture performed by the second hand of the user, (i) causing a change in the representation of the user's position within the artificial-reality environment based on fourth the positional-control action, and (ii) displaying a changed representation of the user's position within the artificial-reality environment.

(A24) In some embodiments of A23, the third positional-control UI includes one or more respective positional-control UI elements configured to perform respective positional-control actions in accordance with any of A2-A22. In other words, the user can use one or both hands to cause respective positional-control UIs to be presented and provide distinct user inputs. For example, the user can use their right hand to cause a right hand positional-control UI to be presented, and their left hand to cause a left hand positional-control UI to be presented. The user can provide different inputs to the via each respective positional-control UI as discussed above in reference to FIGS. 1A-10.

(B1) In accordance with some embodiments, a method of controlling movement within an artificial-reality application using a hand gesture is disclosed. The method includes, while displaying, via a head-wearable device worn by a user, a representation of a user's position within an artificial-reality environment, in response to receiving an indication that a controller activation hand gesture has been performed, displaying a controller user interface overlaid on a portion of the artificial-reality environment, the controller including a controller user interface element configured to control an action within the artificial-reality environment. The method further includes, while displaying the controller user interface, in response to receiving an indication that the controller user interface element has been selected, causing a performance of the action within the artificial-reality environment.

(B2) In some embodiments of B1, the method operations in accordance with any of A2-A22.

(C1) In accordance with some embodiments, a head-wearable device for adjusting a representation of a user's position within an artificial-reality application using a hand gesture, the head-wearable device configured to perform or cause performance of the method of any of A1-A24 or B1-B2.

(D1) In accordance with some embodiments, a system for adjusting a representation of a user's position within an artificial-reality application using a hand gesture, the system configured to perform or cause performance of the method of any of A1-A24 or B1-B2.

(E1) In accordance with some embodiments, non-transitory, computer-readable storage medium including instructions that, when executed by a head-wearable device, a wrist-wearable device, and/or an intermediary device in communication with the head-wearable device and/or the wrist-wearable device, cause performance of the method of any of A1-A24 or B1-B2.

(F1) In another aspect, a means on a wrist-wearable device, head-wearable device, and/or intermediary device for performing or causing performance of the method of any of A1-A24 or B1-B2.

Any data collection performed by the devices described herein and/or any devices configured to perform or cause the performance of the different embodiments described above in reference to any of the Figures, hereinafter the "devices," is done with user consent and in a manner that is consistent with all applicable privacy laws. Users are given options to allow the devices to collect data, as well as the option to limit or deny collection of data by the devices. A user is able to opt in or opt out of any data collection at any time. Further, users are given the option to request the removal of any collected data.

It will be understood that, although the terms "first," "second," etc., may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A non-transitory, computer-readable storage medium including instructions that, when executed by one or more processors of a head-wearable device, cause the head-wearable device to:

while displaying a representation of a user's position within an artificial-reality environment:
in response to receiving an indication that a first positional-control activation hand gesture has been performed, display a first positional-control user interface (UI) overlaid on a portion of the artificial-reality environment, the first positional-control UI including a first positional-control UI element configured to perform a first positional-control action;
while displaying the first positional-control UI:
in response to receiving an indication that the first positional-control UI element has been selected, via a positional-control input hand gesture, (i) cause a change in the representation of the user's position within the artificial-reality environment based on the first positional-control action, and (ii) display a changed representation of the user's position within the artificial-reality environment, and
in response to receiving an indication that a second positional-control activation hand gesture has been performed, (i) cease to display the first positional-control UI, and (ii) display a second positional-control UI, in place of the first positional-control UI, overlaid on the portion of the artificial-reality environment, a second positional-control UI including a second positional-control UI element configured to perform a second positional-control action; and
while displaying the second positional-control UI:
in response to receiving an indication that the second positional-control UI element has been selected, (i) cause a change in the representation of the user's position within the artificial-reality environment based on the second positional-control action, and (ii) display a changed representation of the user's position within the artificial-reality environment.

2. The non-transitory, computer-readable storage medium of claim 1, wherein the positional-control input hand gesture is a first positional-control input hand gesture, and the instructions, when executed by the one or more processors of the head-wearable device, further cause the head-wearable device to:
   while displaying the first positional-control UI:
      in response to receiving an indication that a third positional-control UI element has been selected, via a second positional-control input hand gesture, (i) cause another change in the representation of the user's position within the artificial-reality environment based on a third positional-control action, and (ii) display another changed representation of the user's position within the artificial-reality environment.

3. The non-transitory, computer-readable storage medium of claim 1, wherein:
   the first positional-control action is a perspective change; and
   causing the change in the representation of the user's position within the artificial-reality environment based on the first positional-control action includes instantaneously causing a variable sinistral or variable dextral change in a perspective of the representation of the user's position within the artificial-reality environment.

4. The non-transitory, computer-readable storage medium of claim 1, wherein:
   the first positional-control action is an instant position change; and
   causing the change in the representation of the user's position within the artificial-reality environment based on the first positional-control action includes instantaneously causing a variable position change to the representation of the user's position within the artificial-reality environment such that the user's position is adjusted by the variable position change.

5. The non-transitory, computer-readable storage medium of claim 1, wherein:
   the first positional-control action is a continuous position change; and
   causing the change in the representation of the user's position within the artificial-reality environment based on the first positional-control action includes continuously causing a predetermined constant position change to the representation of the user's position within the artificial-reality environment such that the user's position is continuously adjusted by the predetermined constant position change.

6. The non-transitory, computer-readable storage medium of claim 1, wherein the positional-control input hand gesture is maintained and the first positional-control action is based on movement of a user's hand while the positional-control input hand gesture is maintained.

7. The non-transitory, computer-readable storage medium of claim 1, wherein the instructions, when executed by the one or more processors of the head-wearable device, further cause the head-wearable device to:
   display a navigation UI element overlaid on another portion of the artificial-reality environment adjacent to the first positional-control UI, wherein the navigation UI element is configured to display a representation of the user's hand movements with respect to the first positional-control UI.

8. The non-transitory, computer-readable storage medium of claim 1, wherein the first positional-control UI is displayed at an initial position within the artificial-reality environment based on where a representation of the user's hand is within the artificial-reality environment when the positional-control input hand gesture is detected.

9. The non-transitory, computer-readable storage medium of claim 8, wherein the first positional-control UI is associated with a UI boundary, and the instructions, when executed by the one or more processors of the head-wearable device, further cause the head-wearable device to:
   in response to detecting that a relative position the representation of the user's hand within the artificial-reality environment moves outside of the UI boundary:
      perform the first positional-control action, and
      continue to display the first positional-control UI.

10. The non-transitory, computer-readable storage medium of claim 1, wherein the instructions, when executed by the one or more processors of the head-wearable device, further cause the head-wearable device to:
   display at least one additional positional-control UI element adjacent to the first positional-control UI, the at least one additional positional-control UI element configured to perform an additional positional-control action.

11. A method of adjusting a representation of a user's position within an artificial-reality application using a hand gesture, comprising:
   while displaying, via a head-wearable device worn by a user, a representation of a user's position within an artificial-reality environment:
      in response to receiving an indication that a first positional-control activation hand gesture has been performed, display a first positional-control user interface (UI) overlaid on a portion of the artificial-reality environment, the first positional-control UI including a first positional-control UI element configured to perform a first positional-control action;
      while displaying the first positional-control UI:
         in response to receiving an indication that the first positional-control UI element has been selected, via a positional-control input hand gesture, (i) cause a change in the representation of the user's position within the artificial-reality environment based on the first positional-control action, and (ii) display a changed representation of the user's position within the artificial-reality environment, and
         in response to receiving an indication that a second positional-control activation hand gesture has been performed, (i) cease to display the first positional-control UI, and (ii) display a second positional-control UI, in place of the first positional-control UI, overlaid on the portion of the artificial-reality environment, a second positional-control UI including a second positional-control UI element configured to perform a second positional-control action; and
      while displaying the second positional-control UI:
         in response to receiving an indication that the second positional-control UI element has been selected, (i) cause a change in the representation of the user's position within the artificial-reality environment based on the second positional-control action, and (ii) display a changed representation of the user's position within the artificial-reality environment.

12. The method of claim 11, wherein the positional-control input hand gesture is a first positional-control input hand gesture, and the method further comprises:

while displaying the first positional-control UI:
in response to receiving an indication that a third positional-control UI element has been selected, via a second positional-control input hand gesture, (i) cause another change in the representation of the user's position within the artificial-reality environment based on a third positional-control action, and (ii) display another changed representation of the user's position within the artificial-reality environment.

13. The method of claim 11, wherein:
the first positional-control action is a perspective change; and
causing the change in the representation of the user's position within the artificial-reality environment based on the first positional-control action includes instantaneously causing a variable sinistral or variable dextral change in a perspective of the representation of the user's position within the artificial-reality environment.

14. The method of claim 11, wherein:
the first positional-control action is an instant position change; and
causing the change in the representation of the user's position within the artificial-reality environment based on the first positional-control action includes instantaneously causing a variable position change to the representation of the user's position within the artificial-reality environment such that the user's position is adjusted by the variable position change.

15. The method of claim 11, wherein:
the first positional-control action is a continuous position change; and
causing the change in the representation of the user's position within the artificial-reality environment based on the first positional-control action includes continuously causing a predetermined constant position change to the representation of the user's position within the artificial-reality environment such that the user's position is continuously adjusted by the predetermined constant position change.

16. A head-wearable device for adjusting a representation of a user's position within an artificial-reality application using a hand gesture, the head-wearable device comprising:
a display;
one or more processors; and
memory including one or more instructions that, when executed by the one or more processors, cause the head-wearable device to:
while displaying a representation of a user's position within an artificial-reality environment:
in response to receiving an indication that a first positional-control activation hand gesture has been performed, display a first positional-control user interface (UI) overlaid on a portion of the artificial-reality environment, the first positional-control UI including a first positional-control UI element configured to perform a first positional-control action;
while displaying the first positional-control UI:
in response to receiving an indication that the first positional-control UI element has been selected, via a positional-control input hand gesture, (i) cause a change in the representation of the user's position within the artificial-reality environment based on the first positional-control action, and (ii) display a changed representation of the user's position within the artificial-reality environment, and
in response to receiving an indication that a second positional-control activation hand gesture has been performed, (i) cease to display the first positional-control UI, and (ii) display a second positional-control UI, in place of the first positional-control UI, overlaid on the portion of the artificial-reality environment, a second positional-control UI including a second positional-control UI element configured to perform a second positional-control action; and
while displaying the second positional-control UI:
in response to receiving an indication that the second positional-control UI element has been selected, (i) cause a change in the representation of the user's position within the artificial-reality environment based on the second positional-control action, and (ii) display a changed representation of the user's position within the artificial-reality environment.

17. The head-wearable device of claim 16, wherein the positional-control input hand gesture is a first positional-control input hand gesture, and the instructions, when executed by the one or more processors of the head-wearable device, further cause the head-wearable device to:
while displaying the first positional-control UI:
in response to receiving an indication that a third positional-control UI element has been selected, via a second positional-control input hand gesture, (i) cause another change in the representation of the user's position within the artificial-reality environment based on a third positional-control action, and (ii) display another changed representation of the user's position within the artificial-reality environment.

18. The head-wearable device of claim 16, wherein:
the first positional-control action is a perspective change; and
causing the change in the representation of the user's position within the artificial-reality environment based on the first positional-control action includes instantaneously causing a variable sinistral or variable dextral change in a perspective of the representation of the user's position within the artificial-reality environment.

19. The head-wearable device of claim 16, wherein:
the first positional-control action is an instant position change; and
causing the change in the representation of the user's position within the artificial-reality environment based on the first positional-control action includes instantaneously causing a variable position change to the representation of the user's position within the artificial-reality environment such that the user's position is adjusted by the variable position change.

20. The head-wearable device of claim 16, wherein:
the first positional-control action is a continuous position change; and
causing the change in the representation of the user's position within the artificial-reality environment based on the first positional-control action includes continuously causing a predetermined constant position change to the representation of the user's position within the artificial-reality environment such that the user's position is continuously adjusted by the predetermined constant position change.

\* \* \* \* \*